US011487349B2

(12) United States Patent
Briggs et al.

(10) Patent No.: US 11,487,349 B2
(45) Date of Patent: Nov. 1, 2022

(54) INTERACTIVE AMUSEMENT ATTRACTION SYSTEM AND METHOD

(71) Applicant: Whitewater West Industries Ltd., Richmond (CA)

(72) Inventors: Rick Briggs, Springfield, IL (US); Aaron Mendelson, Longmont, CO (US); Rick Sebulsky, Delta (CA); Mohammed Sahill Rafiq, Vancouver (CA); William Walter Andrews, Burnaby (CA); Keith James Campden, Vancouver (CA); Mitchell Keith Fitzgibbon, Vancouver (CA)

(73) Assignee: WhiteWater West Industries, Ltd., Richmond (CA)

( * ) Notice: Subject to any disclaimer, the term of this patent is extended or adjusted under 35 U.S.C. 154(b) by 0 days.

(21) Appl. No.: 15/707,974

(22) Filed: Sep. 18, 2017

(65) Prior Publication Data

US 2018/0284881 A1 Oct. 4, 2018
US 2020/0371582 A9 Nov. 26, 2020

Related U.S. Application Data

(63) Continuation-in-part of application No. 14/860,459, filed on Sep. 21, 2015, now Pat. No. 9,764,245, which
(Continued)

(51) Int. Cl.
*G06F 3/01* (2006.01)
*A63G 21/18* (2006.01)
(Continued)

(52) U.S. Cl.
CPC .............. *G06F 3/011* (2013.01); *A63G 21/12* (2013.01); *A63G 21/18* (2013.01); *A63G 33/00* (2013.01);
(Continued)

(58) Field of Classification Search
CPC ......... G06F 3/011; A63G 21/12; A63G 21/18; A63G 33/00; A63F 13/23; A63F 13/245;
(Continued)

(56) References Cited

U.S. PATENT DOCUMENTS 2,058,383 A  10/1936 Maynes
D189,828 S   2/1961 Karl
(Continued)

FOREIGN PATENT DOCUMENTS

CA  2890889 A1  5/2014
CA  2870805 A1  5/2015
(Continued)

OTHER PUBLICATIONS

International Preliminary Report on Patentability for International Application No. PCT/US2013/069516, dated May 21, 2015, 12 pages.
(Continued)

*Primary Examiner* — Michael D Dennis
(74) *Attorney, Agent, or Firm* — Buchalter, a Professional Corporation

(57) ABSTRACT

An attraction capable of incorporating user interactivity. The attraction utilizes a slide for supporting a rider, with a ride vehicle or without. The ride vehicle may support one or multiple riders that allows the riders to manipulate its position or other associated elements while on the attraction. Upon manipulating an element, a signal may be transmitted. This signal may aid in determining whether a rider has successfully manipulated the element, for example, at an appropriate time. Sensors along the attraction may also be configured to track the user and/or ride vehicle via determining vicinity of the user and/or ride vehicle at a known location. Various rewards and/or features may be enabled based upon successful manipulation and/or user position.
(Continued)

The attraction may include one or more illuminating features. Statistics or other information may be determined, stored, and/or provided (e.g., using mobile applications and/or scoreboards) relating to user performance.

20 Claims, 48 Drawing Sheets

Related U.S. Application Data is a continuation-in-part of application No. 14/548,133, filed on Nov. 19, 2014, now Pat. No. 9,387,408, and a continuation-in-part of application No. 14/540,858, filed on Nov. 13, 2014, now Pat. No. 9,592,454, and a continuation-in-part of application No. 14/077,038, filed on Nov. 11, 2013, now Pat. No. 9,138,653.

(60) Provisional application No. 62/080,905, filed on Nov. 17, 2014.

(51) Int. Cl.
*A63G 21/12* (2006.01)
*A63G 33/00* (2006.01)
*A63F 13/23* (2014.01)
*A63F 13/46* (2014.01)
*A63F 13/90* (2014.01)
*A63F 13/807* (2014.01)
*A63F 13/245* (2014.01)

(52) U.S. Cl.
CPC .............. *A63F 13/23* (2014.09); *A63F 13/245* (2014.09); *A63F 13/46* (2014.09); *A63F 13/807* (2014.09); *A63F 13/90* (2014.09)

(58) Field of Classification Search
CPC ........ A63F 13/46; A63F 13/807; A63F 13/90; A63F 9/24; A63F 13/217; A63F 13/803; B63B 17/00; B63B 35/85
USPC ............................................ 472/117; 104/59
See application file for complete search history.

(56) References Cited

U.S. PATENT DOCUMENTS

| | | | |
|---|---|---|---|
| D229,354 S | 11/1973 | Morgan | |
| 3,871,042 A | 3/1975 | Farmer | |
| 4,205,785 A | 6/1980 | Stanley | |
| 4,811,682 A | 3/1989 | Hwang | |
| D331,439 S | 12/1992 | Gibson | |
| 5,382,026 A * | 1/1995 | Harvard | A63F 9/0291 463/30 |
| 5,453,054 A | 9/1995 | Langford | |
| 5,716,281 A * | 2/1998 | Dote | F41J 9/14 463/2 |
| 5,785,592 A * | 7/1998 | Jacobsen | A63F 9/0291 463/7 |
| 5,820,471 A | 10/1998 | Briggs | |
| 5,853,332 A | 12/1998 | Briggs | |
| 6,115,974 A | 9/2000 | Milanian | |
| 6,132,318 A | 10/2000 | Briggs | |
| 6,210,287 B1 | 4/2001 | Briggs | |
| 6,261,186 B1 | 7/2001 | Henry | |
| 6,375,578 B1 | 4/2002 | Briggs | |
| 6,424,264 B1 | 7/2002 | Giraldin et al. | |
| 6,527,646 B1 * | 3/2003 | Briggs | A63G 21/18 104/69 |
| 6,746,334 B1 * | 6/2004 | Barney | A63G 31/00 273/349 |
| 6,762,586 B2 | 7/2004 | Choi | |
| 6,773,355 B1 | 8/2004 | Lekhtman | |
| 6,796,908 B2 * | 9/2004 | Weston | A63G 7/00 434/55 |
| 7,267,586 B1 | 9/2007 | Murphy | |
| 7,530,321 B2 | 5/2009 | Dingel | |
| 7,749,089 B1 * | 7/2010 | Briggs | A63F 13/213 472/136 |
| 7,758,435 B2 * | 7/2010 | Henry | A63G 33/00 472/128 |
| 7,854,663 B2 * | 12/2010 | Burger | A63G 3/02 472/129 |
| 7,896,742 B2 | 3/2011 | Weston | |
| 7,905,790 B2 | 3/2011 | Schnuckle | |
| 7,927,175 B2 | 4/2011 | Coffey | |
| 7,967,692 B2 | 6/2011 | Werner | |
| 8,079,916 B2 | 12/2011 | Henry | |
| 8,376,869 B2 * | 2/2013 | Bloom | A63G 5/00 472/43 |
| 9,138,653 B2 | 9/2015 | Heaven et al. | |
| 9,174,704 B1 * | 11/2015 | Crawford | A63G 31/007 |
| 9,764,245 B2 | 9/2017 | Weston | |
| 10,504,336 B2 | 12/2019 | Kogler | |
| 2003/0045353 A1 * | 3/2003 | Paulsen | G07F 17/3241 463/40 |
| 2003/0106455 A1 * | 6/2003 | Weston | A63G 7/00 104/53 |
| 2007/0087850 A1 | 4/2007 | Henry et al. | |
| 2007/0131155 A1 | 6/2007 | Dingel | |
| 2008/0014835 A1 | 1/2008 | Weston et al. | |
| 2008/0064514 A1 | 3/2008 | Larsen | |
| 2008/0293470 A1 | 11/2008 | Proud | |
| 2009/0143155 A1 | 6/2009 | Werner | |
| 2009/0197740 A1 | 8/2009 | Julskjaer et al. | |
| 2010/0160054 A1 | 6/2010 | Henry | |
| 2010/0203932 A1 | 8/2010 | Briggs et al. | |
| 2010/0255915 A1 * | 10/2010 | Spradley | A63F 13/803 463/38 |
| 2014/0057524 A1 | 2/2014 | Teel | |
| 2014/0135137 A1 | 5/2014 | Heaven et al. | |
| 2014/0329424 A1 | 11/2014 | Swift | |
| 2015/0133229 A1 | 5/2015 | Weston et al. | |
| 2016/0136529 A1 * | 5/2016 | Weston | A63G 31/007 472/117 |
| 2016/0184718 A1 | 6/2016 | Briggs | |
| 2018/0041053 A1 | 2/2018 | Capizzo | |
| 2018/0253905 A1 * | 9/2018 | McCracken | G02B 27/0172 |
| 2018/0272239 A1 * | 9/2018 | Vyas | A63G 31/12 |
| 2018/0284881 A1 | 10/2018 | Briggs | |
| 2019/0139368 A1 * | 5/2019 | Kogler | G07F 17/3204 |
| 2019/0366223 A1 | 12/2019 | Sall | |

FOREIGN PATENT DOCUMENTS

| | | |
|---|---|---|
| KR | 101100354 B1 | 12/2011 |
| WO | 2014075027 A1 | 5/2014 |

OTHER PUBLICATIONS

International Search Report and Written Opinion for International Application No. PCT/US2013/069516, dated Feb. 26, 2014, 14 pages.

\* cited by examiner

INTERACTIVE AMUSEMENT ATTRACTION SYSTEM AND METHOD

CROSS REFERENCE TO RELATED APPLICATIONS

This application is a continuation-in-part of Nonprovisional patent application Ser. No. 14/860,459, filed on Sep. 21, 2015, which claims the benefit of U.S. Provisional Patent Application Ser. No. 62/080,905, filed on Nov. 17, 2014, and which is:

a continuation-in-part of Nonprovisional patent application Ser. No. 14/077,038, now U.S. Pat. No. 9,138,653, filed on Nov. 11, 2013, which claims the benefit of U.S. Provisional Patent Application Ser. No. 61/724,849, filed on Nov. 9, 2012;

a continuation-in-part of Nonprovisional patent application Ser. No. 14/540,858, now U.S. Pat. No. 9,592,454, filed on Nov. 13, 2014, which claims the benefit of U.S. Provisional Patent Application Ser. No. 61/903,863, filed on Nov. 13, 2013; and a continuation-in-part of Nonprovisional patent application Ser. No. 14/548,133, now U.S. Pat. No. 9,387,408, filed on Nov. 19, 2014, which claims the benefit of U.S. Provisional Patent Application Ser. No. 61/906,329, filed on Nov. 19, 2013.

BACKGROUND

1. Field

The present invention relates generally to methods and systems for water rides or amusement attractions, such as tracking systems and/or visual or interactive experiences for a rider as they navigate through the ride or attraction. More particularly, certain features of the present invention relate to waterslide attractions capable of incorporating skill or agility of a user riding thereon and modifying features of the waterslide attraction in response thereto. Other features of the present invention relate to encouragement of active participation while riding on a waterslide and methods and systems for an illuminated waterslide that visually responds to a rider's input while the rider rides on the waterslide.

2. Description of the Related Art

Waterslide attractions typically provide riders with a thrilling experience of speed and lateral force upon the body as the riders slide on the attraction. A stream of water is commonly flowed along a chute, flume, or tube from an entrance location of higher elevation to an exit location of lower elevation. A rider slides along the flume due to the stream of water, either with or without a ride vehicle, and experiences the twists, turns, and drops predetermined by the design and setup of the flume. While such attractions provide an initial rush of excitement, repeated riding of the attraction can have diminished appeal as riders become accustomed to the layout of the attraction and their merely passive interaction along its length.

Some concepts or designs have attempted to increase the excitement of a waterslide attraction even after multiple riding attempts. One such concept allowed riders to choose among a collection of preset themes prior to riding on an attraction, the lighting and sound effects changing as the rider traveled down the slide according to the theme chosen by the rider. Depending on the number of selectable themes, riders could have a different experience in subsequent ride attempts. Another concept involved adding elements of competition between two riders via a pair of parallel water slide riding surfaces. These riders could compete with one another on these riding surfaces while non-ride participants could interact with the ride to aid or hinder the rider movement from platforms positioned adjacent to the riding surfaces. See, for example, U.S. Pat. No. 6,527,646 and U.S. Pat. No. 6,186,902 to Briggs, each incorporated herein by reference in its entirety. While these designs may have extended rider excitement more so than conventional water slides without such features, they may not have the effect of encouraging multiple attempts at riding the water attraction, for example, since riders only passively engage with the waterslide and its features.

Thus, an improved waterslide that incorporates other dynamic experiences, such as skill, reflexes, or agility of the rider themselves while navigating the water slide is desired. The improved waterslide would ideally be capable of tracking user performance, either through the use of a ride vehicle or without, and generate an indication of user performance for encouraging multiple attempts at the waterslide to garner improved performance ratings. The improved waterslide would desirably promote competition between riders, even when such riders are not riding on the waterslide at substantially the same time. Moreover, the improved waterslide would desirably allow riders to gauge or analyze their own performance for improving subsequent runs down the waterslide attraction.

SUMMARY

A water ride attraction that is configured to incorporate rider skill, agility, reflexes, and/or other dynamic experiences is disclosed. In one embodiment, a waterslide may include a slide having a surface for supporting a rider thereon. A sensor is coupled with the slide and a tag having identification information associated therewith is configured to be sensed by the sensor when within a predetermined distance of the sensor. A reward component is in communication with the sensor and configured to reward the rider on the slide based on a position of the rider on the slide. The tag may be coupled to the rider via an article of clothing or accessory worn by the rider or may be coupled with a ride vehicle that is configured to support the rider and slide along the surface of the slide.

In another embodiment, a waterslide for incorporating skill or agility of a rider may include a slide having a surface for supporting the rider thereon, a sensor coupled with the slide, a tag having identification information associated therewith, the tag configured to be sensed by the sensor when within a predetermined distance of the sensor, and a reward component in communication with the sensor and configured to reward the rider on the slide based on a position of the rider on the slide.

In yet another embodiment, a ride vehicle for a waterslide may include a supporting surface configured to support the rider thereon and travel with the rider on the waterslide, a handle coupled with the supporting surface configured to be held by the rider, and a button adjacent to the supporting surface and configured to be pressed by the rider while the rider travels on the waterslide.

In still another embodiment, a waterslide for incorporating skill of a rider may include a slide having a surface for supporting the rider thereon, a controller having at least one button for manipulated by the rider while the rider slides on the surface of the waterslide, the controller configured to transmit a signal upon manipulation of the at least one button by the rider, a receiver configured to receive the signal, and a feature of the waterslide configured to respond to receipt of the signal by the receiver.

In another embodiment, a waterslide may include a slide having a surface for supporting a flow of water thereon, at least one light connected with the slide and configured to illuminate, a ride vehicle configured to support at least a portion of a rider and travel on the surface of the slide via the flow of water, an interactive element connected with the ride vehicle and configured to be manipulated by the rider to provide rider input, and a reward component configured to be activated to reward the rider based on the rider input.

In another embodiment, a waterslide may include a slide having a surface for supporting a flow of water thereon, at least one light coupled with the slide and configured to illuminate, an interactive element configured to be manipulated by a rider to provide rider input, and a reward component configured to be activated to reward the rider based on the rider input.

In another embodiment, a method for modifying a visual illumination of a waterslide in response to user input may include displaying a visual illumination along a surface of a waterslide, displaying a target viewable by a user riding on the surface of the waterslide, determining if input received from the user is activated within a predetermined time, and initiating a reward response if the input received from the user is determined to be activated within the predetermined time.

In another embodiment, an improved waterslide is provided having interactive features that challenge the skill or agility of the riders while they navigate the water slide. The improved waterslide would preferably be configured to track user performance, either through the use of a ride vehicle or without, and generate an indication of user performance for encouraging multiple attempts at the waterslide to garner improved performance ratings. Such an improved waterslide would desirably promote competition between riders, even when such riders are not riding on the waterslide at substantially the same time. Moreover, the improved waterslide would desirably allow riders to gauge or analyze their own performance for improving subsequent runs down the waterslide attraction.

In another embodiment, an illuminated water ride attraction is provided that is configured to challenge the skill or agility of users while they navigate along the illuminated water ride attraction, either with or without a water ride vehicle, is disclosed. The illuminated water ride attraction is preferably configured to track user performance and/or location, either through the use of a ride vehicle or without. In another embodiment, a waterslide may include a slide having a surface for supporting a flow of water thereon and at least one sensor coupled with the slide for interacting with tags affixed to users when the tags are positioned within a pre-determined distance to the sensor. Alternatively, the tags may be incorporated in or attached to water ride vehicles being controlled or manipulated by a user.

In another embodiment, a ride vehicle for an amusement attraction may include a body portion having a first seating area and a second seating area, a first interactive element physically coupled with the body portion and configured to be interacted with by a first rider that is positioned in the first seating area, a second interactive element physically coupled with the body portion and configured to be interacted with by a second rider that is positioned in the second seating area, and a processor connected with the first interactive element and the second interactive element, the processor configured to determine a first position of the ride vehicle along the amusement attraction based on the first rider interacting with the first interactive element and determine a second position of the ride vehicle along the amusement attraction based on the second rider interacting with the second interactive element.

In another embodiment, a ride vehicle for a waterslide may include a body portion for a first rider and a second rider to travel thereon, a first interactive element physically coupled with the body portion and configured to be manipulated by the first rider, a second interactive element physically coupled with the body portion and configured to be manipulated by the second rider, a sensor configured to interact with a sensing element of the waterslide, and a processor electrically connected with the first interactive element, the second interactive element, and the sensor, the processor configured to determine if the first rider interacts with the first interactive element when the sensor is in a range of the sensing element and determine if the second rider interacts with the second interactive element when the sensor is in the range of the sensing element.

In another embodiment, a ride vehicle for a waterslide may include a body portion for a first rider and a second rider to travel thereon, a first handle connected with the body portion and configured to be engaged with by the first rider, a second handle connected with the body portion and configured to be engaged with by the second rider, a first button mounted with the first handle and configured to be manipulated by the first rider, a second button mounted with the second handle and configured to be manipulated by the second rider, and a processor electrically connected with the first button and the second button, the processor configured to determine a first time when the first rider manipulates the first button and determine a second time when the second rider manipulates the second button, wherein processor is configured to award numerical points to the first rider or the second rider based on the first time or the second time of the ride vehicle.

Various illumination features may additionally or alternatively be incorporated into a waterslide attraction. The water ride vehicle is preferably configured to support at least a portion of at least one rider, and travel on the surface of the slide with the flow of water. The illuminated water ride attraction may include one or more light strips for illumination that may be dynamically modified based on riders action or inaction, or input from a third person or device. For example, suitable feedbacks may be generated by the sensor and/or the water ride vehicle when a tag successfully or unsuccessfully interacts with or is sensed by the sensor. In another embodiment, user performance may be established based on the generated feedbacks. These or other feedbacks may also result in various modifications or enhancements of the ride experience, including ride vehicle modifications, illumination color or theme changes, music or sound effects, and/or other visual, tactile or audible sensory effects. Optionally, rewards, such as bonus score points or rides, may be provided to users based on user performance.

For purposes of summarizing the invention and the advantages achieved over the prior art, certain objects and advantages of the invention have been described herein above. Of course, it is to be understood that not necessarily all such objects or advantages may be achieved in accordance with any particular embodiment of the invention. Thus, for example, those skilled in the art will recognize that the invention may be embodied or carried out in a manner that achieves or optimizes one advantage or combination of advantages as taught herein without necessarily achieving other objects or advantages as may be taught or suggested herein.

BRIEF DESCRIPTION OF THE DRAWINGS

Other systems, methods, features, and advantages of the present invention will be or will become apparent to one with skill in the art upon examination of the following figures and detailed description. It is intended that all such additional systems, methods, features, and advantages be included within this description, be within the scope of the present invention, and be protected by the accompanying claims. Component parts shown in the drawings are not necessarily to scale and may be exaggerated to better illustrate the important features of the present invention. In the drawings, like reference numerals designate like parts throughout the different views, wherein:

DETAILED DESCRIPTION

Figure 1A:
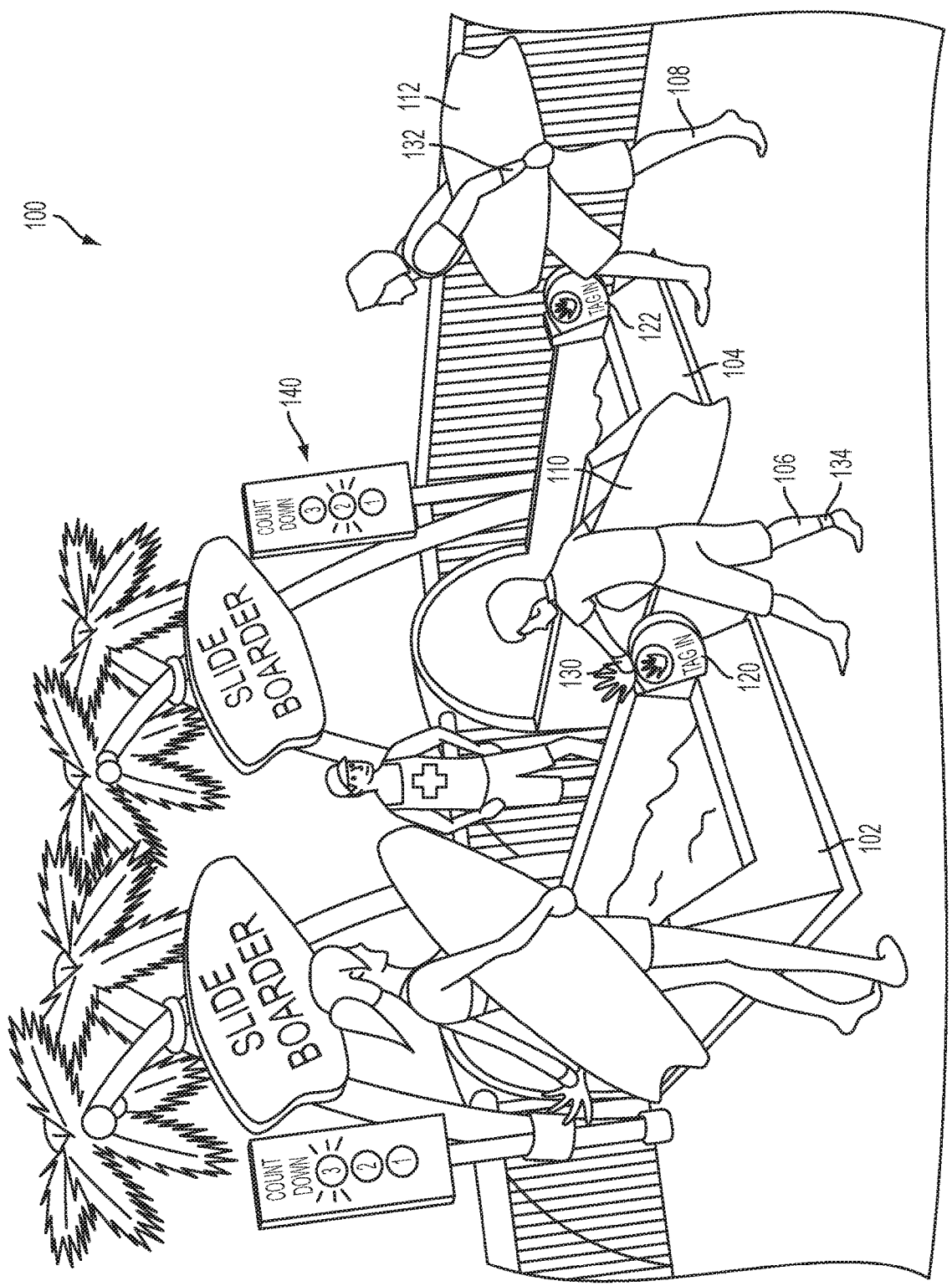
FIG. 1A shows a perspective view of an entrance to a waterslide attraction capable of incorporating skill or agility of a user riding thereon according to an embodiment of the present invention.

The detailed description of exemplary embodiments herein makes reference to the accompanying drawings and pictures, which show the exemplary embodiments by way of illustration and its best mode. While these exemplary embodiments are described in sufficient detail to enable those skilled in the art to practice the invention, it should be understood that other embodiments may be realized and that logical and mechanical changes may be made without departing from the spirit and scope of the invention. Thus, the detailed description herein is presented for purposes of illustration only and not of limitation. For example, the steps recited in any of the method or process descriptions may be executed in any order and are not limited to the order presented. Moreover, any of the functions or steps may be outsourced to or performed by one or more third parties. Furthermore, any reference to singular includes plural embodiments, and any reference to more than one component may include a singular embodiment.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The following discussion is presented to enable a person skilled in the art to make and use embodiments of the invention. Various modifications to the illustrated embodiments will be readily apparent to those skilled in the art, and the generic principles herein can be applied to other embodiments and applications without departing from the invention. Thus, embodiments of the invention are not intended to be limited to embodiments shown, but are to be accorded the widest scope consistent with the principles and features disclosed herein. The following detailed description is to be read with reference to the figures, which are not necessarily to scale, and which depict selected embodiments that are intended to teach and illustrate and not limit the scope of the invention. For convenience of description and for better clarity and understanding of the invention, similar elements in different figures may be identified with similar or even identical reference numerals. However, not all such elements in all embodiments are necessarily identical as there may be differences that become clear to persons skilled in the art when read and understood in the context of each particular disclosed preferred embodiment. Skilled artisans will also recognize the examples provided herein have many useful alternatives that fall within the scope of the invention.

FIG. 1A shows a perspective view of an entrance 100 to a waterslide attraction capable of incorporating skill or agility of a user riding thereon. A first slide or flume 102 and a second slide or flume 104 are shown adjacent to one another at the entrance 100 to the waterslide attraction. A first rider 106 may ride down the first slide 102 utilizing a first ride vehicle or slideboard 110 or other ride vehicle. Similarly, a second rider 108 may ride down the second slide 104 utilizing a second ride vehicle or slideboard 112 or other ride vehicle. In an alternative embodiment, for example, as discussed throughout, a waterslide attraction may only include a single flume or slide that is capable of tracking consecutive riders thereon instead of multiple flumes or slides.

The ride vehicles may be inflatable rafts capable of holding one or more riders, body boards, foam mats, etc. In an alternative embodiment, no ride vehicles may be used. Such a multi-slide setup may promote competitiveness between two or more riders who are allowed to race or otherwise compare their travel times from the entrance 100 to an exit of the waterslide attraction. For example, a countdown 140 may be displayed at the entrance 100 for letting the riders (106, 108) know when to begin their descent down the waterslide attraction. The countdown 140 may be a series of lights as shown, a timer that ticks down numerically, or any other type of display or cue (audible, vibration, etc.) for letting the riders (106, 108) know to begin their ride.

The first rider 106 wears a wrist band 130 that includes a tag (e.g., a radio frequency identification ("RFID") tag) that is sewn or otherwise disposed thereon or therein. Any of a variety of other tracking mechanism, as discussed throughout, may be used in an alternative embodiment. This tag is configured to interact with various sensors disposed along the waterslide attraction when the first rider 106 moves the wrist band 130 within a predetermined distance or vicinity of the various sensors while riding the waterslide attraction. When the tag is moved within the predetermined distance, score points may be generated or obtained for the first rider 106 and/or certain features of the first slide 102 may be modified, as discussed in greater detail herein. In an alternative embodiment, the tag may be fastened or worn by the rider 106 in any of a variety of other ways (e.g., ankle bracelet, headband, sewn, glued, pinned, or otherwise affixed to an article of clothing worn by the rider, etc.).

The second rider 108 similarly wears a wrist band 132 that includes a tag. The tag of the wrist band 132 includes different identification information from the tag of the wrist band 130 so that the waterslide attraction may appropriately differentiate between the two riders (106, 108), for example, for score-keeping purposes. In an alternative embodiment, the tag may be fastened or worn by the second rider 108 in any of a variety of other ways (e.g., ankle bracelet, headband, sewn, glued, pinned, or otherwise affixed to an article of clothing worn by the rider, etc.). In order to sync or setup the waterslide attraction for the riders (106, 108) prior to their descent, the entrance 100 includes a first tag-in sensor 120 corresponding to the first slide 102 and a second tag-in sensor 122 corresponding to the second slide 104. In an alternative embodiment, for example, as discussed in greater detail throughout, the tag may not be worn or connected to a rider, but instead connected with a ride vehicle used by the rider (e.g., embedded into the vehicle and/or placed thereon by the rider).

Prior to traveling down the slides (102, 104), each of the riders (106, 108) must first identify themselves to the waterslide attraction by moving their respective wrist bands (130, 132) within a predetermined distance of the corresponding tag-in sensors (120, 122). For example, an audible or visual cue may notify each of the riders (106, 108) when tag-in has been successful. In one embodiment, this may be accomplished by illuminating one of the lights of the countdown 140. As discussed in greater detail herein, for example in FIGS. 1B and/or 1C, sensors for detecting tags may be included in additional and/or alternative locations than as specifically shown in FIG. 1A (e.g., may be located at syncing stations located at or near an entrance to the waterslide attraction).

Certain riders may opt to wear additional straps or accessories containing tags. In an alternative embodiment, other methods or components may be used for identifying a rider (e.g., bio-metrics). As shown, the first rider 106 is also wearing an ankle strap 134 with a tag therein or thereon. The tag of the ankle strap 134 may be configured to have the same identification information as the tag of the wrist band 130 such that the waterslide attraction associates only one unique identification information per rider. In an alternative embodiment, the waterslide attraction may be setup such that unique identification information is tracked for different body parts of a same rider. In such a case, the tag of the wrist band 130 and the tag of the ankle strap 134 may be configured to have different identification information. Riders who desire a more complex or challenging ride on the waterslide attraction may choose to utilize a greater number of tags affixed to various clothing or accessories. An alternative embodiment may utilize any number of tags attached to or within any number of clothing accessories. Tags may additionally or alternatively be maintained within or on the ride vehicles (110, 112) as discussed in greater detail herein. In still another embodiment, the tags may be coupled with the slide while the sensors are worn by the riders or coupled with the ride vehicles.

A variety of additional or alternative components may be provided in alternative embodiments. For example, in certain embodiments, a display may be provided at an entrance, exit, and/or along a queuing line for an attraction that can display personalized information to a rider based upon sensing of that particular rider (e.g., tweets from friends if a social media account is linked for a given user, as described in more detail herein).

Figure 1B:
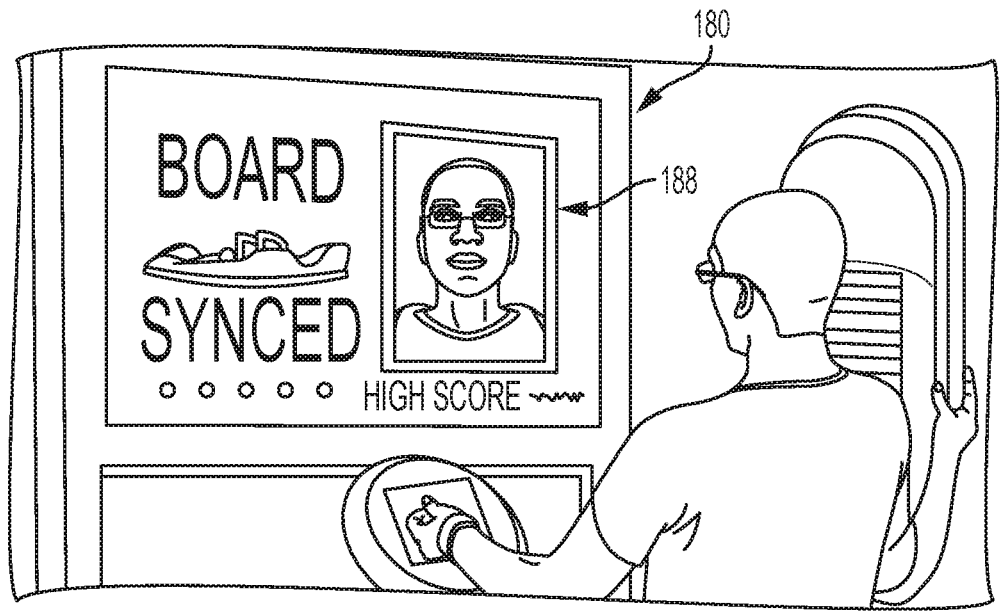
FIG. 1B shows a syncing station for the purposes of syncing a rider to the waterslide attraction of FIG. 1A according to an embodiment of the present invention.

FIG. 1B shows a registration or syncing station 180 corresponding to an amusement attraction (e.g., the same or a similar attraction as shown in FIG. 1A) that may allow a rider to slide, such as with a specially designed ride vehicle, and which is configured to be tracked by a system (e.g., a computer or other electronic system) of the amusement attraction as it traverses the ride. The syncing station 180 may operate via biometric or other individualized body detection 182, such as retinal, fingerprint recognition, etc., that is configured to register and/or sync a rider for their upcoming traversal of the amusement attraction, as discussed in greater detail herein.

Figure 1C:
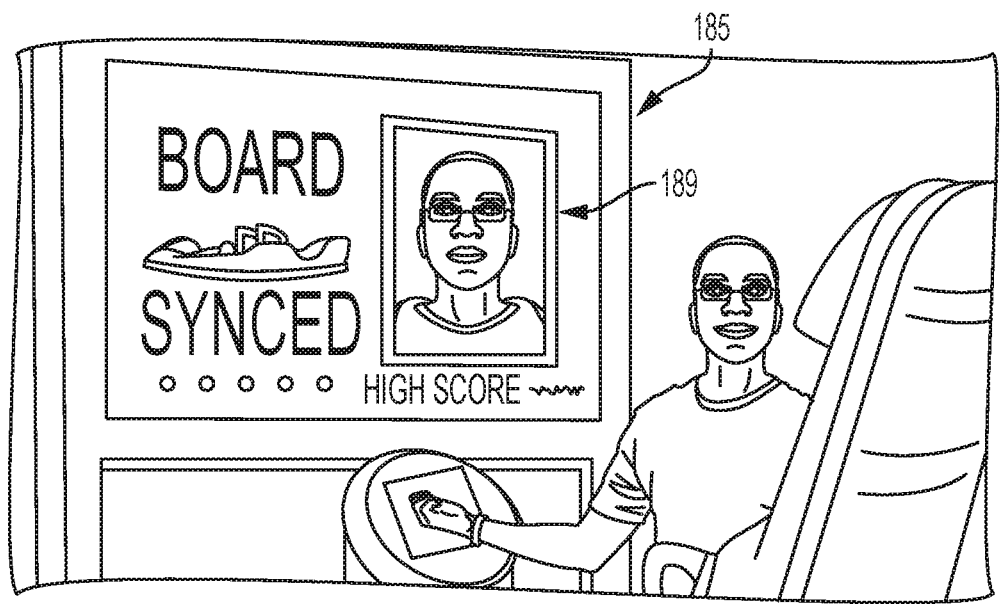
FIG. 1C shows a syncing station for the purposes of syncing a rider to the waterslide attraction of FIG. 1A according to an embodiment of the present invention.

FIG. 1C also shows a registration or syncing station 185 corresponding to an amusement attraction (e.g., the same or a similar attraction as shown in FIG. 1A), but instead of using biometric or other bodily detection, performs its detection via sensors configured to read and/or detect 187 tags (RFID, magnetic, etc.) worn or otherwise associated with a rider. For example, the tags may be embedded or otherwise connected with a card or pass that the user carries or wears (e.g., in a bracelet or necklace). In another example, the tag may be embedded or connected with clothing that the user is configured to wear. In still another example, the tag may be embedded or connected with the ride vehicle that is used by the user for traversing the amusement attraction. Both FIGS. 1B and/or 1C show embodiments of registration or syncing stations (180, 185) after successful syncing of a rider. For example, as illustrated, a screen (188, 189) may be displayed to the rider, showing various of user profile information (statistics, profile picture, etc.) combined with a successfully synced notification (e.g., visual, audible, or tactile) that lets the user know the syncing was successful and that he/she may proceed to ride the amusement attraction. In another embodiment, the registration or syncing station (180, 185) may be located at alternative locations in addition to or in replacement of the entrance to the amusement attraction (e.g., immediately before entering a flume of an amusement attraction).

Figure 1D:
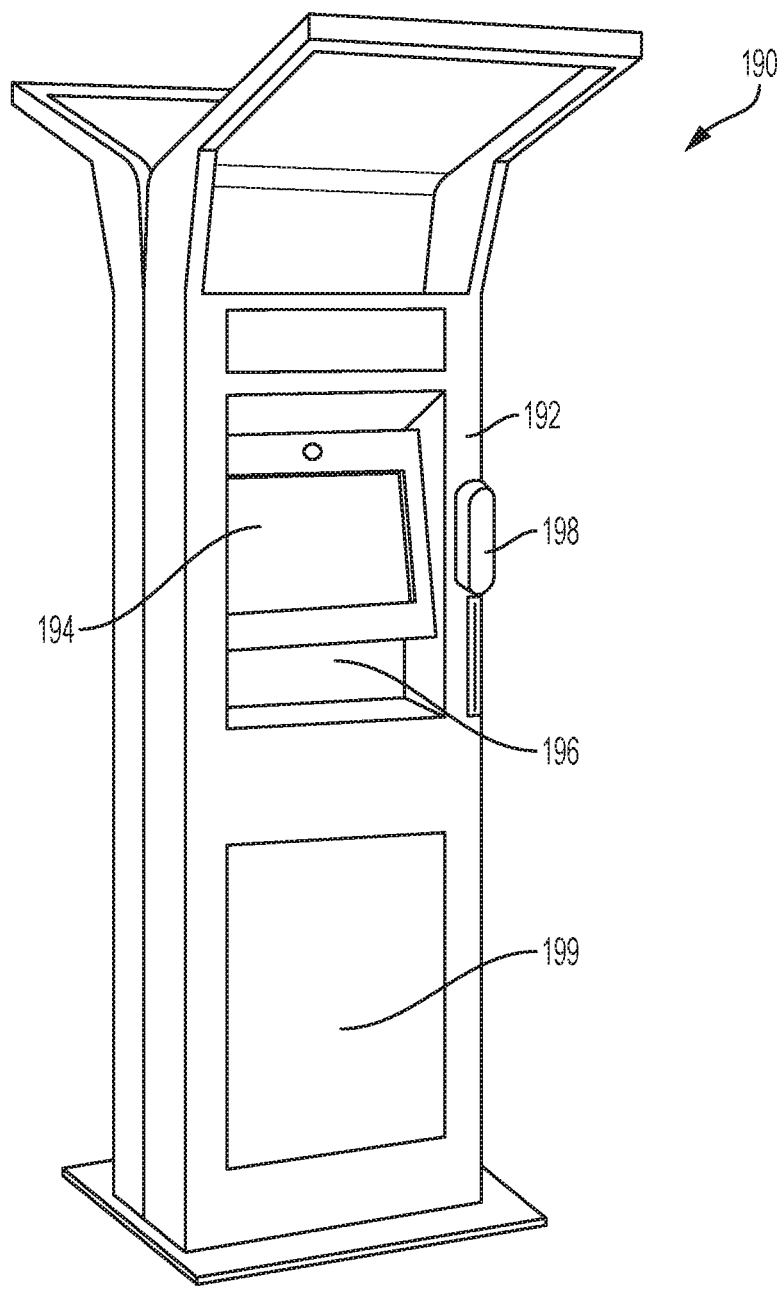
FIG. 1D shows the syncing station for the purposes of syncing a rider to the waterslide attraction of FIG. 1A according to an embodiment of the present invention.

FIG. 1D shows an embodiment of a syncing or registration station 190 for the purposes of syncing or registering a rider to an amusement attraction. For example, as previously discussed, the amusement attraction may be a waterslide attraction that incorporates lighting elements or other targets (e.g., magnetic elements) within or adjacent to a flume or ride path of a rider that may be interacted with by the rider and/or the ride vehicle or its components. For example, the lighting elements may illuminate based upon rider interaction with the ride (e.g., successfully interacting with portions of the ride, such as magnetic targets) capable of sensing when a user moves a portion of their body and/or the ride vehicle and/or manipulates a part of the ride vehicle (e.g., a button) when within a predetermined vicinity. In one example, illuminated user-manipulatable elements may be positioned upon on a ride vehicle that is configured to travel along at least a portion of the amusement attraction of FIG. 1A. Thus, when a user is within a predetermined vicinity of a target, magnetic element, or other sensor, the user may press a corresponding button in order to successfully interact or mark an interaction with the target, magnetic element, or other sensor.

In another embodiment, the lighting elements may illuminate based upon position of the rider within the amusement attraction (e.g., tracking of the ride vehicle and/or the user to determine where the ride vehicle and/or the user is located at a particular time in order to display an illumination for the user at that location. As discussed herein, an exit portion for the amusement attraction may provide a monitor or other display positioned adjacent thereto for displaying of statistics about the amusement attraction, traversal of the amusement attraction by the user or others, profile information for the user, and/or other users, etc.

For example, the syncing or registration station 190 may be positioned at or near an entrance for the amusement attraction such that a rider can sync their ride vehicle or another identifiable component prior to traveling upon the amusement attraction. This may allow, in one embodiment, tracking and/or display of user-specific statistics or characteristics for one or more runs along the amusement attraction. Such statistics may be, for example, top speed, time to completion, score, number of targets hit, etc.). Various of these statistics may be presented to the user, either upon monitors or other displays located near the amusement attraction or otherwise delivered for viewing by the user (e.g., via a mobile application upon a smartphone or other electronic device).

The syncing or registration station 190 may include a base 192 that is coupled with or otherwise includes a display 194 and a sensor or reader 196 capable of detecting and identifying the identifiable component associated with the user or the user's ride vehicle. Electronic components 199 (e.g., computing devices such as memory, a processor, network components, one or more sensors, etc.) may be contained within the syncing or registration station 190. Thus, once a user has attempted to sync using the syncing or registration station 190, information may be displayed upon the display 194 (e.g., user profile information upon a successful syncing and/or registration or a failure message if the syncing and/or registration was unsuccessful). A communication component 198 (e.g., a telephone receiver, microphone and/or speaker, video camera, etc. may also be connected with or adjacent to the base 192 to aid users who fail to successfully sync or register with the syncing or registration station 190.

One exemplary method of operation for the syncing or registration kiosk 190 may begin via a user choosing a game name or profile name and an associated password. By registering their name and password, a new record is created in a database that the kiosk may access, for example using wired or wireless communication. The user will then wait in line for the next available amusement attraction run that is associated with the kiosk 190. Once it is their turn, the user will take their ride vehicle to a syncing station (which may be incorporated into the kiosk 190 and/or may be separate kiosks or stations). The rider is then faced with a touchscreen or other input entry mechanism. The user enters their game name and password and holds the ride vehicle up to the IR communications Emitter/Receiver. The sync station has an IR Emitter that sends the user's unique identifier to the ride vehicle. The rider is then allowed to enter the entry tub or flume entrance of the water slide and the ride vehicle is synced with that rider. In an alternative embodiment, the kiosk 190 may use technology other than IR for detecting a ride vehicle being used by a rider (e.g., RFID, NFC, Wi-Fi, Proximity, Barcode, Cell Phone or Tablet Data Connection via a wearable cell phone or device, 3d cameras, GPS, Bluetooth, etc.)

Once the rider enters the attraction with their ride vehicle, the ride vehicle sends the rider's unique identifier via IR to the game system which then polls the database to see what level the rider should be given. This correct game level is then communicated back to the ride vehicle and sent to the targets in the attraction. Once this setup is complete, the rider is now enabled to enter the flume and begin the game. The registration and/or syncing kiosks 190 may communicate with an overall game system or computer system to facilitate registering and/or syncing a user with their account. In certain embodiments, the kiosk 190 may include a screen display, an input mechanism for a user to input information, and a communication mechanism. A telephone or other communication device may be present and connected with staff and/or automated systems in the case of an error or difficulty for a user during the syncing process.

Figure 2A:
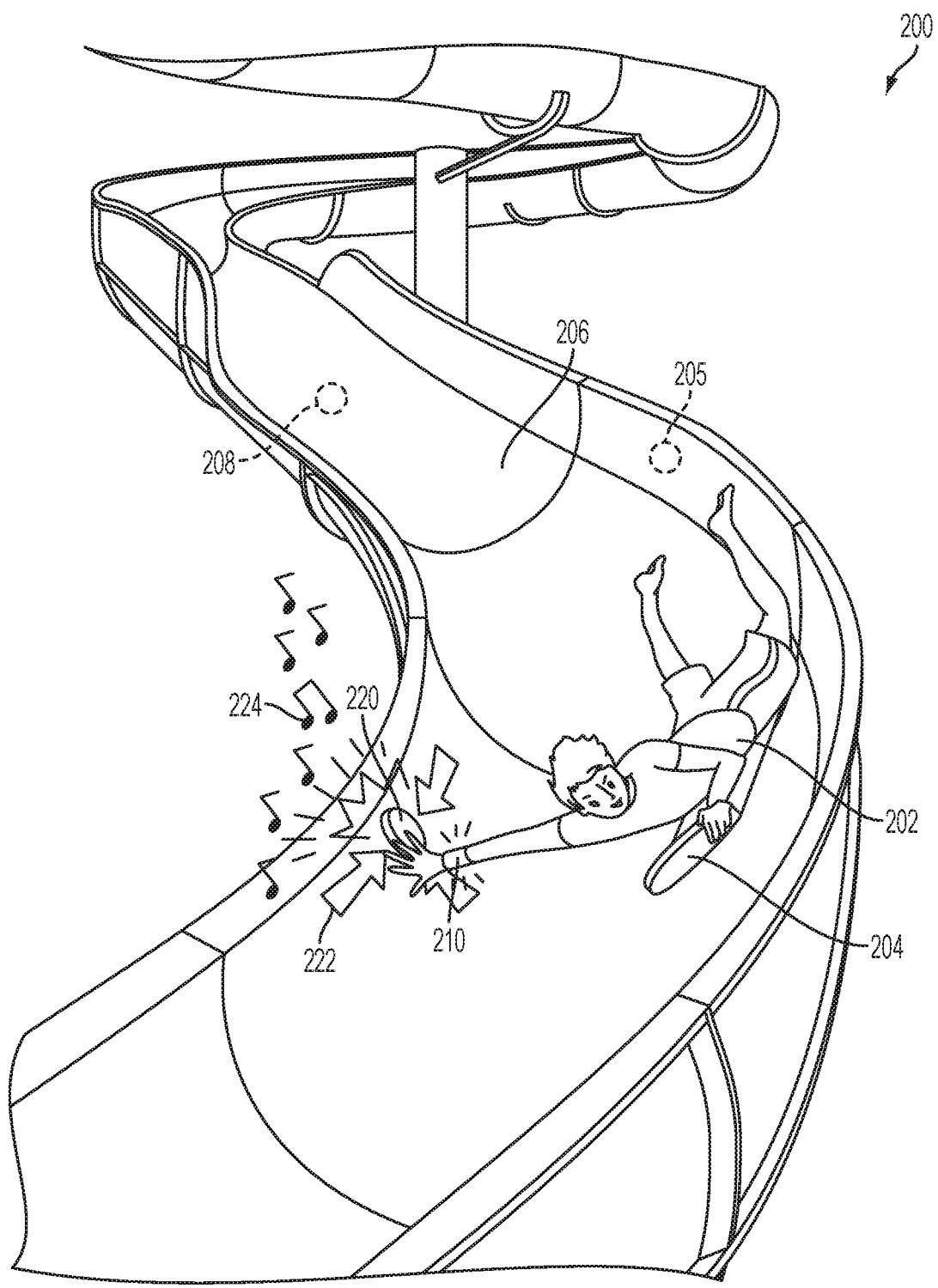
FIG. 2A shows a perspective view of a flume portion of a waterslide attraction capable of incorporating skill or agility of a user riding thereon with a ride vehicle according to an embodiment of the present invention.

FIG. 2A shows a perspective view of a slide or flume portion 200 of a waterslide attraction. The waterslide attraction may be the same or similar as previously discussed. The slide portion 200 is configured to incorporate skill or agility of a user 202 riding thereon, as discussed below. The user 202 rides the slide portion 200 in a front-facing and stomach-down position via a ride vehicle 204 that is configured to support the user 202 thereon and ride upon a flow of water flowing along a sliding surface 206 of the slide portion 200. Alternative ride positions may be used in alternative embodiments and as discussed in more detail herein. Ride vehicles may or may not be used in certain embodiments and/or may be of any of a variety of configurations. For example, multi-person luges may be utilized as the ride vehicle 204 in alternative embodiments.

In addition to manipulation of the ride vehicle 204 and/or elements of the ride vehicle, the user 202 may also have one or more tags 210 affixed thereto (e.g., via clothing, straps, or other accessories worn or coupled to the user 202) for demonstrating skill or agility while riding the slide portion 200. As described above, the tags 210 may be affixed or held by the user 202 in any of a variety of manners. For example, one or more tags 210 may be embedded or fastened with or within a controller (e.g., a videogame gamepad) with buttons or other interactive elements that a user can manipulate with their fingers and/or hands and/or other body parts as they slide down the slide portion 200. The controller can be fastened to the ride vehicle or slideboard 204 or other ride vehicle in a convenient location to allow for manipulation by the user 202 (e.g., on or adjacent to handles of the ride vehicle or slideboard 204). In certain embodiments, buttons and/or tags 210 may be coupled directly onto the handles or other portion of the ride vehicle.

The slide portion 200 may have one or more sensors 220 coupled thereto that are configured to interact with the tag 210 worn by the user 202 when the tag 210 comes within a predetermined distance of the sensor 220. This distance to the sensor for triggering may be adjusted based upon age, talent of the user, etc. In this manner, various sensors 220 may be positioned at various locations along the slide portion 200 for requiring the user 202 to either reach a limb containing a tag 210 near or adjacent to a respective sensor 220, manipulate the position of the ride vehicle or slideboard 204 within the slide portion 200 in order for the respective sensor 220 to appropriately detect the tag 210, or otherwise interact with the respective sensor 220 when the tag 210 is near or adjacent, for example, by pressing a button upon controller or gamepad or upon a portion of a ride vehicle, as previously discussed. Once detection occurs, any of a variety of features or aspects of the waterslide attraction may be modified, as discussed in greater detail herein.

The sensor 220 and/or tag 210 may include or operate via a location mechanism or method that provides locations of riders 202 as they navigate along the slide portion 200. For example, the location mechanism or method may be or may incorporate a reed switch sensor included in the sensor 220 and/or tag 210, which is activated when it moves over a magnetic sync point (e.g., magnetic sync points 205 and/or 208 illustrated in FIG. 2A) embedded at various locations along the slide portion 200. The location mechanism or method may wirelessly send the locations of riders to a system (e.g., a computer) located remote from the slide portion 200. The system may display the rider's location for viewing by others, or use this information for other purposes, for example, calculating the traveling speed based on the travel time and distance between two magnetic sync points. For example, a timer may be initiated at a start of a ride when the user 202 begins to traverse down the slide portion 200. Upon reaching a magnetic sync point (205, 208), the user 202 is sensed via the sensor 220 and/or tag 210. This information regarding sensing of the user 202 is transmitted to the system. The system is then able to determine a number of characteristics or parameters for the rider based upon the triggering of the user 202 being at a given magnetic sync point (205, 208) and the time elapsed from initiation of the timer to arrive at such location.

For example, a velocity for the user 202 may be determined. This velocity or other characteristic or parameter of the user 202 may be used to sound or display various indications along the slide portion 200 (such as visual theming or sound effects) since the location of the user 202 along the slide portion 200 can either be directly sensed via a given magnetic sync point (205, 208) or predicted based upon the system's knowledge of the slide path and the velocity or other characteristic or parameter of the user 202. Other types of location mechanisms or methods may include infrared transmission, wireless radio frequency communication, photo sensors, sonar sensors, radio frequency identification ("RFID"), proximity sensors, near-field chip ("NFC"), hall-effect sensors, and accelerometer. See, for example, US Patent Publication No. 20020080198 to Giraldin, the entire contents of which is incorporated herein by reference.

In order to identify to the user 202 how to interact with the slide portion 200, various cues may be displayed or otherwise made available to the user 202. Various functionality may be enabled or disabled as discussed in greater detail throughout (e.g., turning on/off audible or visual features of the ride, for example, to accommodate frightful children and/or special needs individuals). The sensor 220 may be embedded, flush mounted, or attached to the sliding surface 206. For identification, the component 220 may also include static light emitting diodes ("LED"), sticker/decals, color paint (including glowing paint or UV reactive paint), and/or addressable LEDs that allow a wide array of dynamic options regarding color, graphics, and animations. For example, visual indications 222 may be disposed along the slide portion 200 for indicating the presence of a sensor 220 that the user 202 may desire to interact therewith.

In one embodiment, the visual indication 222 may be a green arrow for telling the user 202 to move the tag 210 adjacent thereto. In another embodiment, different colored or shaped visual indications may represent different manners that the user should interact with the sensor 220, either by moving the tag within a predetermined distance or by pressing a button when the tag is within a predetermined distance, as discussed in greater detail below. In still another embodiment, the visual indication 222 may be a red "X" for telling the user 202 to keep the tag 210 away therefrom or that the user is positioned on a wrong side of the slide portion 200. Audible indications 224 may also be associated with the sensor 220. For example, specific tones or noises may be played near the sensor 220 for similarly advising a user 202 how to interact with the sensor 220, similar to the discussion above for the visual indications 222. Thus, audio and/or visual elements may be used for positive and/or negative indications.

Visual and/or audible notifications may also be used after a user has moved or failed to move the tag 210 within an appropriate distance from the sensor 220. For example, a particular musical tone or light may be enabled to indicate that the tag 210 was sensed by the sensor 220. Similarly, a different musical tone or light may be enabled to indicate that the tag 210 was not sensed by the sensor 220 when the user 202 was in the vicinity. In an alternative embodiment, a lack of any musical tone or light may be used to indicate that the tag 210 was not sensed by the sensor 220 when the user 202 was in the vicinity.

In some embodiments, the waterslide may comprise a flume and/or a plurality of coupled flume segments including at least one visual and/or audible notification. In some other embodiments, the waterslide may comprise a pipe or chute and/or a plurality of coupled chute or pipe segments including at least one visual and/or audible notification. In some embodiments, the water slide may comprise both flume and chute portions, each comprising one or more segments, in which at least one of the flume or chute segments or portions includes at least one visual and/or audible notification.

Figure 2B:
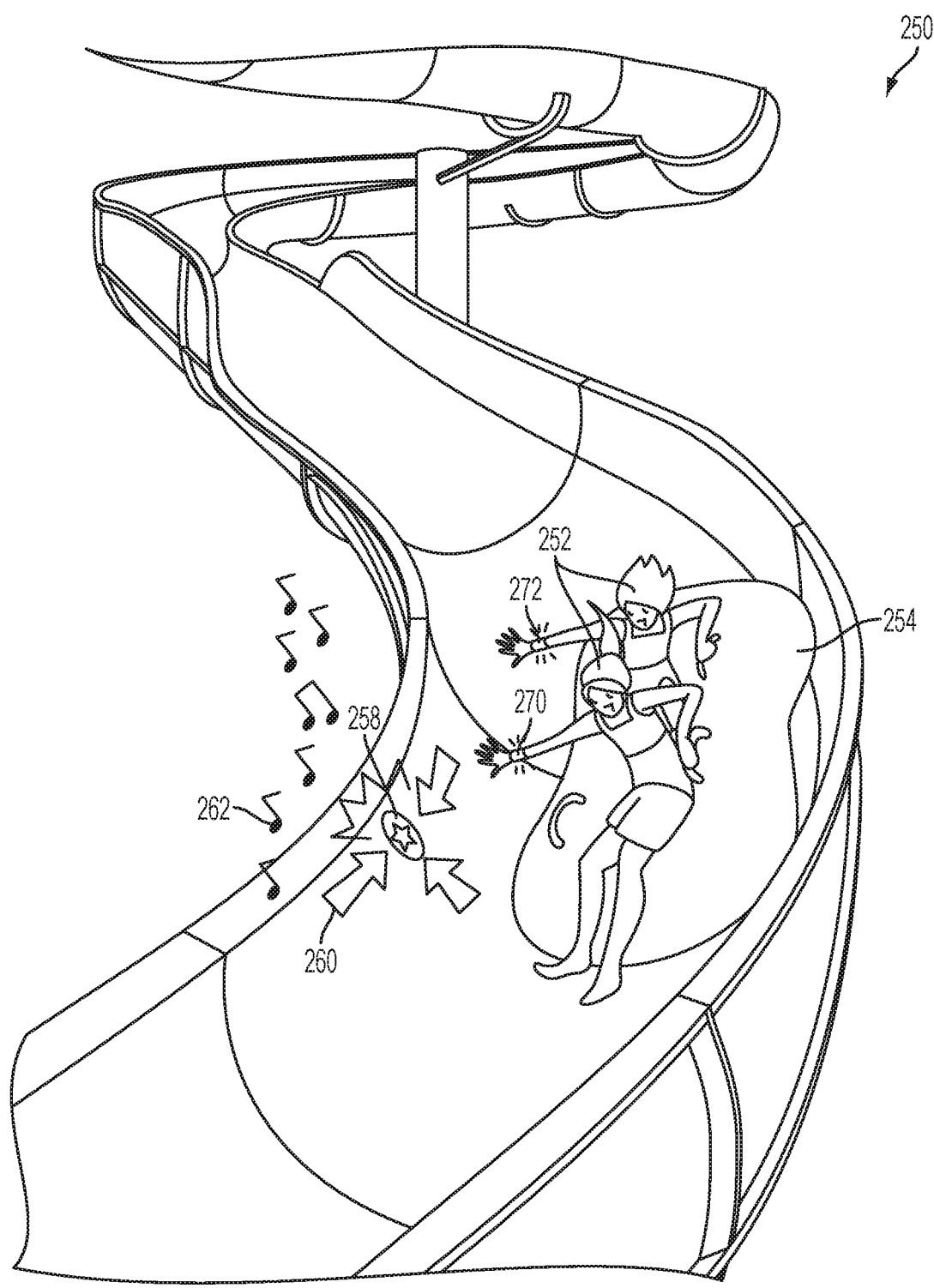
FIG. 2B shows a perspective view of a flume portion of a waterslide attraction capable of incorporating skill or agility of a plurality of users riding thereon with a ride vehicle according to an embodiment of the present invention.

FIG. 2B shows a perspective view of a slide or flume portion 250 of a waterslide attraction, similar to the discussion above for FIG. 2A, but demonstrates a plurality of riders 252 utilizing an inflated tubing device 254 for riding thereon. Some embodiments of the waterslide attraction comprise one or more features designed to attract new riders and retain riders for further multiple riding attempts. For example, some embodiments include a loyalty function that may award and/or unlock features after a certain number of rides or a certain ride time. Similar to the discussion above, visual indicators 260 and/or audible indicators 262 act in conjunction with one or more sensors 258 disposed along the slide portion 250 for sensing one or both tags (270, 272) of the plurality of riders 252.

In one embodiment, identification information may be different for the tags (270, 272), for example, to permit riders traveling together down the waterslide attraction to compete for obtaining different high scores. Different sensors and/or tags (270, 272) may be used to identify riders and allow a conventional control system to tally and/or track each rider's use of one or more waterslide attractions. In some embodiments, the rider may actuate the component (220, 258), either by moving the sensor and/or tag (270, 272) within a pre-determined distance to the component (220, 258) or by pressing a button when the sensor and/or tag (270, 272) is within a pre-determined distance to the component (220, 258). In an alternative embodiment, identification information may be the same for the tags (270, 272), for example, to permit riders traveling together down the waterslide attraction to cooperate for obtaining a single high score. In some embodiments, the ride use can be correlated with at least one award to a rider. For example, in some embodiments, after a certain number of rides, the rider may be awarded with one or more bonus rides and/or an extended ride time. In other embodiments, as the ridership of any rider increases, awards and other bonus features awarded to the rider can be increased. Persons skilled in the art will readily appreciate that any or all of these functional features may be readily carried out through one or more software programs associated with the ride control system and/or an external computer tracking system associated with the water ride.

Any of a variety of water riding devices may be utilized in alternative embodiments. For example, although a ride vehicle (204, 254) or an inflatable tube with particular features or characteristics is shown in FIGS. 2A and/or 2B, respectively, certain embodiments may utilize other mats, ride vehicles, or riding surfaces in addition thereto or alternatively therefrom. For example, FIGS. 19A-19D illustrate yet another embodiment of a possible ride vehicle. Sensors and/or tags can be included within or on a water ride vehicle in addition to or in replacement of the tags worn by riders.

As discussed throughout, activation mechanisms (e.g., buttons, switches, knobs, or other interactive elements, etc.) that may be activated or manipulated by a user can be coupled directly with or embedded in a portion of a riding vehicle (e.g., on or near handle bars). Thus, as a user slides down the waterslide on the riding vehicle, if a visual indicator lights up a blue color when the user is within a vicinity of a sensor, the user may activate (e.g., press) a corresponding activation mechanism (e.g., a blue button) that is coupled with the riding vehicle. In another embodiment, no water riding device may be utilized, instead allowing a rider to travel down the waterslide attraction using only their own body. No tags may be necessary in certain embodiments, such as those rides which utilize gamepads or controllers, similar to those described above.

In examples discussed throughout, various of the targets may have differing shapes, colors, sizes, etc. for indicating difficulty level and a correspondingly different point or score allocation for hitting them. In certain embodiments, as discussed throughout, targets may not be physical components, but rather audible and/or visual illuminations, such as lighted projections, upon a surface. Riders can manipulate the ride vehicle to hit the desired targets, for example by shifting their weight (e.g., pressing down to counteract a lifting force to trigger a sensor, pulling or pushing on one or more of the handles to steer the ride vehicle towards or away from targets, etc.). Manipulation of the ride vehicle can also occur, for example, by pressing a button or other interactive element coupled with the ride vehicle that corresponds to the desired target (e.g., a button with the same shape and/or color as the target) as the ride vehicle passes within a predetermined vicinity of the target. In this manner, riders may ride the ride without taking their hands off of the handles or other grasping locations of the ride vehicle, instead steering the ride vehicle towards a particular target by applying pressure, leaning their body, or otherwise manipulating the travel direction or elements of the ride vehicle. Such operation prevents users from having to explicitly let go of the ride vehicle or move one of their body parts away from the ride vehicle to activate a target. Ride vehicles designed for multiple individuals to ride at once may require more than one rider to act cooperatively in order to effectively maneuver the vehicle to reach certain targets. The sensor targets may be distributed through various curves or drops of the slide path, the accumulated points displayed for each rider upon exiting the slide. Bonus points may also be awarded for hitting a particular number of targets in a row or in a particular sequence.

Likewise, the slide path for one or more riders to travel along may include singles paths, dual paths, or a plurality of paths. In addition, waterslides or other water attractions that are currently in existence may be retrofitted with such sensor targets, thereby giving new life to older water attractions by permitting a sense of competitiveness within older rides (e.g., reaching a fastest speed, reaching a tallest height, etc.). Certain slide configurations may provide for sensor targets to be built into the slide path for allowing a rider to accumulate points upon riding over the sensors with actuating devices or other sensed elements built into a ride vehicle utilized by the rider, even without any other speed-boosting or speed-decreasing features. Preferably, the ride vehicle will be a mat having handles and a shape or configuration for allowing the rider to manually position or orient the mat as desired while lying face-forward and stomach-down upon the mat. Alternative embodiments for the ride vehicle may allow for vehicles supporting a rider feet first upon their back and any of a variety of shapes for tubing devices or other ride vehicles as desired.

Figure 3A:
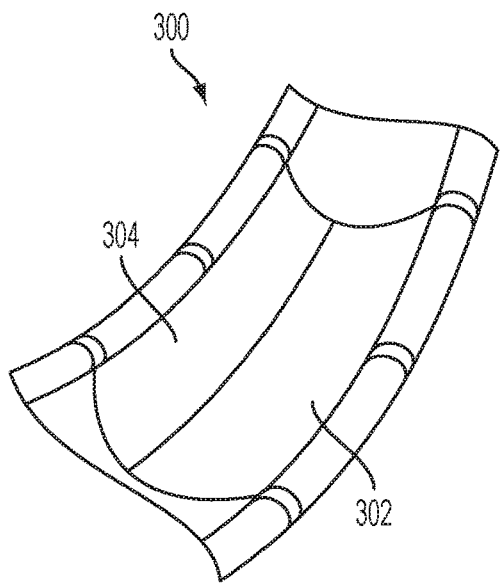
FIG. 3A shows a perspective view of a segment of a waterslide attraction utilizing a plurality of surfaces for incorporating rider skill or agility during use according to an embodiment of the present invention.
Figure 3B:
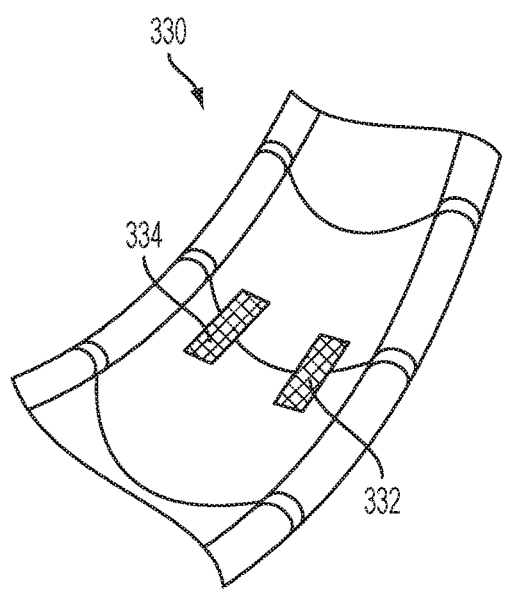
FIG. 3B shows a perspective view of a segment of a waterslide attraction utilizing a plurality of magnetic plates for incorporating rider skill or agility during use according to an embodiment of the present invention.
Figure 3C:
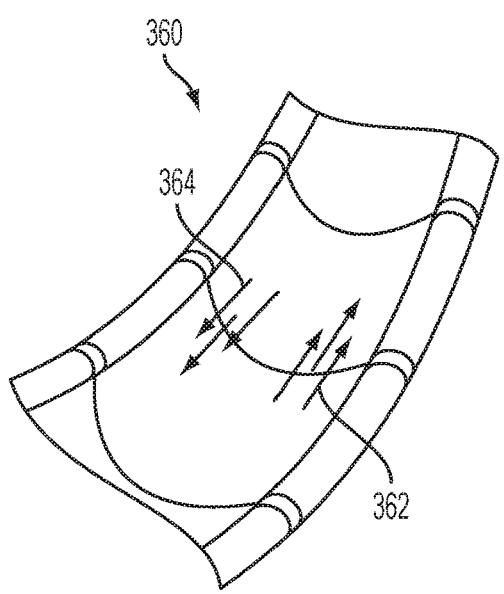
FIG. 3C shows a perspective view of a segment of a waterslide attraction utilizing a plurality of water jets for incorporating rider skill or agility during use according to an embodiment of the present invention.

FIGS. 3A-3C demonstrate a variety of possible features of a waterslide attraction that may interact with or be modified by a rider traveling thereon. The waterslide attraction may be the same as or similar to those previously discussed. Looking first at FIG. 3A, a perspective view of a slide segment 300 of a waterslide attraction utilizing a plurality of different surfaces is shown. A first surface 302 is configured to provide a lessened resistance to movement of a board, tube or human body sliding thereon than a second surface 304. For example, the first surface 302 may be constructed with an outer surface that is smoother, made of a different material or covered with a different wax than that of the second surface 304. A board, tube or human body sliding on the first surface 302 would thus be permitted to travel there along at a higher rate of speed than if the board, tube or human body were sliding on the second surface 304. In this fashion, manipulation by the rider of their position on the slide segment 300 may result in a faster or slower rate of speed along the slide segment 300.

FIG. 3B shows a perspective view of a slide segment 330 of a waterslide attraction utilizing plates or components (e.g., magnetized sheets or electrified elements) disposed along or under a surface of the slide segment 330. A first plate 332 may be configured to provide a boost of speed to a board or tube that travels adjacent thereto or upon activating one or more sensors upstream thereof (e.g., by successfully pressing a button on a gamepad or embedded on the ride or tube in response to a visual indicator when passing within a vicinity of a particular sensor). For example, a corresponding plate or other component within or affixed to the board or tube may interact with the first plate 332 such that the board or tube is propelled with additional speed down the slide segment 330 of the waterslide attraction. A second plate 334 may alternatively be configured to provide a reduction of speed to the board or tube that travels adjacent thereto or upon failing to activate one or more sensors upstream thereof. For example, a corresponding plate or other component within or affixed to the board or tube may interact with the second plate 334 such that the board or tube is slowed in its movement down the slide segment 330 of the waterslide attraction. In this fashion, manipulation by the rider of their position on the slide segment 330 may result in a faster or slower rate of speed along the slide segment 330.

FIG. 3C shows a perspective view of a slide segment 360 of a waterslide attraction utilizing jets (e.g., water jets or air jets) disposed along or flush with a surface of the slide segment 360. A first jet 362 may be configured to provide a boost of speed to a board or tube that travels over or near the first jet 362 or upon activating one or more sensors upstream thereof. For example, the first jet 362 may be configured to flow water or air in substantially the same direction as water already flowing on the slide segment 360 such that the board or tube is propelled with additional speed down the slide segment 360. A second jet 364 may alternatively be configured to provide a reduction of speed to the board or tube that travels over or adjacent thereto or upon failing to activate one or more sensors upstream thereof. For example, the second jet 364 may be configured to flow water or air in substantially the opposite direction as water already flowing on the slide segment 360 such that the board or tube is propelled with additional speed down the slide segment 360. In this fashion, manipulation by the rider of their position on the slide segment 360 may result in a faster or slower rate of speed along the slide segment 360. In alternative embodiments, instead and/or additionally to having fluid flow in opposition to rider movement for slowing a rider down, fluid may be caused to pool in greater amounts at certain locations to act as a brake for slowing the rider's movement.

Thus, in reference to each of FIGS. 3A-3C, a user riding upon the board or tube may manually direct the board or tube over or adjacent to the speed-increasing features (i.e., the first surface 302, the first plate 332, the first jet 362) while trying to avoid the speed decreasing features (i.e., the second surface 304, the second plate 334, the second jet 364) in order to speed up the rate of movement of the board or tube traveling down the waterslide attraction. In an alternative embodiment, a tag coupled with the user may interact with the speed-increasing or speed-decreasing features rather than a component of a ride vehicle (e.g., the user may position their arm or leg coupled with the tag in a vicinity of a sensor along the waterslide attraction to enable a speed-increasing feature).

Such operation may reduce the overall time traveling down the waterslide attraction and provide for a more thrilling experience. Moreover, if the waterslide attraction is configured to keep track of a user's elapsed time, skillfully maneuvering over speed-boost features may result in a quicker total time for competitive or racing considerations. Each of the features discussed in FIGS. 3A-3C may be configured in a variety of combinations or configurations as desired. Each of the features discussed in FIGS. 3A-3C may be additionally be identified to a user via cues (e.g., visual or audible), the same or similar as previously discussed. Thus, speed-boosting or speed-slowing portions of the waterslide attraction will be identifiable by a rider for the use of their skill or agility to obtain a faster or more thrilling experience.

Figure 3D:
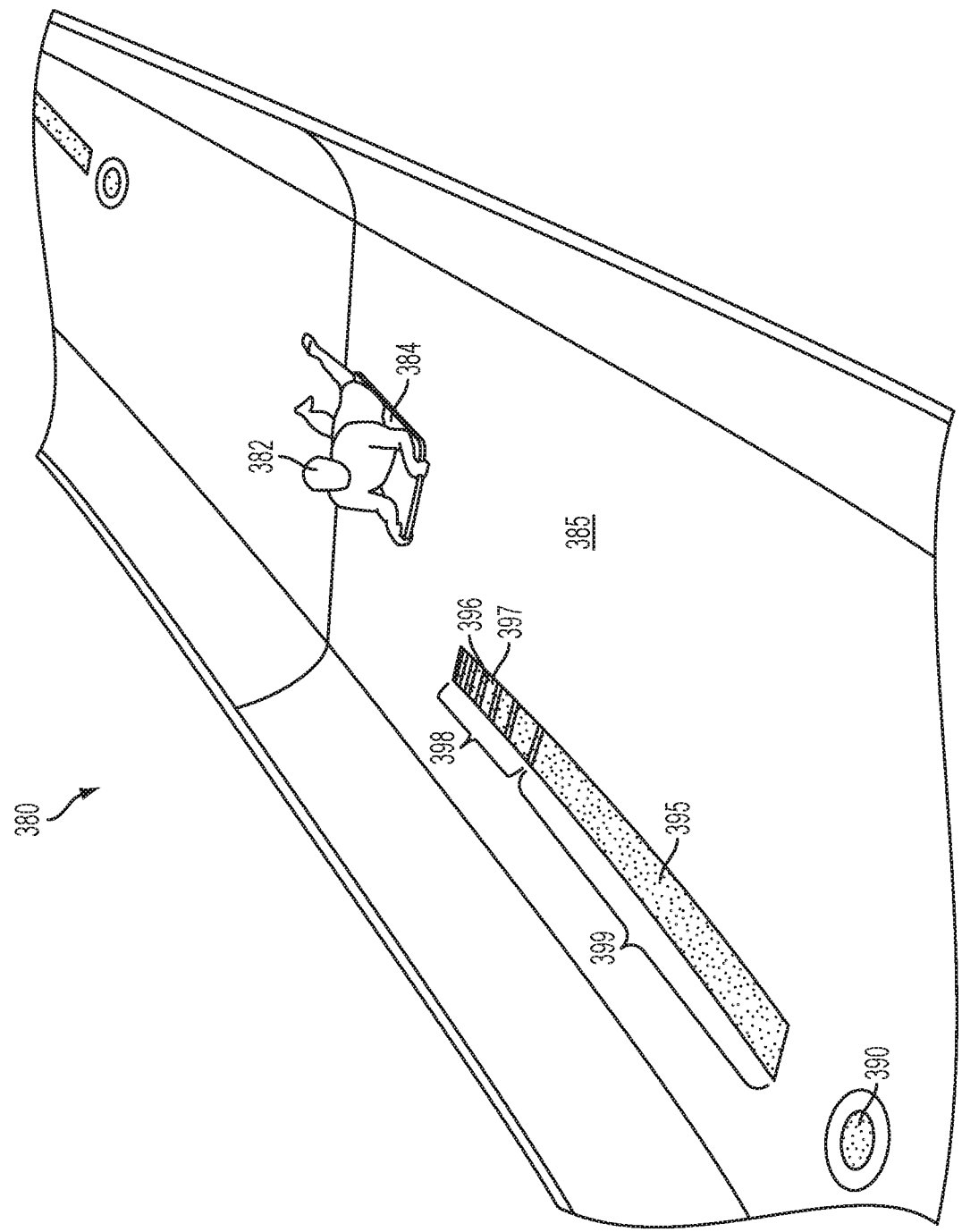
FIG. 3D shows a perspective view of a segment of a waterslide attraction utilizing a maneuvering strip for incorporating rider skill or agility during use according to an embodiment of the present invention.

FIG. 3D demonstrates a slide segment 380 of a waterslide attraction utilizing a maneuvering strip for incorporating rider skill or agility. The slide segment 380 has a wide sliding surface 385 upon which a rider 382 engaged with a ride vehicle 384 may slide upon and has room to accommodate rotation of the ride vehicle 384 and the rider 382. A maneuvering strip 395 is disposed along a portion of the sliding surface 385 and is made of a material configured (e.g., laid over the slide in key locations) to exert a higher frictional force upon the ride vehicle 384 when contacting the ride vehicle 384. Thus, when a sensor 390 (e.g., an RFID reader and/or indicator) is located in or on the sliding surface 385 of the slide segment 380, the rider 382 may skillfully manipulate the ride vehicle 384 such that a portion of the ride vehicle 384 engages with the maneuvering strip 395. This engagement causes rotation of the ride vehicle 384 due to the greater frictional force exerted on a first area of the ride vehicle 384 by the maneuvering strip 395 versus the lower frictional force exerted on a second area of the ride vehicle 384 by the sliding surface 385.

The maneuvering strip 395 may be made up of discrete materials capable of exerting differing amount of frictional force upon the ride vehicle 384. For example, a first material 396 may have a higher frictional coefficient than a second material 397. As shown, the rider 382 may obtain a faster or greater rate of rotation upon initially hitting the maneuvering strip 395 in a first area 398 having a greater amount of the first material 396. The rider may obtain a slower or lessened rate of rotation upon hitting the maneuvering strip 395 in a second area 399 having a lesser amount of the first material 396. Thus, by using such maneuvering strips 395, the rider 382 may desirably orient the ride vehicle 384 so that a particular portion or location of the ride vehicle 384 is adjacent to the sensor 390 (e.g., an RFID tag located on a side location of the ride vehicle 384 may be controlled to pass over the sensor 390). In an alternative embodiment, any of a variety of methods for allowing a user to control the orientation of a ride vehicle may be employed (e.g., magnetic strips, water or air jets, etc.)

Figure 4:
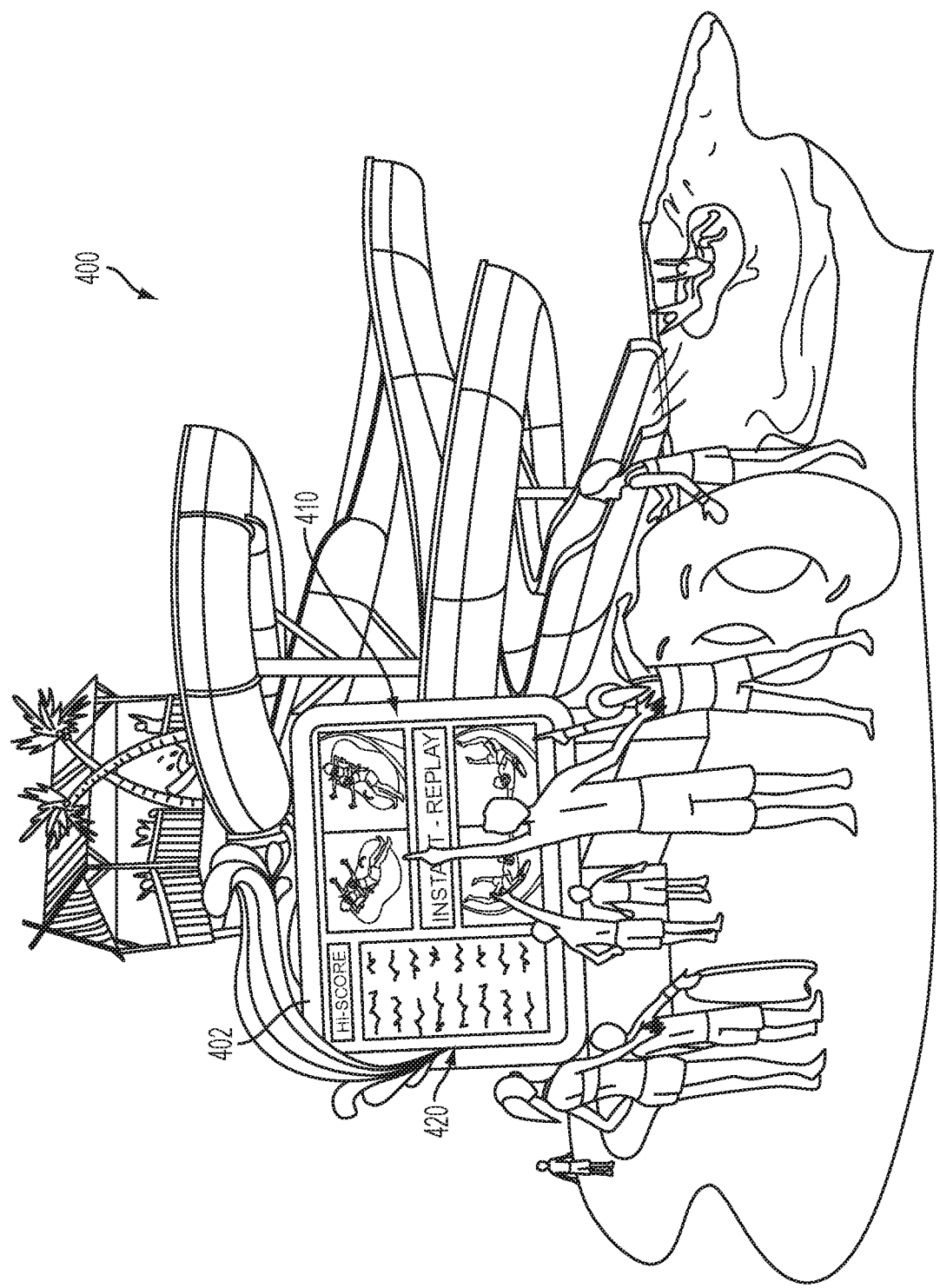
FIG. 4 shows a perspective view of an exit from a waterslide attraction capable of incorporating skill or agility of a user riding thereon and having a scoreboard according to an embodiment of the present invention.

FIG. 4 next shows a perspective view of an exit 400 from a waterslide attraction capable of incorporating skill or agility of a user riding thereon. The waterslide attraction may be the same as or similar to those previously discussed. One method of showcasing the skill or agility of these users is via a scoreboard 402 displayed to the users after they exit from the waterslide attraction. The scoreboard may have an instant replay section 410 and a scoring section 420, as discussed in greater detail below.

The instant replay section 410 provides riders the ability to view their performance after completing a ride down the waterslide attraction. For example, a tracking system (e.g., utilizing sensors for detecting a presence of tags worn by the rider or coupled with a ride vehicle supporting the rider, as discussed throughout) may keep record of the traversal by the rider down the waterslide attraction. Depending upon the detection of the tags in the vicinity of the sensors, a travel path down the waterslide attraction may be ascertained. This travel path may then be animated using an avatar representing the rider and displayed on the instant replay section 410 of the scoreboard 402. In certain embodiments, a rider may decide to keep a copy of the instant replay, for example, by downloading it to a personal electronic device (smart phone, tablet, etc.) for future viewing. An alternative embodiment may utilize one or more cameras or video cameras positioned along the waterslide attraction for determining and/or showcasing rider travel path.

The scoring section 420 of the scoreboard 402 provides riders the ability to view a tally or score after completing travel down the waterslide attraction. For example, points may be accumulated by successfully manipulating a ride vehicle with a tag or a tag worn by a rider within a predetermined distance of one or more sensors positioned along the waterslide attraction. Certain sensors may be worth more points than other sensors, thereby allowing riders with better skill or agility in reaching those sensors to achieve higher scores. In addition or alternatively, scores may be obtained based upon elapsed time of travel from the entrance of the waterslide attraction to the exit. Thus, riders who successfully navigate speed boosters or successfully avoid speed reducers along the waterslide attraction (for example, as discussed above) may achieve a higher score indicative of their lower elapsed time. Encouraging such competitive characteristics makes such waterslide attractions into a potential event for contests, sports, teams, leagues, etc.

Any of a variety of possibilities for information and/or statistics may be displayed upon the scoreboard 402 in various embodiments. For example, high scores (e.g., daily, weekly, monthly, yearly, for all-time, etc.) for one or more users of the amusement attraction may be displayed (e.g., to foster a sense of competition and encourage future runs of the amusement attraction in order to obtain the top score). These high scores may be local in nature, regional, worldwide, etc.

In one embodiment, the current rider may be displayed at the top and/or in larger font to become more prominent while past riders with their associated scores may be displayed adjacent to the current rider for comparison purposes. In another embodiment, a photograph may be displayed of the rider (e.g., taken during ride traversal and/or previously stored as part of a user's account or profile) on the scoreboard 402. If taken during ride traversal, this photograph may be emailed or otherwise sent to the user and/or posted (e.g., with a score) on a social media account linked for the user. In certain embodiments, one or more amusement attractions may have predefined "achievements" or "goals" associated therewith (e.g., successfully engage with a particular or particular number of targets, successfully hit a certain speed while traversing a ride, etc.) and an indication of one or more rider's success and/or progress in achieving these "goals" may be displayed upon the scoreboard 402. Levels or awards (e.g., level number, badges, medals, etc.) may correspond to successful completion of certain predefined goals or criteria. Profile information (e.g., username, title, nickname, etc.) that is associated with a particular rider may be shown. As previously mentioned, in addition to or in replacement of a scoreboard, one or more of the above possible data may instead be provided to a user via a mobile application.

Figure 5A:
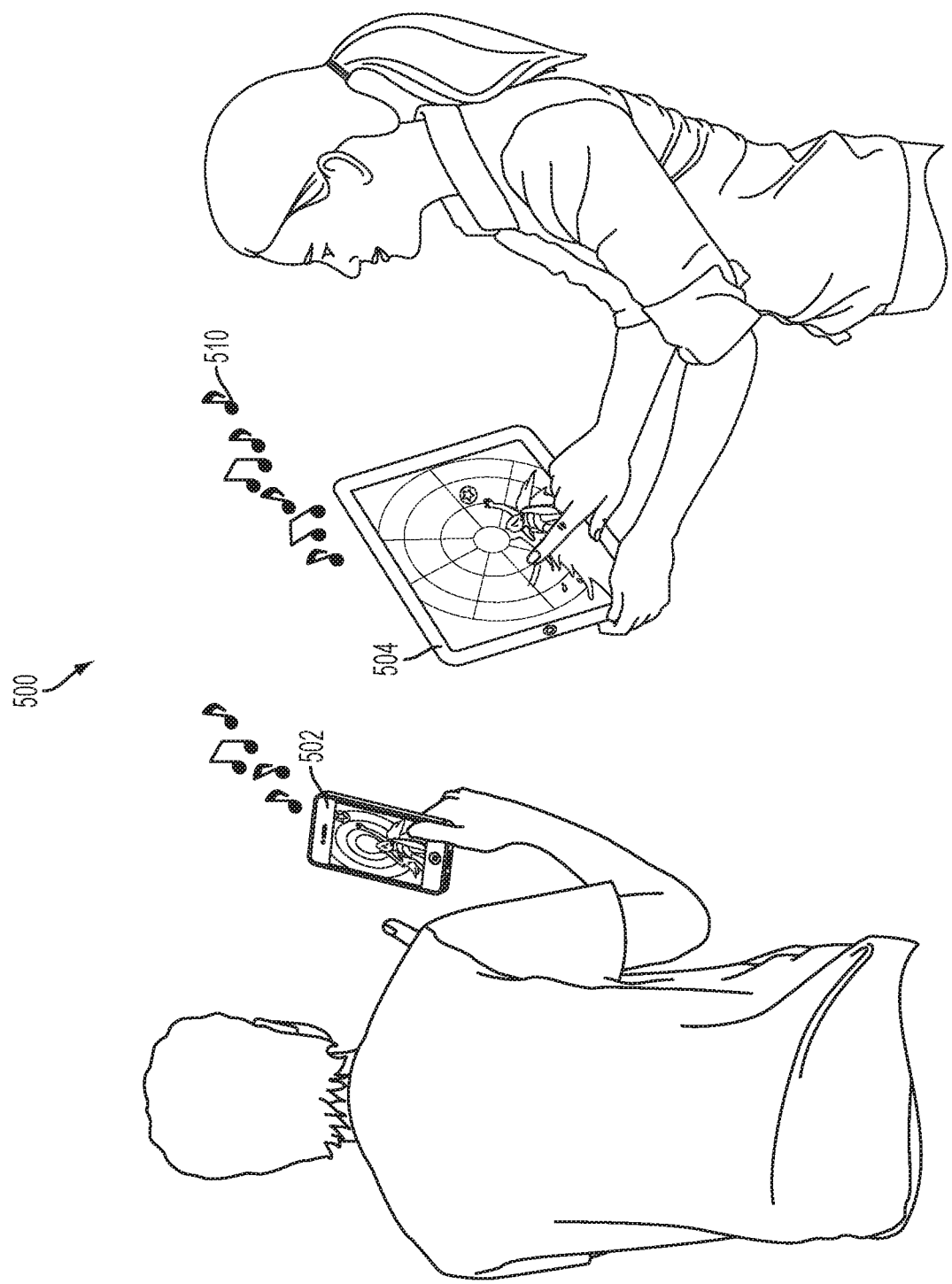
FIG. 5A shows a plurality of mobile applications corresponding to a waterslide attraction capable of incorporating skill or agility of a user riding thereon according to an embodiment of the present invention.

FIG. 5A shows the use of a mobile application 500 corresponding to a waterslide attraction capable of incorporating skill or agility of a user riding thereon. The waterslide attraction may be the same as or similar those previously discussed. The mobile application 500 may be configured to run on smart phones 502, tablets 504, or any of a variety of other electronic devices, such as laptops. The mobile application 500 may be adapted to display a history of scores or points accumulated for each attempt of a particular waterslide attraction, display of the highest score achieved for the waterslide attraction, and/or an animation or video showcasing a replay of one or more attempts of the waterslide attraction (e.g., based upon data received after traversal along a participating amusement attraction). Not only can the mobile application 500 provide a fun keepsake for memorializing a day at a waterpark, but more competitive individuals may use the replay functions or other features of the mobile application 500 to better improve their scores or elapsed time in subsequent attempts of the waterslide attraction. For example, the mobile application 500 may keep track of precisely which sensors were "hit" (e.g., when a rider tag was moved within a predetermined vicinity) and which sensors were "missed," thus allowing a user to study past attempts and learn from prior mistakes. If button presses in addition to sensor vicinity are used by the waterslide attraction, similar to the descriptions above, the mobile application 500 may additionally keep track of which button presses were successfully manipulated.

Music 510 or other audible sounds may accompany a replay shown by the mobile application 500. In certain embodiments, a user of the mobile application 500 may be permitted to choose their own music for a given replay, for example, to save and show off a particularly impressive run. The mobile application 500 may also include a game with a waterslide layout being the same or similar to a corresponding waterslide attraction so that users can manipulate an avatar to "hit" sensors, enable speed boosters, etc., the same or similar as on the actual waterslide attraction. Visual and audible notifications may accompany the game to provide a fun video gaming experience. Such mobile applications 500 may allow users to download particular ride configurations (e.g., mobile applications may be created for particular waterparks) that mirror actual attractions, for example, so that potential riders can practice on the mobile application 500 before arriving at a given water attraction. Such mobile applications 500 may allow high scorers to receive videos and pictures as rewards for their accomplishments or to have the pictures tweeted and/or posted to social media sites, such as Twitter, Facebook, Google+, etc.

Figure 5B:
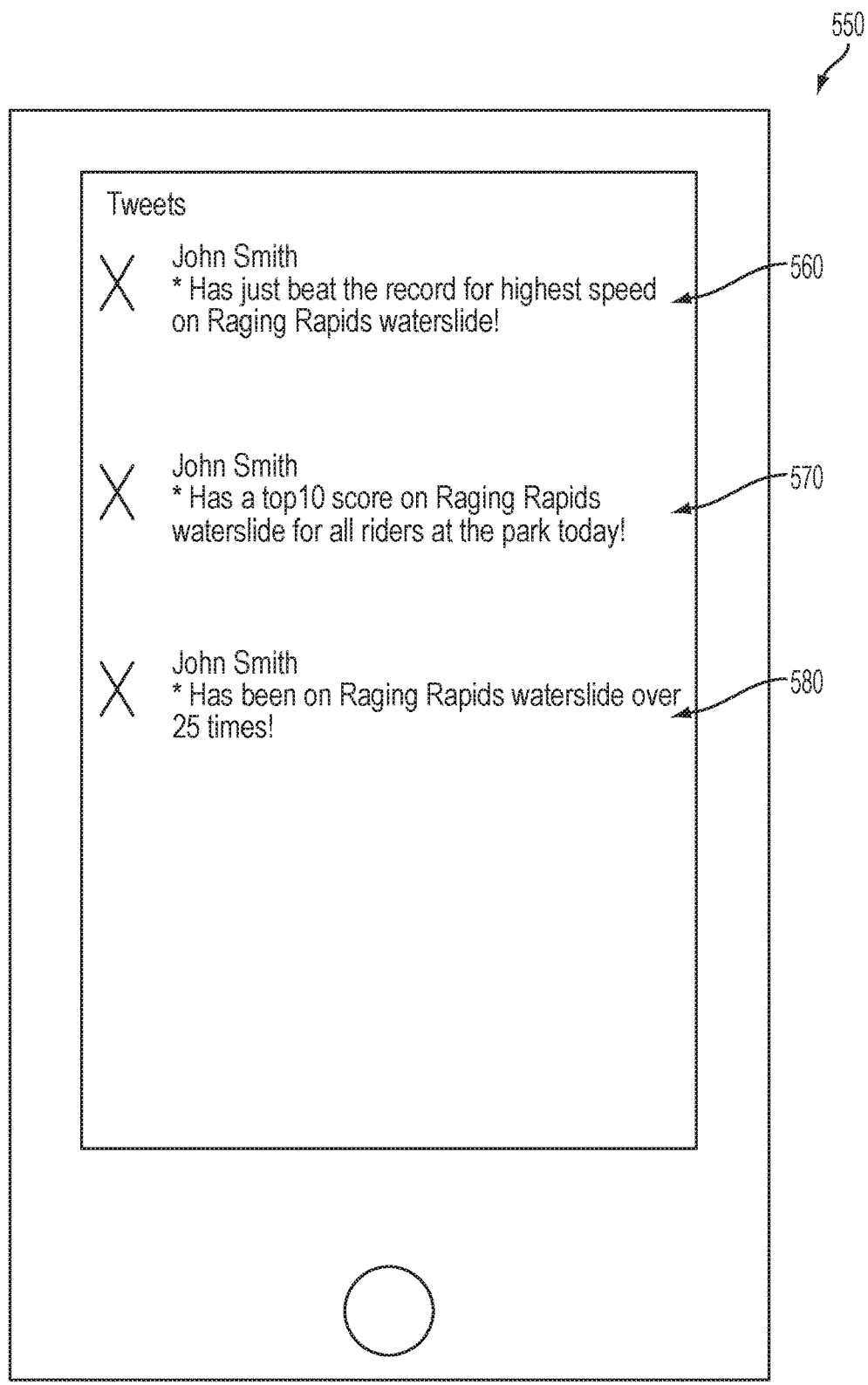
FIG. 5B shows a display of a social media account linked with a waterslide attraction according to an embodiment of the present invention.

Turning next to FIG. 5B, a display 550 of a social media account or device linked with a waterslide attraction is shown. The waterslide attraction may be capable of incorporating skill or agility of a user thereon and may include features that are the same as or similar to those previously described or discussed further herein. For example, various statistics may be tracked or generated by the waterslide attraction or a system interfacing with the waterslide attraction based on tags (e.g., RFID tags) worn by a user riding on the waterslide attraction or integrated into a ride vehicle. These statistics may be data such as score of the user, speed of the user, elapsed time of the user, number of times the user has been on the attraction, etc. Notifications may be provided to the user (e.g., via their mobile device) based upon certain user statistics (e.g., "You left the amusement park two hours ago and rode on ten rides, would you like to see your scores?," "Your friend John Smith rode Ride1 and received this high score."). The mobile application may incorporate a leaderboard where a user can challenge other users and/or immediately participate in attempts to obtain their own high score for a particular activity (e.g., a "Play Now!" button). If a user had a high score that was recently surpassed by a friend and/or another user, the mobile application may notify the user and allow them to immediately try to retake the position.

Users may also be configured to engage in other social activities with other users, in alternative embodiments. For example, a first user may choose to "sponsor" a second user to ride a real-life ride for him (e.g., if the first user is in a geographically remote location from the real-life ride). In-app currency or other incentives (e.g., "followers") may be awarded by being sponsored or sponsoring other users. The mobile application may also allow for "hidden" score-boosting activities on real-life rides (e.g., playing a virtual simulation of a real-life ride within the mobile application may display an indication during play, such as a "sparkle" at a predetermined location along the virtual travel path indicating to the user that a button or other interaction may be manipulated at that location in the real-life ride for extra points, although there may not necessarily be any indication while on the real-life ride that points can be earned at that location).

To allow users to easily or conveniently share their performance or these statistics with friends and family, a social media account or other user profile may be linked with or configured to receive signals from the waterslide attraction or its interfaced system. In one example, as shown, a twitter account for the user may be associated with one or more tags connected to the user or the ride vehicle for enabling the waterslide attraction to automatically post information to the user's account based upon ride participation. As shown, a first message 560 indicating that a user (e.g., "John Smith") has beat the record for highest speed on a particular waterslide (e.g., "Raging Rapids") may be automatically transmitted by the waterslide attraction to the user's associated account when the waterslide attraction determines a new speed record for the user has been accomplished based upon the tracked or generated statistics. A second message 570 indicating that the user has received a top 10 score on a particular waterslide out of all visitors at the park in a given day may be automatically transmitted by the waterslide attraction to the user's associated account by comparing the tracked or generated statistics for the user to the tracked or generated statistics for all other users at the park. A third message 580 indicating that the user has been on a particular waterslide more than a predetermined number of time (e.g., 25) may be automatically transmitted by the waterslide attraction to the user's associated account upon such a determination by the waterslide attraction based upon the tracked or generated statistics.

The above messages are merely exemplary and any of a variety of automated messages or other data may be sent or posted to a user's associated account. Moreover, other forms of social media or other accounts in addition or alternatively to a twitter account may also be utilized (e.g., Facebook, Google+, email, etc.) for the sharing of user statistics. Furthermore, data may be shared to a user's account that is not based upon user statistics generated by the ride. For example, a still camera or video camera may be incorporated onto a waterslide attraction that takes a user's photograph or a video clip while the user rides the waterslide attraction, the photograph or video clip available for upload to the user account. Such photography may allow for older water or amusement rides to be easily retrofitted to utilize media sharing, but without a large expense in incorporating readers, triggers, or other such components for statistic generation.

The uploading or transmittal of messages, photographs, video clips, or other data may be free of charge to the user, may require an additional fee consented to by the user (for example, after ride completion), or may result from a heightened fee charged to the user upon entrance to the park. The associated account of a user may be determined by the ride attraction via a trigger device worn or otherwise disposed on the user that contains the relevant account information and capable of being read by sensors or readers of the waterpark or waterslide attractions. In one embodiment, RFID tags worn by the user or contained in a ride vehicle utilized by the user for generating the various ride statistics or data may also contain information for associating with the user's account.

Figure 6A:
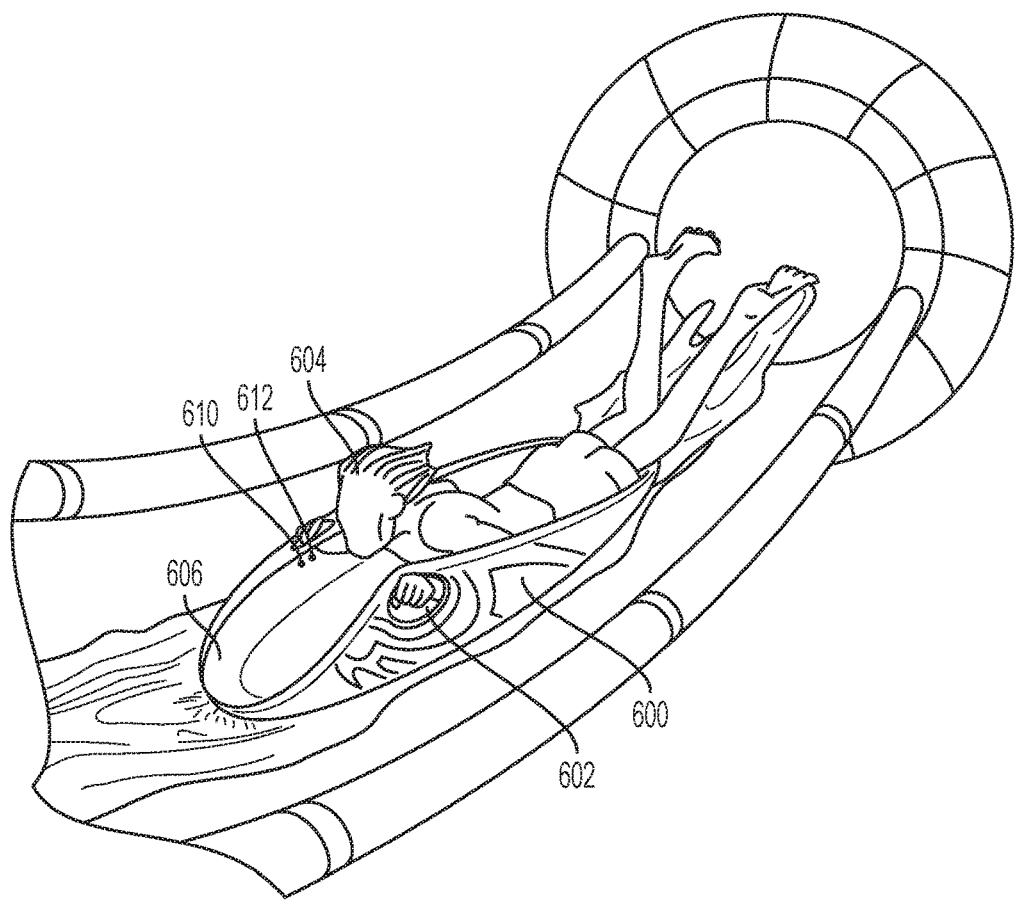
FIG. 6A shows a perspective view of a segment of a waterslide attraction in use by a rider for demonstrating a ride vehicle layout according to an embodiment of the present invention.
Figure 6B:
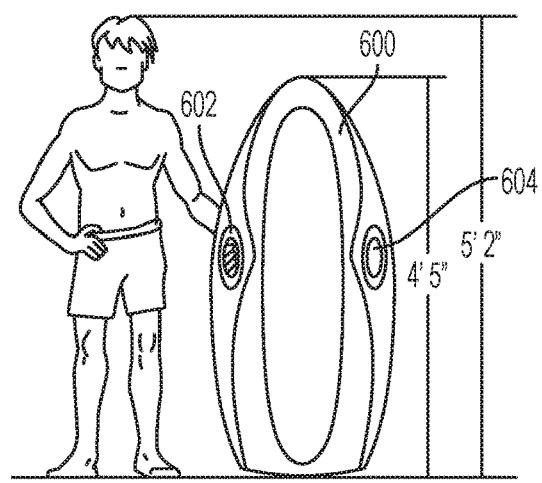
FIG. 6B shows a front view of the ride vehicle of FIG. 6A for demonstrating exemplary dimensions of the ride vehicle according to an embodiment of the present invention.

FIGS. 6A and 6B show a perspective view and a front view of a slideboard 600, respectively. The slideboard 600 is a ride vehicle configured to support a user thereon while traveling down a sliding surface of a waterslide attraction. The waterslide attraction may be the same as or similar to those previously discussed. The slideboard 600 preferably has two handles (602, 604) and a curved middle portion 606 for allowing the user to manually manipulate the position of the slideboard 600 upon the sliding surface of the waterslide attraction, for example, by tugging on one or more of the handles (602, 604), and/or shifting their weight upon the middle portion 606. A bottom surface of the slideboard 600 may be shaped, constructed or coated with any of a variety of materials to improve the speed or aerodynamics of the slideboard 600 and/or to give the slideboard 600 a sportier look and feel. The front of the slideboard 600 may be shaped to allow for improved steering (e.g., in the shape of a bow of a boat) and/or may be configured in a turned-up fashion to allow for skiing over water during travel in the waterslide attraction.

The same as or similar to previous discussions, the slideboard 600 may include tags, plates or other components coupled therewith or embedded therein and designed to interface with various sensors, energized or magnetized elements, or other components coupled with or embedded in the waterslide attraction. Moreover, the same as or similar to previous discussions, the slideboard 600 may additionally or alternatively include one or more activation mechanisms (e.g., buttons or other user-manipulatable elements) coupled therewith or embedded within. These activation mechanisms may transmit a signal when manipulated (e.g., pressed) to a receiver (e.g., an RF receiver), processor, controller or other sensor located on or adjacent to a sliding surface of the waterslide attraction. The controller or other sensor may then cause or activate a feature of the waterslide (e.g., lights, sounds, sprays of water, a message to another user, cause a photograph or video to be taken or recorded, etc.), the same as or similar to the previous discussions.

In the embodiment shown a plurality of activation mechanisms (610, 612) are positioned adjacent to a handle or portion of the slideboard 600 that a user grips with his or her hand. Similarly, additional activation mechanisms (obscured from view) may be disposed on the opposite side of the slideboard 600, near the user's other hand. In one example, the activation mechanisms (610, 612) may be buttons (e.g., with different colors, shapes, etc. associated therewith) that the user can activate by pressing on them with his or her fingers or thumbs. As the user slides down the water attraction, the user may activate certain of the activation mechanisms (610, 612) by manipulating them at a corresponding time in response to a corresponding stimulus (e.g., as the user passes by a blue light, the user has a predetermined amount of time to press a blue button in order to activate or trigger a particular waterslide effect).

The activation mechanisms (610, 612) may be removable from the slideboard 600 in certain embodiments (e.g., either individually or as a group mounted to a common component, such as a bracket, gamepad, etc.). In one example, the slideboard 600 may include handles (602, 604) with buttons disposed thereon or adjacent thereto, the portion of the handles containing the buttons being removable from the slideboard 600. In another example, a gamepad or other component containing activation mechanisms thereon or therein may clip, clamp, or otherwise secure to a portion of the slideboard 600 (e.g., the middle portion 606 in front of the user). This may improve the cost effectiveness of a slideboard since the more costly electronic components can be removed and placed onto a different slideboard once wear-and-tear makes the original slideboard no longer fit for use by customers. In an alternative embodiment, the slideboard 600 may be configured to receive a gamepad or controller with buttons and hold or couple the gamepad or controller to the slideboard 600 (e.g., via a clip or receiving socket). Users may purchase and own their gamepad or controller and plug it in to the slideboard 600 when participating on the water attraction. In such an embodiment, the gamepad or controller may include a unique tag or identification for the user, the same or similar to previous discussions.

In certain embodiments, the slideboard 600 may have inflatable portions. The slideboard 600 may be customizable by or for a user, for example, by waxing the outer surface or by adding/removing air or other gasses from the inflatable portions. The slideboard 600 may be rented by a user upon visiting a waterpark or may be owned by the user and brought to the waterpark. In one embodiment, badges or other indications of performance may be rewarded or obtained by users based upon their performance or achievement for inclusion onto their owned slideboard 600. Waterparks may provide stations, either for free or for charge, that allow users to wax or otherwise customize the appearance or the performance of the slideboard 600 while within the waterpark.

Any of a variety of dimensions may be used for the slideboard 600. For example, the slideboard 600 may be approximately 85% as long as its user (e.g., a 5'2" user may use a 4'5" long slideboard 600). In alternative embodiments, the slideboard 600 could be longer than the user, equal in length to the user, or shorter than the user. Although only a single-user slideboard 600 is shown in FIGS. 6A and 6B, slideboards may be created for any number of individuals (e.g., single, double, family teams, etc.). For example, family team slideboards may be set-up similar to toboggans where riders sit behind each other and cooperate as a team to achieve optimal performance. In certain embodiments, the slideboard 600 may be configured to wrap around a user's back, like a cocoon, and held in place by the user crossing his or her arms over their chest.

Figure 7A:
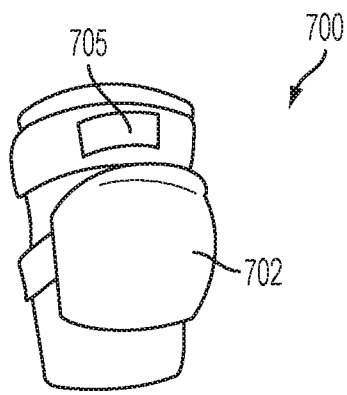
FIG. 7A shows an elbow pad accessory for use with a waterslide attraction capable of incorporating skill or agility of a user riding thereon according to an embodiment of the present invention.
Figure 7B:
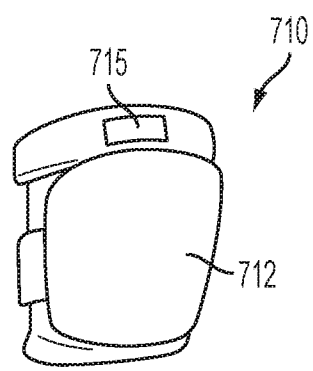
FIG. 7B shows a knee pad accessory for use with a waterslide attraction capable of incorporating skill or agility of a user riding thereon according to an embodiment of the present invention.

FIGS. 7A-7D show a plurality of accessories that may be worn by a user of a waterslide attraction. The waterslide attraction may be capable of incorporating skill or agility of the user thereon and may include features that are the same as or similar to those previously described. FIG. 7A shows a front view of an elbow pad 700. The elbow pad 700 includes a hardened surface 702 for helping protect an elbow of the user and may also incorporate a tag 705 (e.g., an RFID tag) therein for interfacing with one or more sensors along the waterslide attraction, as previously discussed. In an alternative embodiment, no tag may be included in the elbow pad 700. Similarly, FIG. 7B shows a knee pad 710 including a hardened surface 712 for helping protect a knee of the user and may also incorporate a tag 715 (e.g., an RFID tag) therein for interfacing with one or more sensors along the waterslide attraction, as previously discussed. In an alternative embodiment, no tag may be included in the knee pad 710. In certain embodiments, the elbow pad 700 and/or the knee pad 710 may be made of a neoprene and Lycra sewn construction with plastic elbow and/or knee coverings.

Figure 7C:
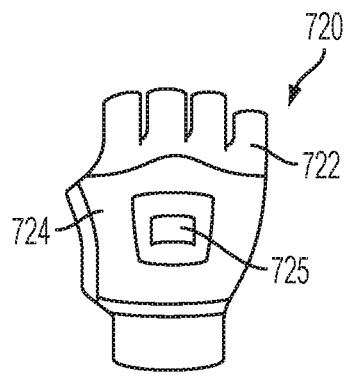
FIG. 7C shows a glove accessory for use with a waterslide attraction capable of incorporating skill or agility of a user riding thereon according to an embodiment of the present invention.
Figure 7D:
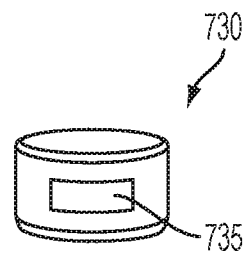
FIG. 7D shows a wrist or ankle band accessory for use with a waterslide attraction capable of incorporating skill or agility of a user riding thereon according to an embodiment of the present invention.

FIG. 7C shows a front view of a glove 720. The glove 720 includes a flexible and thinner portion 722 for surrounding fingers of the user and a padded center portion 724. The glove 720 may also incorporate a tag 725 (e.g., an RFID tag) therein for interfacing with one or more sensors along the waterslide attraction, as previously discussed. In an alternative embodiment, no tag may be included in the glove 720. Similarly, FIG. 7D shows a band 730 for incorporating a tag 735 (e.g., an RFID tag) therein for interfacing with one or more sensors along the waterslide attraction, as previously discussed. The band 730 may be configured to wrap around a wrist of the user. In an alternative embodiment, the band 730 may be configured to wrap around an ankle or other body part of the user (e.g., a finger or a toe). In certain embodiment, the glove 720 and/or the band 730 may be made of a neoprene and Lycra sewn construction with sewn-in or otherwise embedded RFID tags.

Figure 8A:
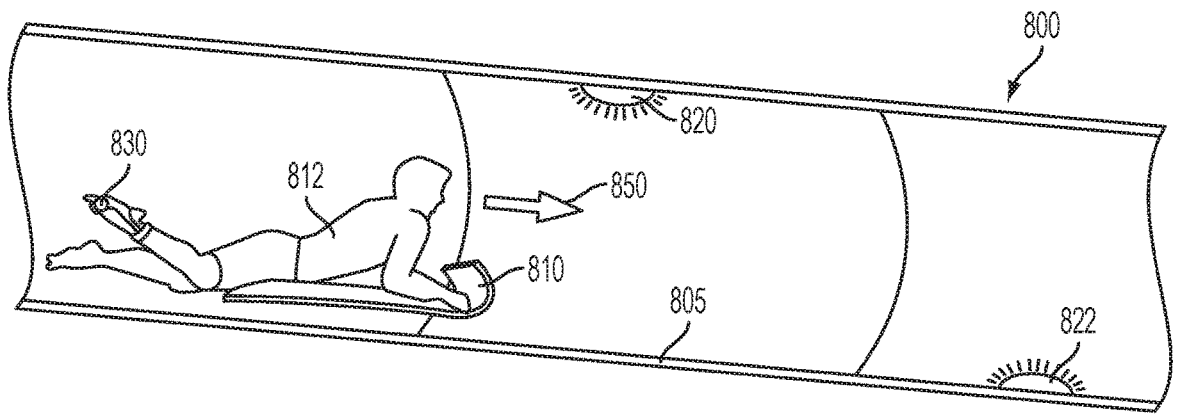
FIG. 8A shows a side view of a slide portion of a waterslide attraction capable of incorporating skill or agility of a rider thereon at a first position with a sensor attached to a foot of the rider according to an embodiment of the present invention.
Figure 8B:
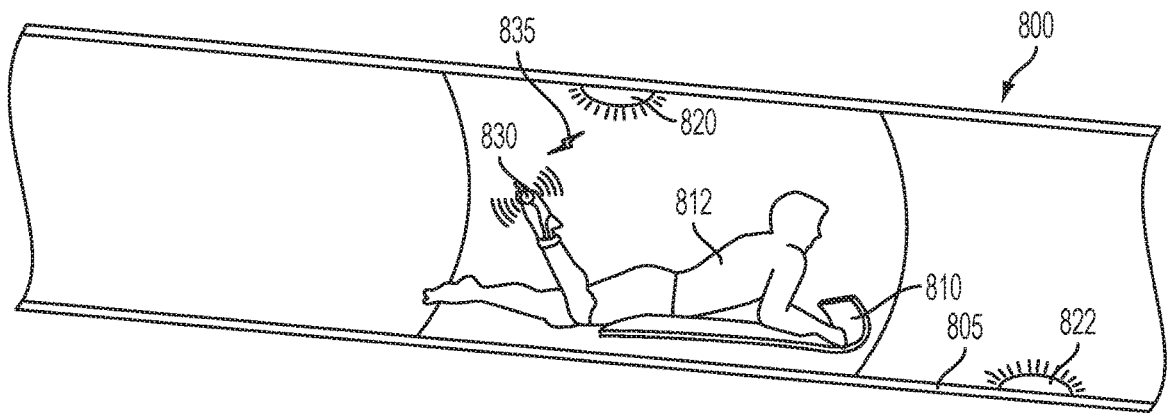
FIG. 8B shows a side view of the slide portion of the waterslide attraction of FIG. 8A with the rider at a second position with the sensor attached to the foot of the rider according to an embodiment of the present invention.
Figure 8C:
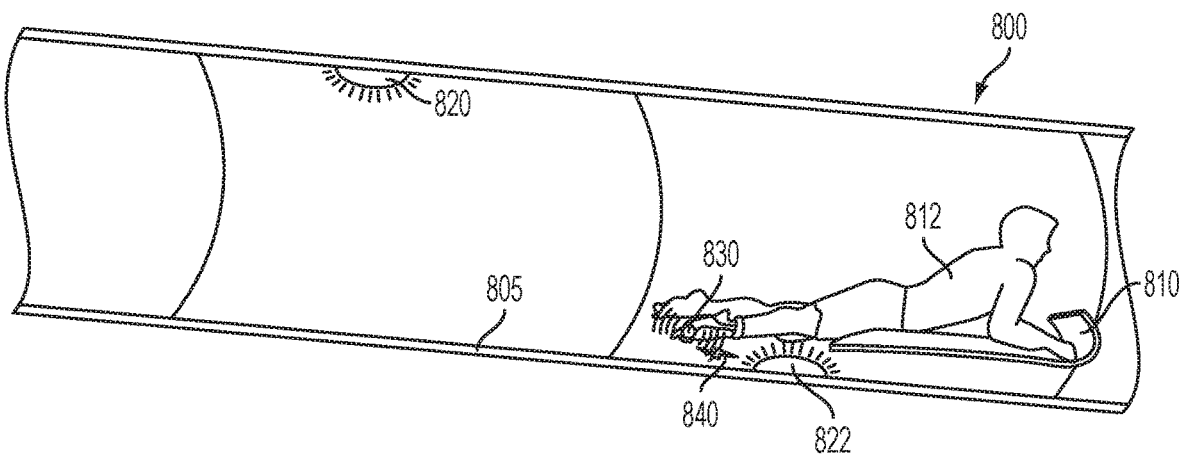
FIG. 8C shows a side view of the slide portion of the waterslide attraction of FIG. 8A with the rider at a third position with the sensor attached to the foot of the rider according to an embodiment of the present invention.

FIGS. 8A-8C show a waterslide attraction 800 having a sliding surface 805 upon which a rider 812 upon a mat 810 or other riding board or vehicle may slide down along a main travel path 850 from an entrance location to an exit location. The waterslide attraction 800 may contain features that are the same as or similar to those previously discussed. In certain embodiments, no mat 810 or other riding board or vehicle may be used. The same or similar as previously discussed, the waterslide attraction 800 incorporates sensors or readers (820, 822) at various locations along the waterslide attraction 800. The sensors or readers (820, 822) are configured to sense or otherwise detect a tag 830 or other element that is worn around or near a foot or ankle of the rider 812 when the tag 830 is within a predetermined proximity of the particular sensor or reader (820, 822). The sensors or readers (820, 822) may be embedded, flush mounted, or attached to the sliding surface 805.

The sensors or readers (820, 822) may also include indicator elements or components (e.g., light emitting devices and/or sound emitting devices) such that as the rider 812 successfully activates the sensors or readers (820, 822) or fails to activate the sensors or readers (820, 822) when in their proximity, the sensors or readers (820, 822) provide the rider 812 with an indication of such success or failure. As demonstrated in FIG. 8A, the rider 812 is initially in a first position where no readers (820, 822) are within a proximity to be activated and thus the position of the foot of the rider 812 is of no consequence. However, as demonstrated in FIG. 8B, as the rider 812 travels along the main travel path 850 and gets closer to the first reader 820 located above the rider 812 in the waterslide attraction 800, the rider 812 must skillfully raise their foot with the tag 830 such that the first reader 820 appropriately senses 835 the tag 830 (e.g., via radio communication). Further, as demonstrated in FIG. 8C, as the rider 812 continues to travel along the main travel path 850 and gets closer to the second reader 822, located below the rider 812 in the waterslide attraction 800, the rider 812 must skillfully lower their foot with the tag 830 such that the second reader 822 appropriately senses 840 (e.g., via radio communication) the tag 830.

Since the rider 812 may be using their hands or arms to help steer the mat 810 along the sliding surface 805, tags 830 placed on one or more of the users feet, ankles, or legs may provide an added level of difficulty or challenge for the rider 812 in attempting to obtain a high score while riding the waterslide attraction 800. Thus, individuals who are not as skilled or do not wish to attempt a more difficult run may be permitted to utilize the waterslide attraction 800 without any tags 830 located on their feet, ankles, or legs. For example, the first sensor or reader 820 may be disabled for such attempts on the waterslide attraction 800 since the only tag(s) to be read on the given attempt may, for example, be located in the mat 810 itself. Alternative embodiments may see the tag 830 placed in additional or alternative locations on the rider 812 or elsewhere. As previously mentioned, in an alternative embodiment, rather than moving a tag worn by a rider within a vicinity of a reader for successful activation, a tag may be included as part of a gamepad or as part of a ride vehicle and a user may be required to successfully press a corresponding button or element when within a vicinity of the reader, in response to a visual or audible cue (e.g., pressing a blue button in response to a blue light). Optionally, as described above, the gamepad may also provide visual, aural, or tactile feedbacks to the user as the user interacts with the sensor. Pressing the button or element causes a signal to be received by a sensor, reader or controller within a vicinity of the tag, to either modify a feature of the attraction, the same as or similar to previous discussions, and/or to accumulate points to determine a score for the rider, the same as or similar to previous discussions.

Figure 9A:
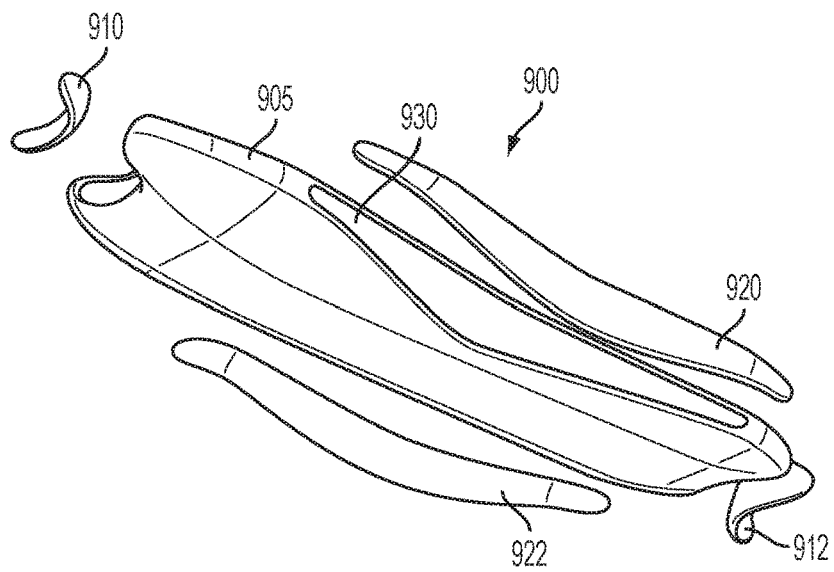
FIG. 9A shows a perspective view of an inflatable ride vehicle having panels for incorporation therein according to an embodiment of the present invention.
Figure 9B:
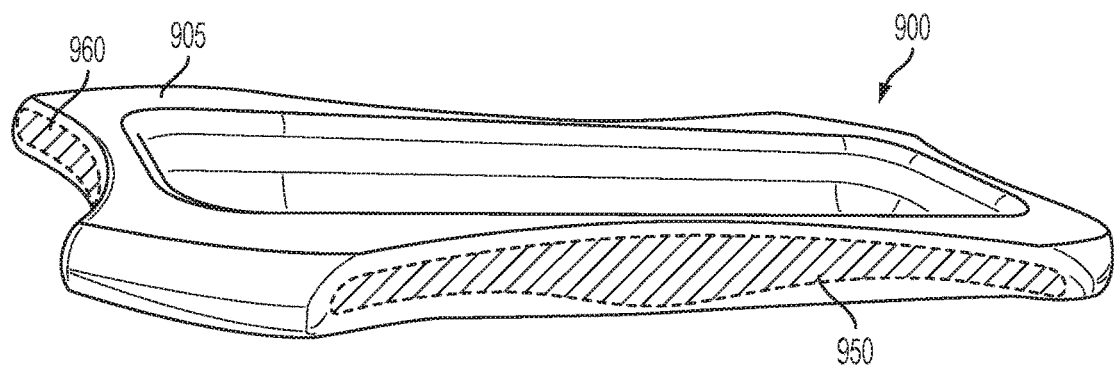
FIG. 9B shows a side view of the inflatable ride vehicle of FIG. 9A having panels incorporated therein according to an embodiment of the present invention.
Figure 9C:
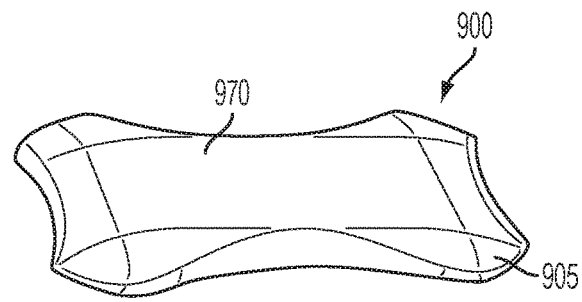
FIG. 9C shows a perspective view of the bottom of the inflatable ride vehicle of FIG. 9A having panels incorporated therein according to an embodiment of the present invention.

A number of possible ride vehicles may be used by a rider when navigating down a waterslide attraction. For example, one such ride vehicle is shown by FIGS. 9A-9C. An inflatable ride vehicle 900 is shown that has an inflatable body portion 905 that is configured to receive a plurality of rigid or semi-rigid panels (910, 912, 920, 922) therein. Pockets 930 within the body portion 905 are disposed at the desired locations where the panels (910, 912, 920, 922) are to be held in place within the body portion 905. The panels (910, 912, 920, 922) are used to achieve various concave, convex, or other shapes in the inflatable body portion 905. For example, concave shapes via the panels (910, 912) may create projections aft and fore of the raft, effectively creating bumpers. Such a configuration may improve tracking in straight sections of a flume ride and/or increase the efficacy of linear induction motors in an amusement attraction. Moreover, the configuration may also simultaneously minimize lateral bridging that can occur in curved sections of the flume ride.

As shown in FIG. 9B, various of the panels (910, 912, 920, 922) are disposed within the body portion 905, for example at perimeter locations 950 and 960. Integration of such panels into an inflatable structure can create shapes for the ride vehicle 900 that otherwise would not be possible, for example, to counteract the natural tendency of inflated structures to bow out into convex lines. In this manner, the ride vehicle 900 may be created with perfectly flat or defined surfaces, for example along a bottom location 970 as seen in FIG. 9C. In this manner, ride vehicles with increased specificity in dimensions or shape may be created to better travel or be manipulated while traveling along a waterslide attraction. In addition, tags (e.g., RFID tags) may more easily be accommodated by or affixed to one or more of the panels (910, 912, 920, 922) rather than the material making up the inflatable body portion 905.

Figure 10:
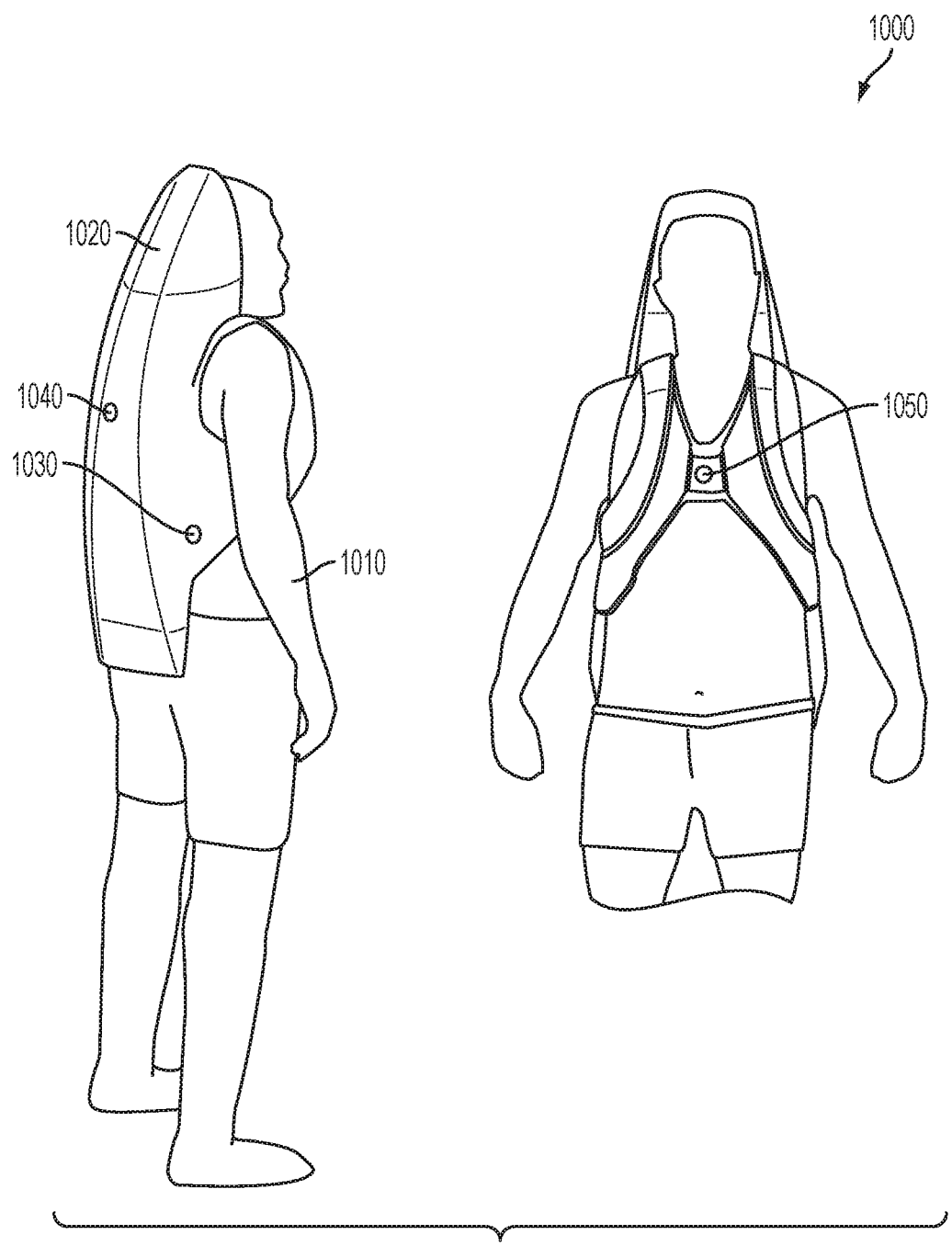
FIG. 10 shows perspective and front views of a protective maneuvering ride vehicle worn by a rider for navigating a waterslide attraction according to an embodiment of the present invention.

FIG. 10 shows another possible ride vehicle that may be used by a rider when navigating down a waterslide attraction. A protective maneuvering vehicle 1000 includes a rigid or semi-rigid body 1020 that is configured to wrap around the body of a rider 1010, for example, as shown. The body 1020 helps protect the rider 1010 during movement on the waterslide attraction by providing a protective buffer between the rider 1010 and a sliding surface of the waterslide attraction. Thus, the upper body of the rider 1010 (e.g., from the hips and above, including the back, shoulders, neck, and/or head) may not make contact with the sliding surface of the waterslide attraction and instead are safely surrounded or received by the body 1020. Not only can such a ride vehicle provide protection to the neck, spine, or other joints of the body of the rider 1010, but may also increase rider comfort, for example, by minimizing scrapes or rubs upon the body of the rider that might otherwise occur due to skin contact with the sliding surface of the waterslide attraction or by having additional padding between the rider's body and the slide surface.

A plurality of tags (e.g., RFID tags, and/or other sensing equipment) may be disposed on or in the body 1020 of the protective maneuvering vehicle for the incorporation of rider skill or for the manipulation of other ride features or aspects, the same or similar as previously discussed. For example, a first RFID tag 1030 may be located on a first side portion of the body 1020, a second RFID tag 1040 may be located on a back portion of the body 1020, a third RFID tag (obscured from view) may be located on a second side portion of the body 1020 opposite the first side portion, and a fourth RFID tag 1050 may be located on a front portion of the body 1020. The RFID tags (1030, 1040, 1050) may have unique identifiers such that they can be independently sensed by sensors or readers along the waterslide attraction. For example, the first RFID tag 1030 and the third RFID tag may be color coded as yellow for corresponding to the side portions of the body 1020, the second RFID tag 1040 may be color coded as green for corresponding to the back portion of the body 1020, and the fourth RFID tag 1050 may be color coded as red for corresponding to the front portion of the body 1020.

Readers capable of sensing a nearby RFID tag may similarly be color coded and configured to determine when an RFID tag of the same color is within a predetermined distance. For example, a portion of a water slide having a reader adjacent thereto may be painted red or otherwise illuminated with a red light to indicate to the rider 1010 that the fourth RFID tag 1050 positioned on the front side of the body 1020 (also color coded red) should be positioned within a close proximity. Thus, if the rider 1010 is currently riding the waterslide on their back (i.e., the second RFID tag 1040 located on the back portion of the body is positioned adjacent to the sliding surface of the waterslide), the rider 1010 will be required to spin their body such that they are instead riding the waterslide on their stomach (i.e., the fourth RFID tag 1050 located on the front portion of the body 1020 is positioned adjacent to the sliding surface of the waterslide) in order for the reader to sense the desired RFID tag and therefore manipulate some other aspect of the ride (e.g., provide score points, etc.). Thus, as the rider 1010 travels down the waterslide while wearing the protective maneuvering vehicle 1000, the rider may spin, rotate, twist, or otherwise manipulate themselves and the body 1020 such that the appropriate RFID tag (1030, 1040, and 1050) is within proximity of a corresponding reader.

In this manner, different difficulties for the same waterslide attraction may be obtained for accommodating a wider variety of audiences. For example, on the easiest difficulty, any RFID tag upon the body 1020 sensed by a reader along the slide will still provide score points and are not distinguished amongst. On a medium difficulty, the RFID tags upon the body 1020 may be segregated into two groups: (1) front/back tags and (2) side tags, a reader along the slide configured to distinguish between the two groups. On a hard difficulty, the RFID tags upon the body 1020 may be segregated into three groups: (1) a front tag, (2) a back tag, and (3) side rags, a reader along the slide configured to distinguish between the three groups. Alternative embodiments may utilize different configurations of tag groups for providing varying levels of difficulty.

In another alternative embodiment, the protective maneuvering vehicle 1000 may wrap completely around the head of the rider 1010. A screen or display may be located within and displayed to the rider 1010 for providing notifications such as current score, a map of the waterslide sliding surface and instantaneous position thereon, locations of upcoming sensors to be activated, information concerning which RFID tag should be moved adjacent to an upcoming sensor, etc. The screen or display may also be used to further a competitive facet of the waterslide attraction, for example by displaying the score, speed, location, time or other aspect of a rider traveling on a different, complementary flume (e.g., an adjacent, dueling flume of a waterslide attraction) or of a rider that immediately proceeded the rider 1010 on the same flume. Historical information for the rider 1010 may also be displayed on the screen or display, such as their previous fastest time, previous highest score, or other statistics for the waterslide attraction. Alternatively, a mobile device could be mounted in the protective maneuvering vehicle 1000 and configured to display dynamic information to the rider in a heads up display. The mobile device may be provided by the amusement park or waterpark or may be a device owned by the rider (e.g., a smart phone) that can clip or otherwise fasten within the protective maneuvering vehicle 1000.

Figure 11:
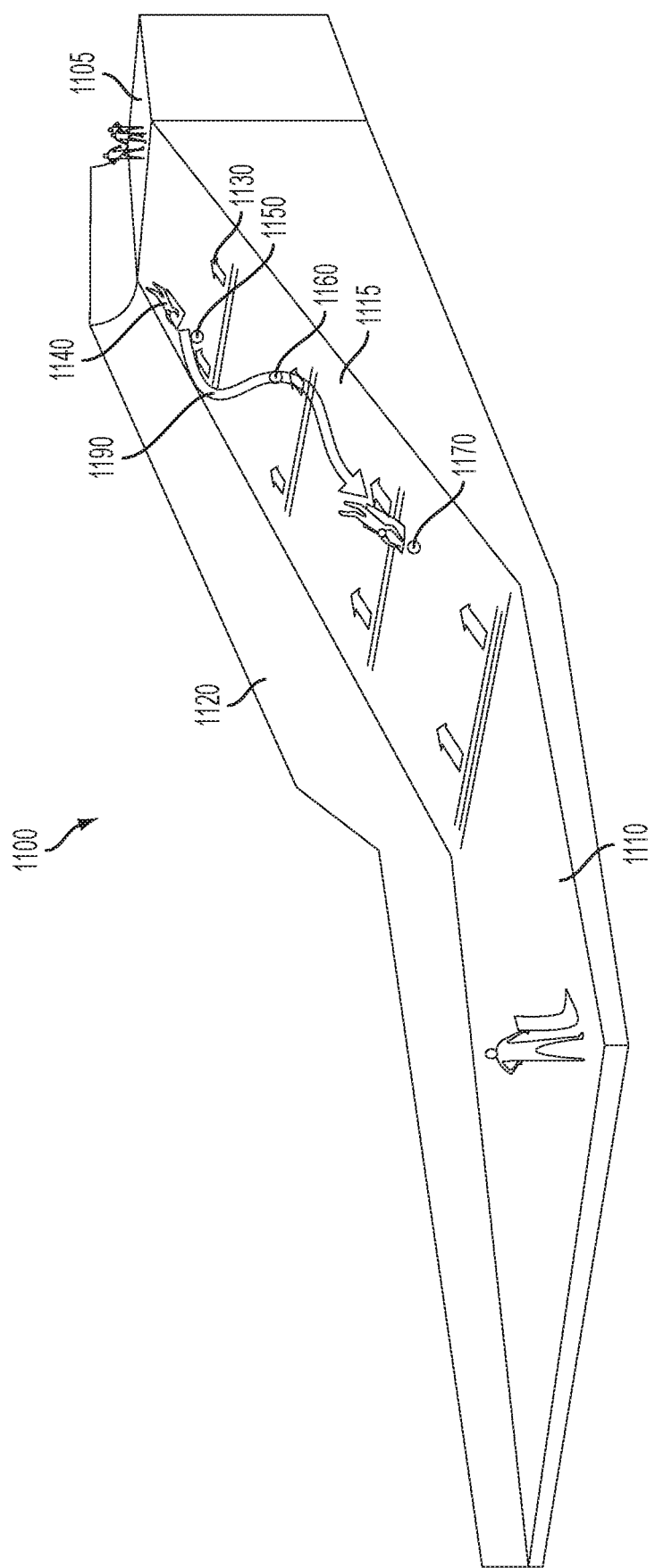
FIG. 11 shows a perspective view of a sloped waterslide attraction utilizing a plurality of water jets for incorporating rider skill or agility during use according to an embodiment of the present invention.

FIG. 11 shows a perspective view of an alternative waterslide attraction utilizing a plurality of water jets and a sloped surface for incorporating rider skill or agility. The waterslide 1100 has an entrance area 1105, an exit area 1110, and a sloped transition area 1115. A rider 1140 uses a mat or other ride vehicle to move down the sloped transition area 1115. Water jets 1130 or nozzles propel water upwardly along the sloped transition area 1115 in a direction opposing the downward movement of the rider 1140. The water jets 1130 propel water at a rate and volume sufficient to slow down movement of the rider 1140, but not enough to cease downward movement of the rider. Thus, a given rider 1140 will always be maintaining downward motion from the entrance area 1105 towards the exit area 1110, but is allowed to carve side-to-side via the mat or other ride vehicle along the wide transition area 1115.

Although FIG. 11 shows the water jets 1130 propelling water in-line with the slope of the transition area 1115 from the exit area 1110 to the entrance area 1105, in an alternative embodiment, the water jets 1130 may propel water from the sides of the transition area 1115 at an angle (e.g., 45 degrees) and drain at or near side portions 1120 to prevent water from bunching up and/or overflowing down towards the exit area 1110. Moreover, angled water jets may allow for a more even distribution of water across the surface of the transition area 1115. The rider 1140 may compensate for the angled travel of water flow by carving into the flow. Moreover, the side portions 1120 may form a curved shape such that the rider 1140 is permitted to move at least partially up the side portions 1120 by carving into the water flow. In certain embodiments, the surface of the transition area 1115 may be a fabric or other riding surface with sensors located in or below the surface.

In one embodiment, one or more targets may be placed and/or illuminated along the transition area 1115. These targets may be sensors configured to read or detect when a tag (e.g., an RFID tag) coupled to the rider 1140 or the mat or other ride vehicle is within a predetermined vicinity. For example, a first target 1150, a second target 1160, and a third target 1170 may be incorporated on or in the transition portion at different distances from the side portions 1120. Thus, in order to achieve the maximum score by activating the targets, the rider 1140 must manipulate their position along the transition portion 1115 by carving into the water flow along the path 1190 as shown. The speed of the water flow may be manipulated to increase or decrease the level of difficulty of the course. Similarly, different embodiments may utilize different numbers of targets and/or different configuration or orientation of targets along the transition portion 1115 leading to a more rides of varying difficulty or challenge.

Figure 12A:
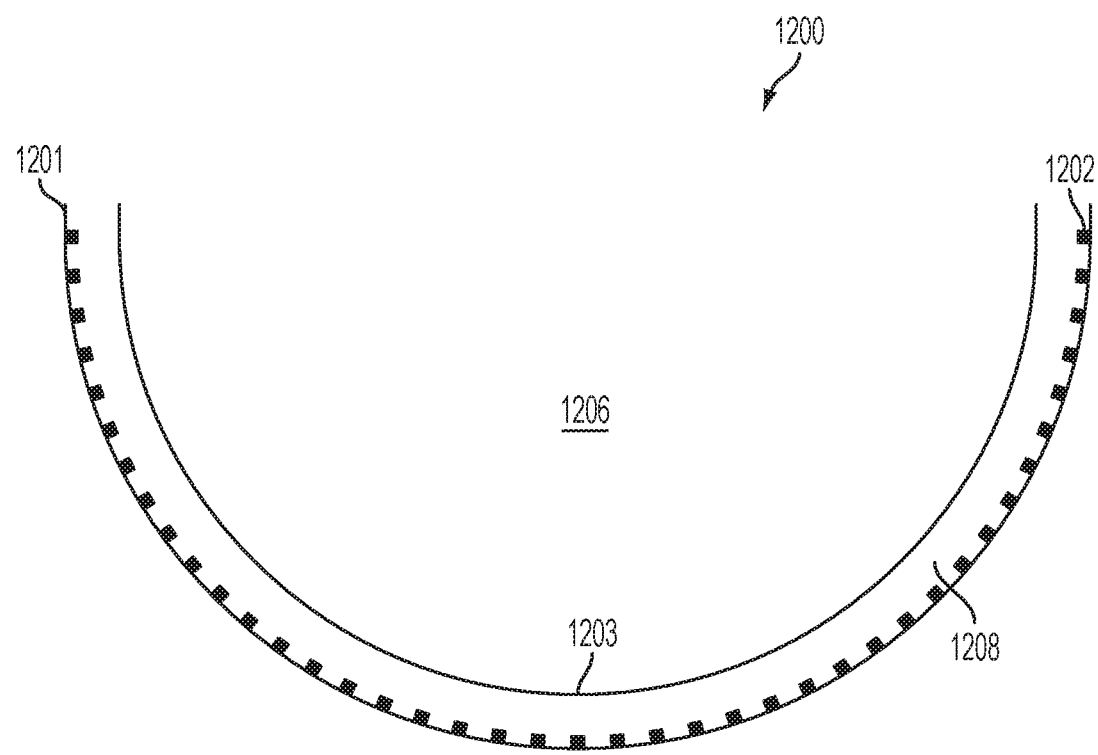
FIG. 12A shows a cross-sectional view of a flume clam-shell with integrated light strips according to an embodiment of the present invention.

Amusement attractions (e.g., waterslide), for example, any of those that are the same as or similar to those discussed throughout, may be configured to illuminate (e.g., using one or more light emitting components, such as LEDs) to provide visual stimulations and/or in response to and/or in anticipation of some interaction with a rider. For example, FIG. 12A shows a cross-sectional view of a flume clam-shell 1200 that is capable of visual illumination (e.g., via integrated light strips 1202) in accordance with some embodiments of the invention. In some embodiments, the waterslide can comprise an inner member comprising an inner surface 1203 (i.e., a ride surface) that can be at least partially submerged or in contact with water, and an outer member that includes an outer surface 1201 and an inner surface. In some embodiments, the inner and outer members can be coupled to form an inner volume 1208 (e.g., wherein one or more lights are disposed) that is isolated from the inner surface 1203 of the inner member, so that any water contained on and/or within the inner surface 1203 of the inner member or within a volume or space 1206 is prevented from entering the inner volume 1208. The waterslide of FIGS. 12A and/or 12B may only partially encapsulate or surround a rider, while other embodiments may fully encapsulate or surround the rider (e.g., see FIGS. 14A and/or 14B. In some embodiments, a waterslide may be created that uses both the clam-shell half 1200 and the clam-shell half 1250 in the water waterslide at different portions or areas.

In some embodiments, at least some portion of the inner volume can form an illumination or display cavity. For example, as depicted in FIG. 12A, in some embodiments, one or more light strips 1202 may be distributed within the cavity and attached to the inner surface of the outer member 1201. Further, in some embodiments, at least a portion of the inner member may comprise a material that is at least partially transparent or translucent to visible light so that light emitted from one or more of the light strips 1202 may pass through the inner member towards the inner portion of the waterslide so as to be viewable by one or more riders. In some embodiments, at least a portion of the inner member can comprise a material that is translucent to light so that light emitted from one or more light strips 1202 may pass through the inner member towards the inner portion of the waterslide. In some embodiments, the waterslide may comprise an inner member that enables a user (e.g., a rider looking out from the inner portion) to view direct, substantially un-diffused illumination from one or more light strips 1202 distributed within the cavity. In other embodiments, the waterslide may comprise an inner member that enables a user to view diffused illumination from one or more light strips 1202 distributed within the cavity.

In some embodiments, at least a portion of the inner member can comprise a material that is translucent to ultraviolet light so that light including ultraviolet wavelengths emitted from one or more light strips 1202 may pass through the inner member towards the inner portion of the waterslide. In some embodiments, the waterslide may comprise an inner member that enables a rider to view and to be illuminated by one or more light strips 1202 distributed within the cavity. In some embodiments, the rider can be in possession of a tag or wearable article that is substantially phosphorescent and/or reflective in the present of ultraviolet light. In some embodiments, a rider, carrying a tag or wearable article that is substantially phosphorescent and/or reflective in the present of ultraviolet light may show enhanced illumination when passing one or more light strips that emit ultraviolet light. In other embodiments the tag or wearable article may comprise a UV-triggered color-changing material such as plastic beads and other items commercially available from SolarActive®.

Figure 12B:
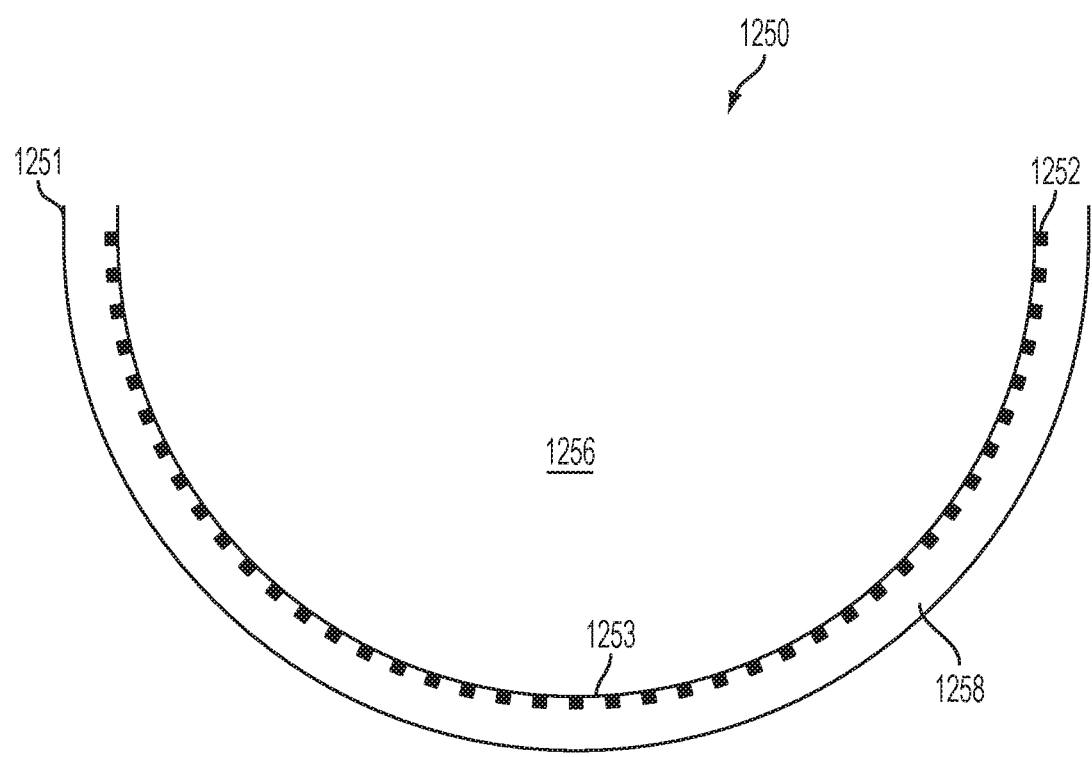
FIG. 12B shows a cross-sectional view of a flume clam-shell with integrated light strips in according to an embodiment of the present invention.

In some embodiments, the light strips 1202 can be positioned and/or secured against the inner surface of the outer member (as illustrated in the embodiment of FIG. 12A) outside of a volume or space 1256 that may be used for flowing water and/or a rider. One of ordinary skill in the art would recognize that the light strips may include other arrangements, and can be positioned anywhere within the cavity. For example, in some other embodiments (as illustrated in the embodiment of FIG. 12B), the light strips 1252 can be positioned and/or secured against the outer surface 1253 of the inner member rather than the inner surface 1251 of the outer member and within an inner volume 1258. In some further embodiments (not shown), the light strips can be supported between the inner and outer members, embedded in the inner and/or outer members, or flush mounted to the inner surface of the inner member. Flush mounting allows for maintenance to occur from within the clam-shell. Some embodiments may include groups of light strips positioned in different locations within the cavity. For example, in some embodiments, one group of light strips can be positioned against the inner surface of the outer member, and a further group of light strips can be positioned against the outer surface of the inner member.

In some other embodiments, the clam-shell may be used to at least partially enclose a waterslide. For example, in some embodiments, the clam-shells (1200, 1250) shown in FIGS. 12A and 12B can be wrapped around a portion of a waterslide (e.g., either a flume or a chute portion). Such a configuration allows for waterslides to be refurbished with such lighting elements. Refurbishment of such waterslides may also incorporate the addition or sensors and/or tags or other components for gaming functions (e.g., user interaction, accumulation of points, etc.) as discussed elsewhere herein.

Figure 12C:
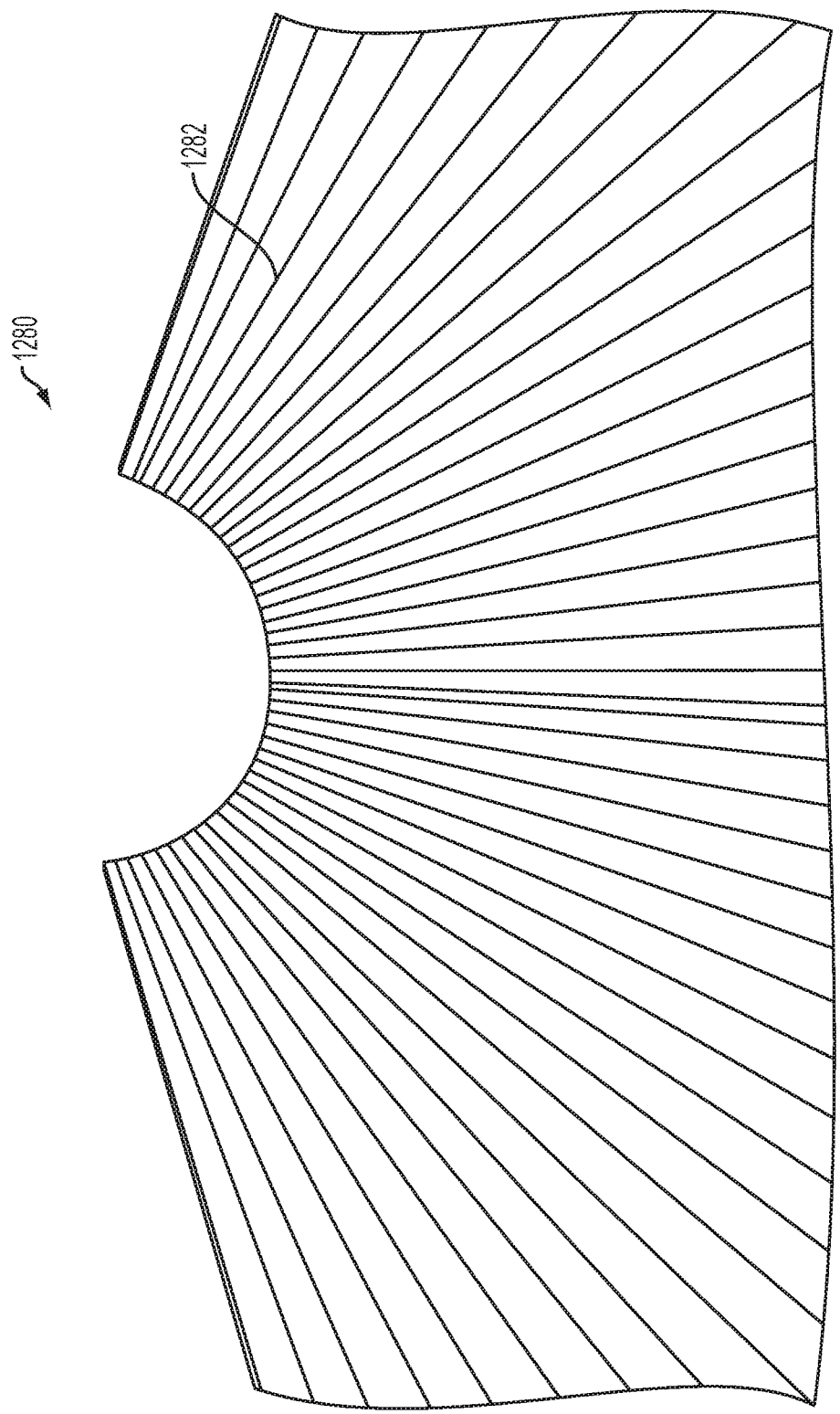
FIG. 12C illustrates an inner perspective view of a portion of a flume clam-shell with integrated LED light strips according to an embodiment of the present invention.

FIG. 12C illustrates an inner perspective view of one portion of a flume or chute clam-shell 1280 with integrated LED light strips 1282 in accordance with some embodiments of the invention. As shown, the light strips 1282 can extend through the longitudinal dimension of the clam-shell, and may comprise a plurality of light strips circumferentially distributed around the clam-shell. In some embodiments, the clam-shell may comprise 38 circumferentially distributed light strips. In some other embodiments, the clam-shell may comprise more or less circumferentially distributed light strips, distributed or clustered with a lower or a higher density that than as specifically shown in FIG. 12C. In some embodiments and as shown, the light strips can be substantially equally spaced around the circumference of the clam-shell. In other embodiments, the light strips can be spaced substantially around the circumference of the clam-shell in clusters of various sizes.

Figure 13:
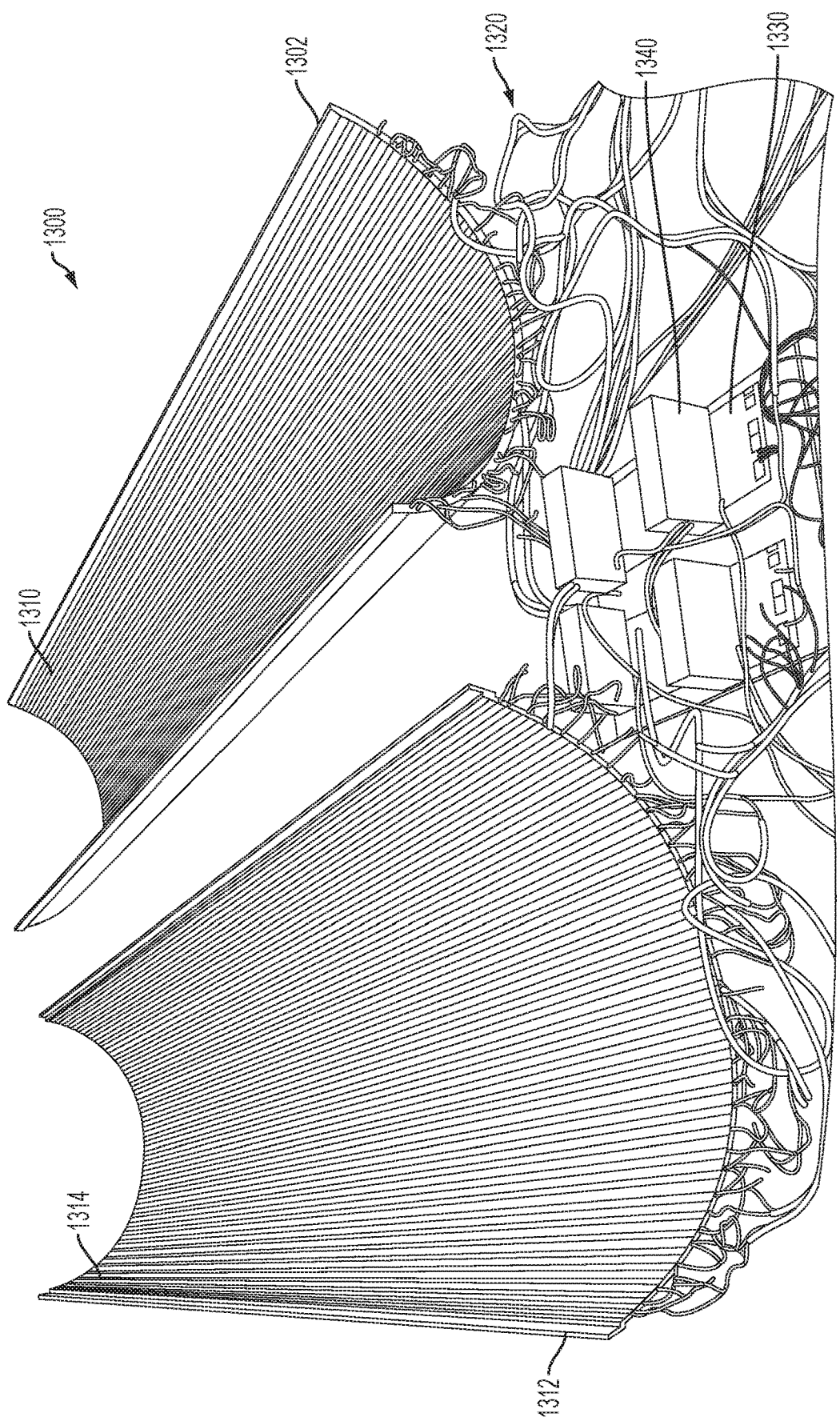
FIG. 13 illustrates perspective views of two flume clam-shell halve sections with integrated LED light strips according to an embodiment of the present invention.

FIG. 13 illustrates a perspective view 1300 of two flume clam-shell halve sections (1302, 1312) that have with integrated LED light strips 1310 (e.g., LED). In an alternative embodiment, the light strip 1310 may be made up of a plurality of individual LEDs or lights (e.g., arranged in longitudinal strips extending down one or both of the clam-shell halve sections (1302, 1312).

As shown, the light strips 1310 may include one or more control and/or power conduits or cables 1320 extending from at least one end of the two flume clam-shell halve sections (1302, 1312). In some embodiments, at least one of the integrated power strips as shown can be coupled to a power supply 1330 and/or at least one control board 1340. In some embodiments, the power supply 1330, control board 1340 or both can be coupled to at least one computer (i.e., a single personal computer or computer server). In one embodiment, the first clam-shell half or portion 1302 and the second clam-shell half or portion 1312 may be fit together to form a substantially 360 degrees tube that can visually illuminate a sliding surface of a waterslide. As illustrated, a variety of colors may be displayed by the plurality of LEDs or lights that make up the LED light strips 1310. As described in greater detail below, the colors displayed by and/or illumination of the light strips 1310 may be varied with time so as to create the appearance of animating, shifting, changing, or moving lights to the rider.

In some embodiments, the light strips 1310 can be controlled wirelessly. For example, in some embodiments, the power supply 1330, control board 1340 or both can be coupled to at least one computer through a wireless connection. In some embodiments, at least one of the light strips 1310 can be controlled using at least one software module processed and sent by the computer or computer server.

One or more of the light strips 1310 can be embedded within an inner member, an outer member, or both of a waterslide (e.g., made up of clam-shell halve sections (1302, 1312)). For example, as shown, one or more of the light strips 1310 can be embedded within the inner member of a waterslide during fabrication of the inner member including electrical connections that exit inner member at an edge or an outer surface of the inner member.

In some embodiments, the light strip 1310 may comprise one or more light emitting devices, including, but not limited to a light emitting diode ("LED"). In this instance, the light strip 1310 may comprise a plurality of LED devices, each of which can be individually addressable. The use of LED's as an illumination source can provide high levels of brightness and intensity with little or no ultraviolet emission, and with low-voltage and current requirements. The LED's may advantageously function with high-efficiency, low radiated heat, long life, and high reliability (including resistance to shock and vibration that is common in many waterslide environments).

In some embodiments, the plurality of LED devices may comprise at least one of a red light emitting LED, a blue light emitting LED and a green light emitting LED. In some embodiments, other colors can be included, including, but not limited to white, yellow, orange, or magenta light emitting LED's. In addition or in replacement to a light strip 1310 using LED strips, some embodiments may comprise LED tiles and/or LED display segments. In some embodiments, at least some portion of the LED strips can also include a curved display (i.e., some portion of the LED strip is curved, bent or angled).

Some embodiments may comprise other light emitting devices, including for example solid-state light-emitting devices based on organic semiconductors such as organic-light-emitting-devices ("OLEDS"). OLED's can be made thin and/or flexible, and can be used to form flat or curved display. For example, in some embodiments, the waterslide may include an attached or integrated OLED display, or an OLED display that is wrapped around at least a portion of the waterslide. These may display a computer-animated sequence of images in accordance with a desired ride experience theme and/or as a reward or encouragement for repeat riders. In some embodiments, at least a portion of any one segment of the waterslide may include an OLED display portion. In some embodiments, the OLED display may at least partially encircle the waterslide, and in some embodiments, may provide a 360° display to a rider. In some embodiments, the waterslide may include a passive-matrix OLED ("PMOLED"), an active-matrix ("AMOLED") OLED, or a combination thereof. Some other embodiments may include phosphorescent OLED technology.

In some further alternative embodiments, the visual indication can be shone into the waterslide from outside of the waterslide. For example, light can be directed into the waterslide at least through the inner member so as to be viewed by a rider. In some embodiments, visual indication can be shone into the waterslide from outside of the waterslide using integrated LED light strips. In some embodiments, visual indication can be shone into the waterslide from outside of the waterslide using an LED display. In some other embodiments, the visual indication can be shone into the waterslide from outside of the waterslide using a conventional lamp system, such as an incandescent lamp system, using an LED lamp system, or using a projector lamp system. In some other embodiments, the visual indication can be shone into the waterslide from outside of the waterslide using a conventional laser system.

In some embodiments, the waterslide inner member may comprise or include the outer member. For example, there may be no inner cavity per se, and the visual indication can be shone into the waterslide from outside of the waterslide directly through the inner member.

Figure 14A:
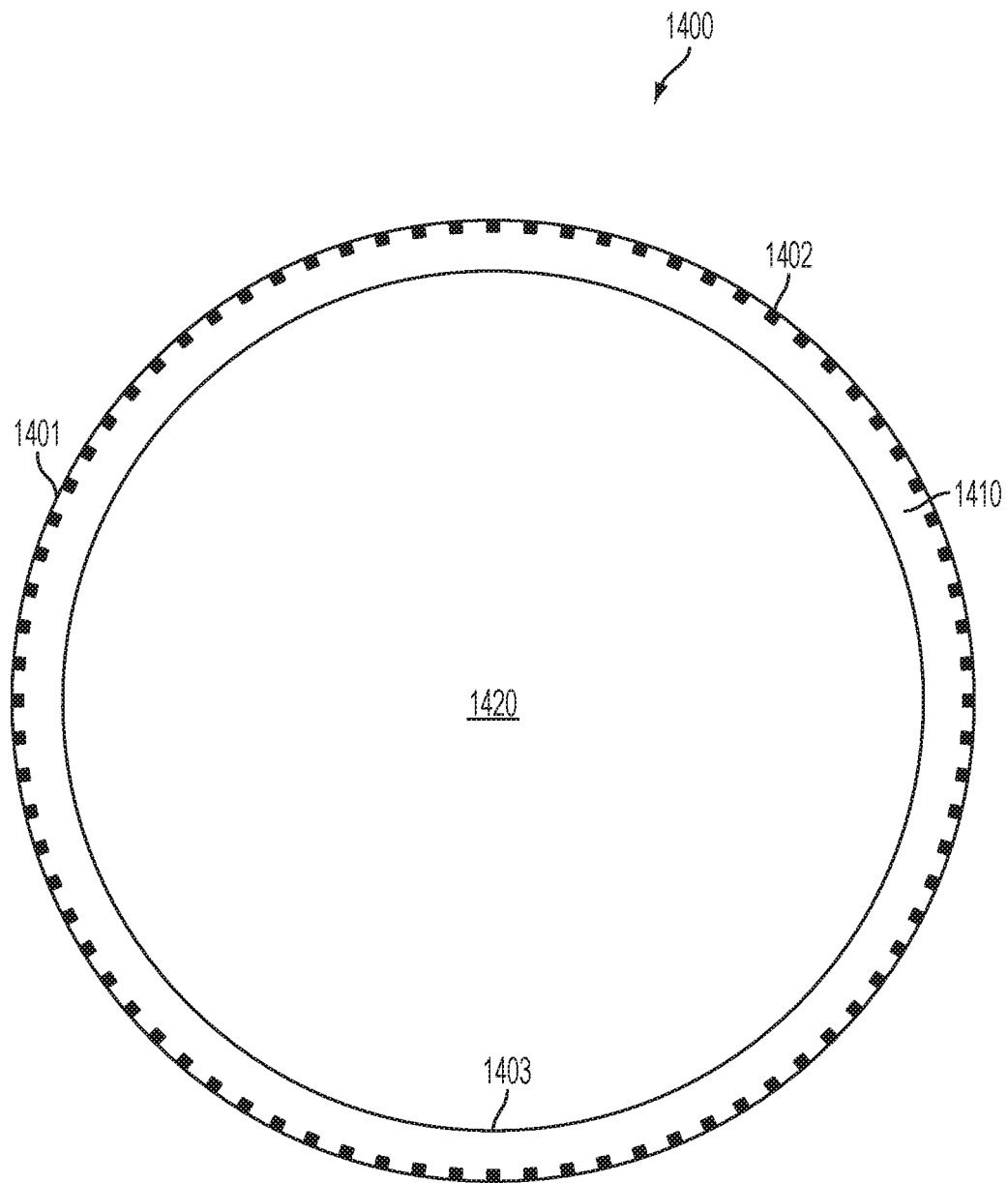
FIG. 14A illustrates a cross-sectional view of a waterslide tube with integrated light strips according to an embodiment of the present invention.

FIG. 14A illustrates a cross-sectional view of a waterslide tube 1400 with integrated LED light strips 1402 in accordance with some embodiments of the invention. Similar to the clam-shell half 1200 shown in FIG. 12A, the inner and outer members as shown can be coupled to form an inner volume 1410 that is isolated from the inner surface 1403 of the inner member, so that any water contained on the inner surface 1403 of the inner member is prevented from entering the inner volume 1410. This inner volume 1410 or space positioned may provide an area where a rider can ride the waterslide tube 1400 (e.g., by sliding on the inner surface 1403 or material via a flow or volume of water).

Moreover, in some embodiments, at least some portion of the inner volume 1410 can form an illumination or display cavity. For example, as depicted in FIG. 14A, in some embodiments, one or more light strips 1402 can be distributed and attached to the inner surface 1401 of the outer member within the inner volume 1410. Some embodiments include at least a portion of the inner member that can comprise a material that is at least partially transparent or translucent to visible light so that at least some light emitted from one or more of the light strips 1402 may pass through the inner member towards the inner portion 1420 of the waterslide so as to be viewable by a rider. Moreover, in the embodiment depicted in FIG. 14A, one or more light strips 1402 can be distributed circumferentially so as to substantially surround a rider, and can be capable of displaying a 360° visual illumination to the rider as the rider is conveyed through the waterslide. In this manner, in certain embodiments, a rider that is riding the waterslide in the volume 1420 can see the visual illuminations provided by the lights or light strips 1402 as they ride along the waterslide. In certain embodiments, individuals that are not presently riding the waterslide clam-shell 1400 may also witness the visual illuminations provided by the lights or light strips 1402. In some embodiments, the waterslide as depicted in FIG. 14A may comprise an inner member that can enable a rider to view direct, substantially un-diffused or substantially diffused illumination from one or more light strips distributed within the cavity.

In some embodiments, the light strips can be positioned and/or secured against the inner surface of the outer member of the chute (as illustrated in FIG. 14A). The light strips can be positioned anywhere within the inner volume 1410 or cavity. For example, in some other embodiments, such as the waterslide tube 1450 of FIG. 14B), light strips 1452 can be positioned and/or secured against the outer surface 1453 of the inner member. In some further embodiments (not shown), the light strips can be supported between the inner and outer members, embedded in the inner and/or outer members, or flush mounted to the inner surface 1403 of the inner member. Flush mounting allows for maintenance to occur from within the chute. Some embodiments may include groups of light strips positioned in different locations within the cavity. For example, in some embodiments, one group of light strips can be positioned against the inner surface of the outer member, and a further group of light strips can be positioned against the outer surface of the inner member.

LED's can be relatively easily controlled and programmed, and in some embodiments, can be used to display at least one color, at least one image, at least one moving image translated from a video image, or a combination thereof. In some embodiments, each LED may comprise an image pixel. In other embodiments, an image pixel can be represented by multiple LED's. In some embodiments, each pixel can be individually controlled and each adjacent pixel can be individually controlled relative to each other individually controlled adjacent pixel. In some embodiments, the waterslide may include a visual display device capable of displaying 180 pixels wide by 160 pixels tall. In some embodiments, there can be more or fewer pixels comprising the display.

In some embodiments, a ride manager may control the illumination of one or more visual illumination devices using an LED mapping or other extension for ArKaos MediaMaster. The LED mapper extension allows the ride manager to import custom mapping of LED devices into MediaMaster and makes it possible to control many of them from a single MediaMaster server. MediaMaster allows mapping of a server's video output directly to any configuration of LED panels without using expensive hardware to convert the video signal. Pixel colors or intensity can be sent directly from a media server to the LED's. N.V. ArKaos S.A., N.V. ArKaos S.A. Software, the N.V. ArKaos S.A. logo, and "MEDIAMASTER" are trademarks of N.V. ArKaos S.A., Rhode-Saint-Genese, Belgium. Additional of alternative LED mapping may be performed by other hardware and/or software in an alternative embodiment.

In some embodiments, one or more LED's or other lights can be illuminated in a pattern (e.g., in a chevron and/or triangle pattern or arrow pattern as discussed earlier, for example, with respect to FIGS. 2A and/or 2B). In some embodiments, the illuminated pattern may be lit for a specific period, and may subsequently be turned off for a specific period. Some embodiments include pulsating patterns. For example, in some embodiments, the illumination feature of a waterslide may include one or more patterns that pulsate (turn on and turn off with a defined frequency). In some embodiments, one or more LED's or other lights can be lit so that when combined, a specific color or combination of colors can be viewed by the rider. For example, in some embodiments, three closely positioned LEDs comprising a red emitting LED, a blue emitting LED, and a green emitting LED can be lit in unison so that a rider may visually interpret a white pixel. In some further embodiments, other combinations of colors can be used.

Figure 15:
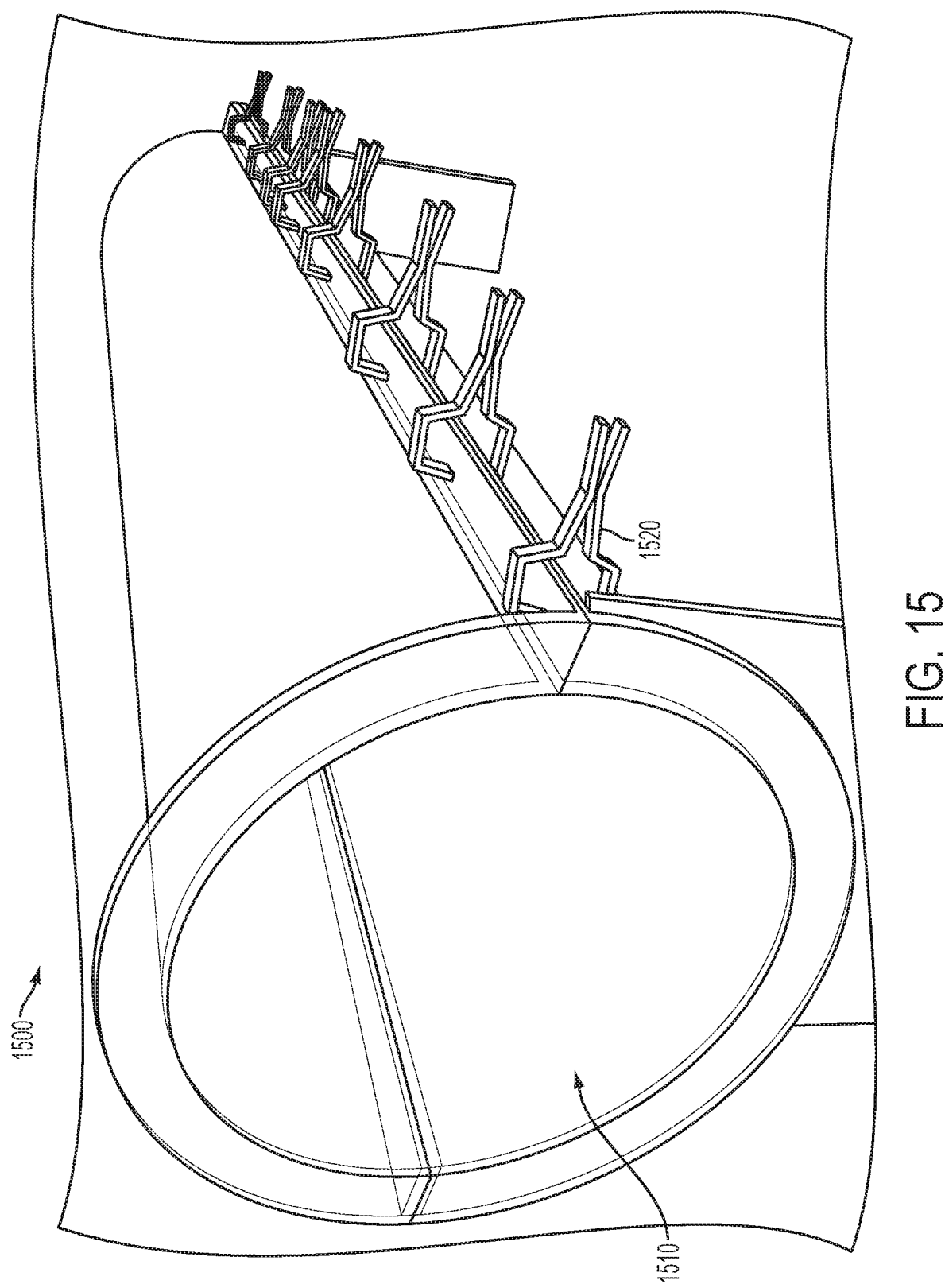
FIG. 15 illustrates a perspective view of a waterslide tube according to an embodiment of the present invention.

FIG. 15 illustrates a perspective view 1500 of a waterslide tube. In some embodiments, two clam-shells (e.g., clamshell halves 1200 and/or 1250, as shown in FIGS. 12A and/or 12B) may enclose and/or be fastened 1520 around an existing waterslide tube 1510. In this fashion, older waterslides without visual illumination and/or rider tracking/sensing as discussed elsewhere herein may be retrofitted with such new features. In some other embodiments, one or more light strips can be integrated with the waterslide tube 1500 to form a waterslide including visual illumination.

Figure 16:
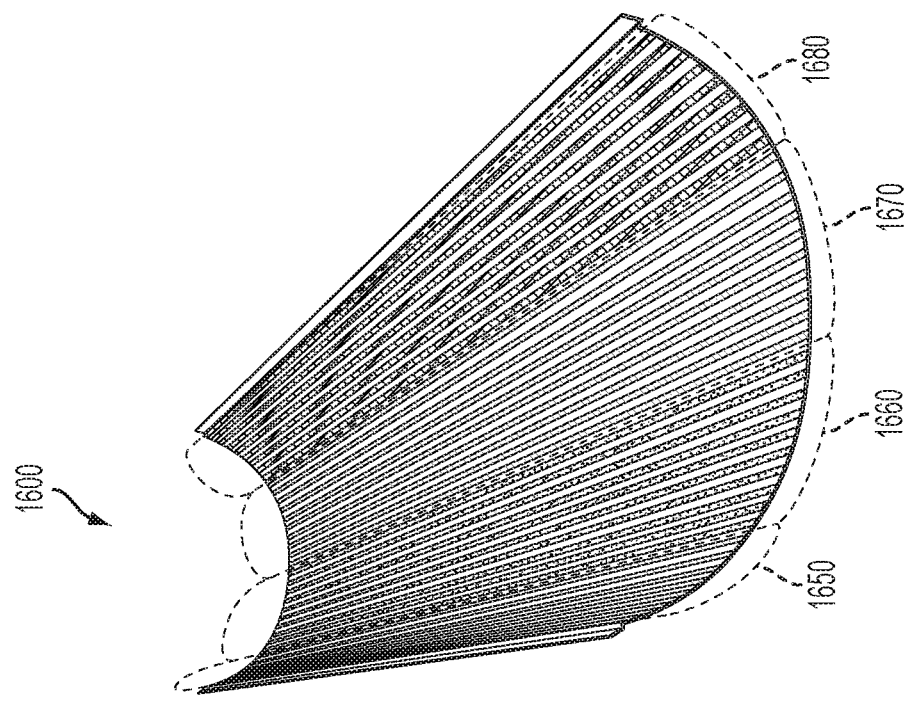
FIG. 16 illustrates perspective views of the two flume clam-shell halve sections with illuminated LED light strips according to an embodiment of the present invention.
Figure 16:
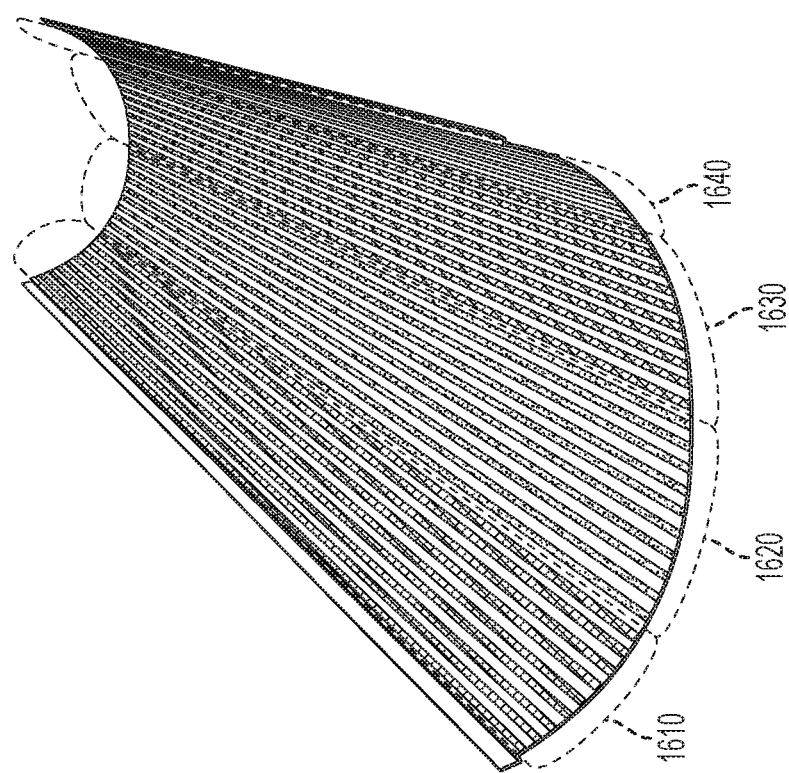

FIG. 16 illustrates perspective views of two flume clam-shell half sections 1600 (e.g., the same or similar to those shown in FIG. 13) with illuminated LED light strips in accordance with some embodiments of the invention. The clam-shell half sections 1600 may be configured to show discrete sections of colors (e.g., four or more colors). For example, a first section 1610 may display a first color, a second section 1620 may display a second color, a third section 1630 may display a third color, and a fourth section 1640 may display a fourth color. Likewise, a fifth section 1650 may display the first color, a sixth section 1660 may display the second color, a seventh section 1670 may display the third color, and an eighth section 1680 may display the fourth color. Any of a variety of and/or number of colors and/or sections may be utilized in an alternative embodiment.

Figure 17:
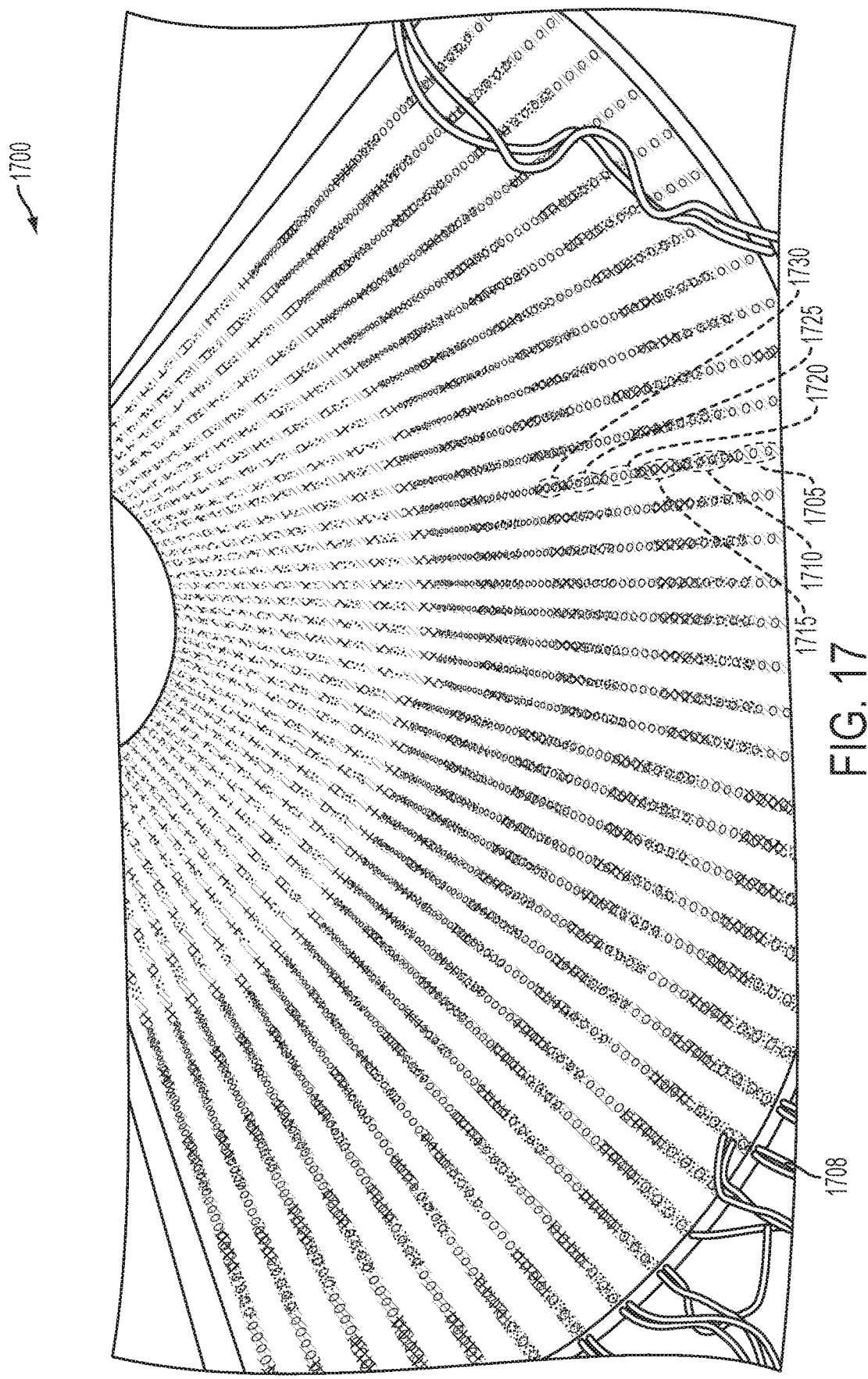
FIG. 17 illustrates an inner perspective view of a flume clam-shell section with illuminated LED light strips according to an embodiment of the present invention.

FIG. 17 illustrates an inner perspective view of a flume clam-shell section 1700 (such as the one shown in FIG. 12C) with illuminated LED light strips in accordance with some embodiments of the invention. As shown, the LED light strips can include groups of colors, with each color group extending circumferentially around the clam-shell and periodically repeated down the length of the clam-shell. For example, a first group of lights 1705 may be a first color, a second group of lights 1710 may be a second color, and a third group of lights 1715 may be a third color. Likewise, a fourth group of lights 1720 may be the first color, a fifth group of lights 1725 may be the second color, and a sixth group of lights 1730 may be the third color. In certain embodiments, one or more of the groups of lights (1705, 1710, 1715, 1720) may have their individual lights independent illuminable in a variety of different colors. A controller (e.g., from a connected computer system through wiring 1708) may control the color, color intensity, and/or illumination of each of the plurality of lights in the one or more of the groups of lights (1705, 1710, 1715, 1720). Thus, as a rider rides on or adjacent to the waterslide clam-shell section 1700, the rider can view any of a variety of illuminated shapes, colors, or other images. In one embodiment, the lights may be made to have the appearance of moving or shifting along the waterslide, for example, by illuminating a light or a group of lights (e.g., the first group of lights 1705) by a first color, then, sequentially, illuminating an adjacent light or group of lights (e.g., the second group of lights 1710) by the first color, then, sequentially, illuminating an adjacent light or group of lights (e.g., the third group of lights 1715), and etc. By controlling the timing of lighting sequence, the appearance of moving with various speeds may be created.

Some embodiments of the invention may comprise a waterslide including at least one animated visual illumination. For example, in some embodiments, one or more LED's forming at least one illuminated pattern can be lit for a specific period, and may subsequently be turned off for a specific period. After a specific period of time (usually less than a few seconds), a substantially similar pattern can be illuminated using one or more of the previously illuminated LED's and at least one adjacent LED, or using other LED's adjacent to or near the previously lit LED's. Using this method, a pattern can be made to appear to move over the waterslide in any direction.

Figure 18A:
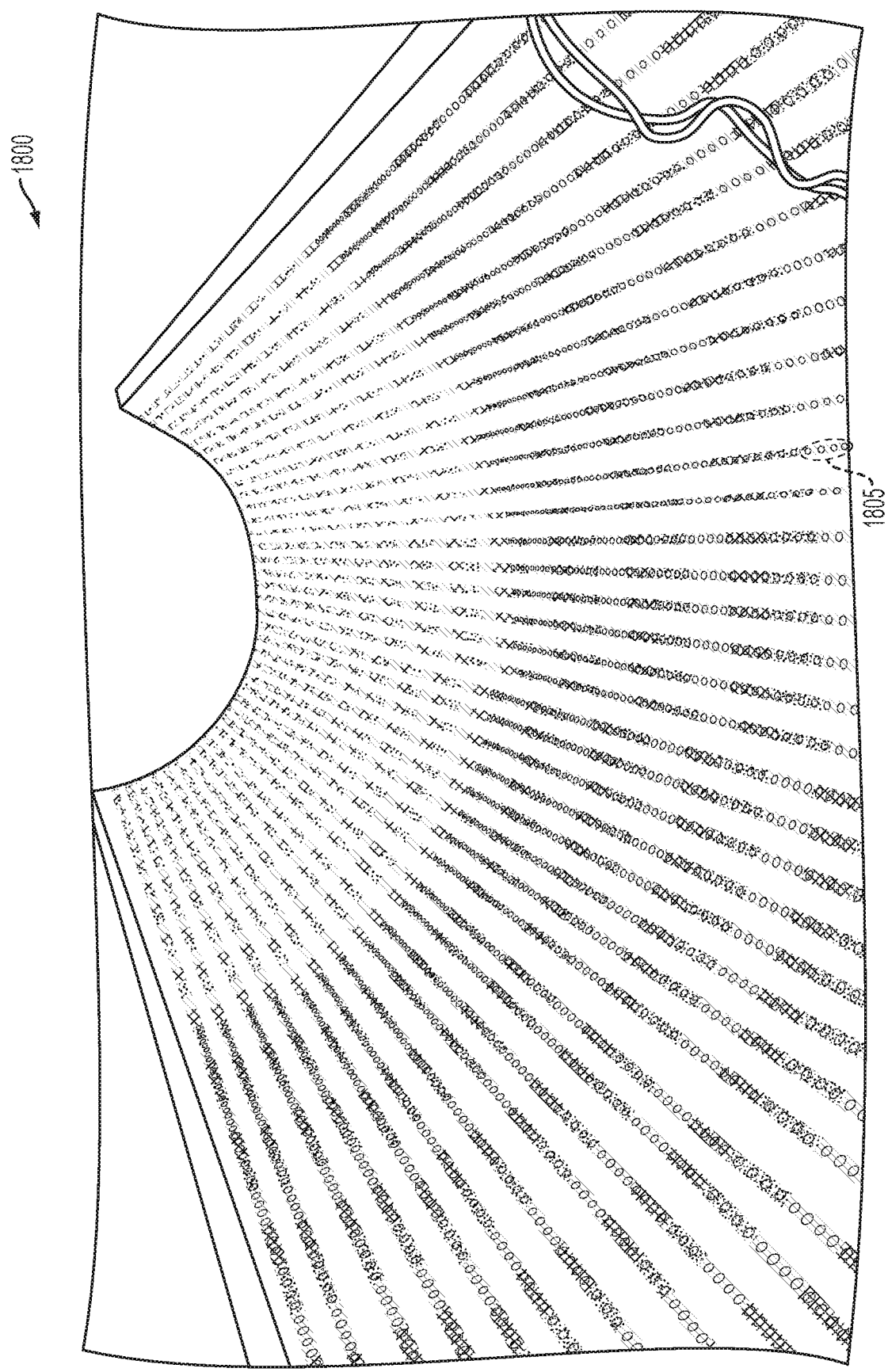
FIG. 18A illustrates an inner perspective view of a flume clam-shell section with LED light strips illuminating a first light pattern according to an embodiment of the present invention.
Figure 18B:
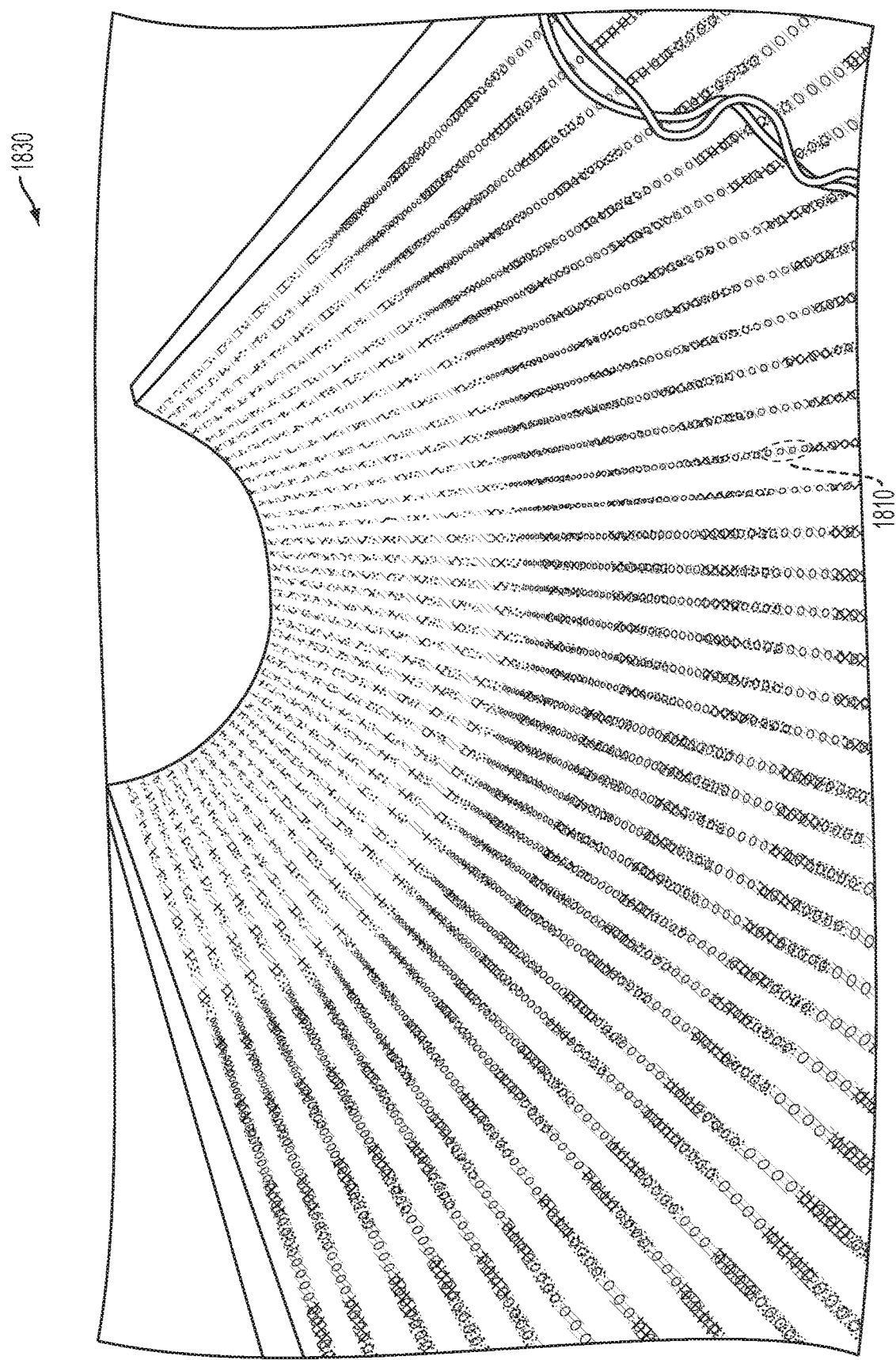
FIG. 18B illustrates an inner perspective view of a flume clam-shell section with LED light strips illuminating a second light pattern according to an embodiment of the present invention.
Figure 18C:
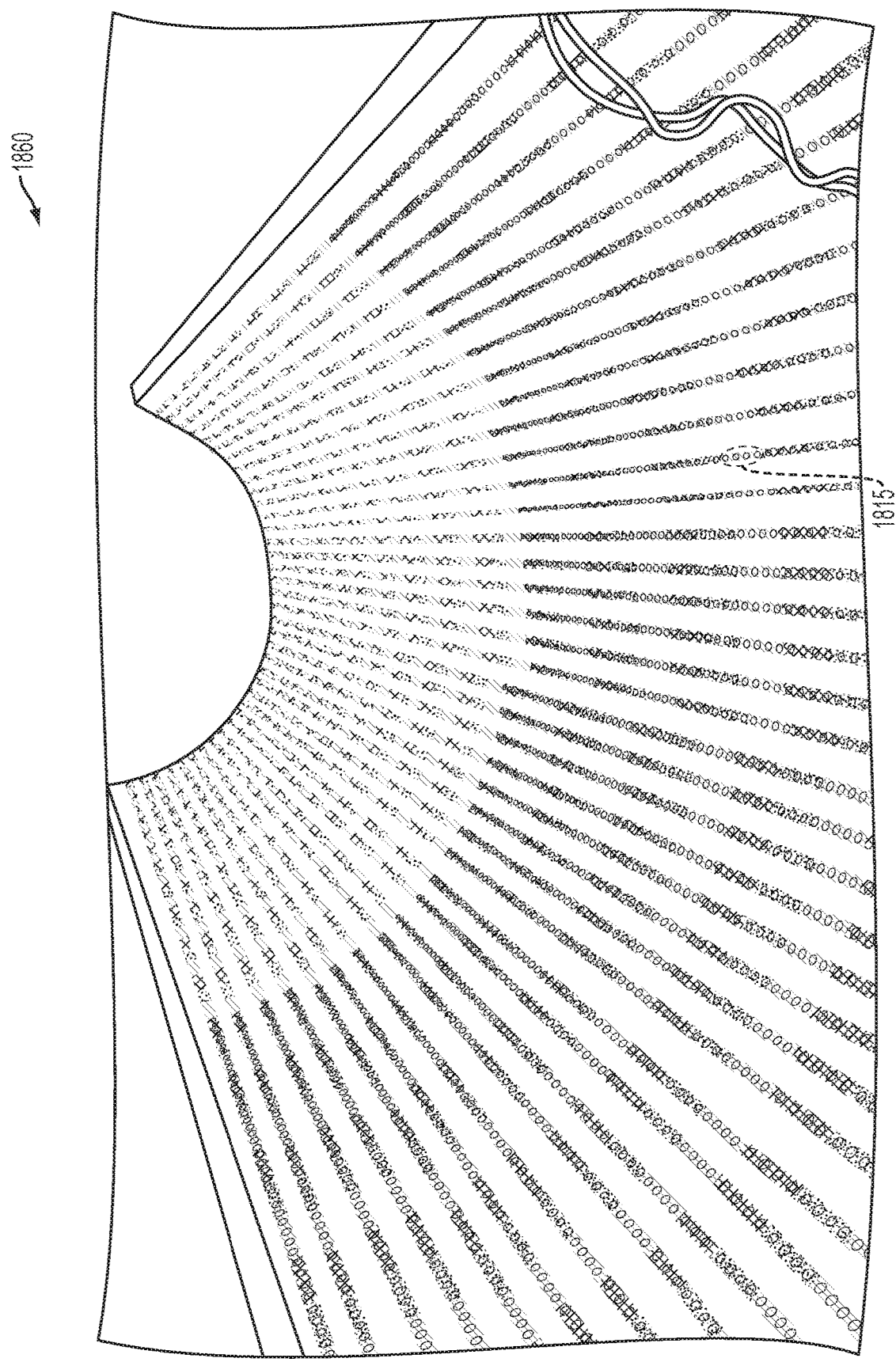
FIG. 18C illustrates an inner perspective view of a flume clam-shell section with LED light strips illuminating a third light pattern according to an embodiment of the present invention.

For example, FIG. 18A illustrates an inner perspective view of a flume clam-shell section 1800 (such as one shown in FIG. 12C) with LED light strips illuminating a first light pattern in accordance with some embodiments of the invention. A first set of lights 1805 is initially illuminated and/or illuminated as a particular color. FIG. 18B illustrates an inner perspective view of a flume clam-shell section 1830 (such as one shown in FIG. 12C) with LED light strips illuminating a second light pattern in accordance with some embodiments of the invention. A second set of lights 1810 is now illuminated and/or illuminated as the same color previously illuminated for the first set of lights 1805. Further, FIG. 18C illustrates an inner perspective view of a flume clam-shell section 1860 (such as one shown in FIG. 12C) with LED light strips illuminating a third light pattern in accordance with some embodiments of the invention. A third set of lights 1815 is now illuminated and/or illuminated as the same color previously illuminated for the second set of lights 1810. In this instance, the color groups can be shown to have appeared to have shifted along the axial length of the waterslide. The speed and/or direction at which the lights appear to shift or move may be used to simulate speed for a rider and/or may be used to animate any of a variety of images displayed to the user.

In some other embodiments, the visual illumination may comprise a static animation. For example, in some embodiments, one or more patterns can be displayed which can be switched to a different pattern in the same location. Using the example shown in FIGS. 2A and/or 2B, in some embodiments, one or more of the arrows can be animated (e.g., by illuminating the head portion of the arrow intermittently, or by displaying an arrow that appears to grow larger, change color or shift towards the sensor).

In some embodiments, the speed of animation (i.e., the speed of movement or rate of change) of one or more illuminated patterns may change. In some embodiments, the rate of change of one or more patterns may enable the display of at least one video. For example, in some embodiments, videos can be relayed and one or more LED's can be turned on and off based on video signal. In some embodiments, the waterslide may display a video translated from a movie file such as a .mov file, an .avi file, or an mpeg4 file, etc. In some embodiments, the video source may comprise a video sourced from a computer (e.g., from the ride manager's computer or computer server or from another computer connected to the ride manager's computer). In some embodiments, the video can be displayed on the waterslide based on a wirelessly transferred video. In some embodiments, the video can be sourced from an Internet service, such as YouTube™, or another streaming service across a public or private network. YouTube is a registered trademark of Google, Inc.

Some embodiments of the invention include a simulated water and/or under-water scene. For example, in some embodiments, one or more patterns can be displayed on the waterslide that may include at least one scene or image (e.g., a submarine, giant attacking squid, a shark, etc.) that may cause a rider to form a belief that he or she is submerged in water. For example, in some embodiments, an under-water river or lake scene can be displayed to the rider. In other embodiments, the visual illumination from the waterslide may simulate an underwater ocean scene (e.g., a deep ocean scene with colorful moving fish and/or a coral reef scene). In some embodiments computer-animated fish or other computer-animated objects within the displayed scene may "react" to the rider based on one or more feedbacks provided by the various sensors and user interactions as described herein.

In some embodiments, at least one portion of a waterslide can be coupled with a disc-jockey and/or media control system to create live lighting effects. For example, in some embodiments, a disc-jockey may purposefully manipulate a visual illumination of at least one waterslide based on a music theme, a music album or music single, a music video, or a live band. In some embodiments, the disc-jockey may control visual illumination emitted from at least some portion of the waterslide based at least in part on an audio input. For example, in some embodiments, at least one portion of the waterslide, and/or at least one light strip and/or at least one LED can be lit to at least display a color, change a color, pulsate a color, animate a pattern, or modulate a brightness based at least in part on an audio input generated by at least one musical instrument, at least one band member, at least one disc-jockey, or a combination thereof. The disc-jockey may be a ride operator, manipulating the visual illumination in real time or per a pre-recorded set of steps. In an alternative embodiment, the disc-jockey may be software-based or otherwise automated.

In some embodiments, multiple portions of the waterslide can be visually manipulated at the same time. In some embodiments, specific portions of the waterslide can be visually manipulated based on various factors including but not limited to the speed of the rider, the incline angle of the waterslide, the width of any portion or segment of the waterslide, the water flow rate, the actual speed of the rider at any moment, the riders average speed since entering the waterslide, the rider's skill, the number of riders, the age of the rider, the rider's gender, and so on.

In some embodiments, at least one portion of water slide may include a visual illumination that is controlled by one or more rider's actions (whether intentional or unintentional) in the waterslide. For example, in some embodiments, a rider may pass by or intentionally actuate a sensor (e.g., the sensor with visual indication 222 such as green arrow for telling the user 202 to move the sensor 210 and/or tag discussed earlier and shown in FIG. 2A). In other embodiments, an intentional or unintentional position or pose of a rider may change or influence the visual appearance of any portion of the waterslide.

In some embodiments, at least one portion of a water slide may include a visual illumination that is controlled by a rider's emotion and/or visual appearance. For example, in some embodiments, a conventional camera system may enable a ride manager or a machine algorithm to determine the rider's emotion based on a physical position or appearance of the rider, including, but not limited to a rider's facial expression.

Some embodiments include at least one portion of water slide that may include a visual illumination that is controlled by a bystander (e.g., at least one friend or colleague of the rider). In this instance, the bystander may manipulate the visual illumination of the waterslide from within the facility in which the waterslide is housed (i.e., a water park or theme park), or alternatively, from a remote location (i.e., from a bystander's computer, laptop, tablet, smartphone, or other mobile device that can be within the facility or outside of the facility).

In some embodiments, at least one portion of a water slide may include a visual illumination coupled to a connected water-park attraction. For example, in some embodiments, one or more light strips can be controlled by a connected system that includes at least one other controllable system with the water park. In some embodiments for example, a water park may include a theme such as a current party theme and at least one portion of water slide may include a visual illumination that can be controlled in at least in part based on the theme.

Some embodiments of the invention may include a waterslide with at least one portion including a visual illumination capable of visually interacting with a color reflector, color absorber, or light sensor within the waterslide. For example, in some embodiments, at least one portion including a visual illumination may illuminate a reflective region, badge, tag or light sensor worn by at least one rider. In some other embodiments, at least one of the at least one portion including a visual illumination may illuminate at least one water-borne object not attached to the rider such as a submerged light sensor, material added to the water such as light reflective glitter, or simulated fish, and so on.

In some embodiments of the invention, one or more segments of a waterslide, for example, those depicted in FIGS. 2A-2B, 8A-8C, 12A-12B, 13-17, and/or 18A-18C, or others, can comprise a transparent or translucent region, such as a glass, or plastic or fiberglass portion that is at least partially light transmitting. As discussed earlier, in some embodiments, at least some portion of the waterslide can be, for example, some transparent, semi-transparent or translucent material, including acrylic (polymethyl-methacrylate) based polymers, butyrate (cellulose acetate butyrate) based polymers, polycarbonate based polymers, and glycol modified polyethylene terephthalate based polymers, or mixtures thereof. Further, some portions of the waterslide may comprise a fiberglass-based material, including, for example, a fiberglass-resin based composite material.

Turning next to an embodiment of a ride vehicle that may be used, FIGS. 19A through 19D showcase a ride vehicle 1900 (e.g., a slideboard) that may be used on slides or amusement attractions, for example, like those discussed throughout. Although FIGS. 19A-19D illustrate one embodiment of a ride vehicle (e.g., for front-facing riders in a seated position), alternative embodiments may incorporate any of a variety of rider orientations (e.g., rear-facing) and/or ride vehicle configurations. With reference to FIGS. 19A-19D, the ride vehicle 1900 includes a top surface 1910 and a bottom surface 1920, the bottom surface configured to contact a flow of water 1901 and/or a surface of an amusement attraction (e.g., a waterslide flume) during operation. A back structure 1930 provides support for a user to recline or make contact with a back of the user's body, such as for comfort and/or safety purposes, when the user is seated in the seating area 1912 of the ride vehicle 1900. As shown, the seating area 1912 may be closed, rather than an open hole, to the flow of water 1901 and/or surface of an amusement attraction during operation (e.g., a user's buttocks may not make direct contact with the water of the waterslide flume) when the user is seated in the seating area 1912 of the ride vehicle 1900. Two handles (1940, 1950) are connected with the back structure 1930 for the user to grasp during operation and/or for easier carrying of the ride vehicle 1900. An inflation element or opening 1911 may be provided to allow the ride vehicle 1900 to be regularly inflated to a desired air pressure. In an alternative embodiment, other dimensions, geometry, orientations, and/or features may be provided for a ride vehicle (e.g., greater or fewer handles may be provided and/or such handles may be connected directly with the top surface 1910).

In certain embodiments, one or more vibration component may be provided for the ride vehicle 1900 (e.g., for the handles 1940 and/or 1950). For example, a vibration component may include a motor, discussed in more detail herein, that is configured to cause vibration of at least a portion of the ride vehicle 1900 (e.g., one or more handles 1940 and/or 1950 or other hand grips). This vibration component may be used in order to indicate (via vibration that a user senses through the handles 1940 and/or 1950), when a target was successfully interacted with (e.g., successfully pressing a particular button on the interactive component at a proper time, such as when within a predetermined vicinity of a target). In alternative embodiments, vibration components may be placed or configured to vibrate other portions of a rider's body (e.g., the rider's back, buttocks, legs, etc.) for any of a variety of reasons (e.g., to simulate a characteristic of a theme that the user is experiencing as they slide on the amusement attraction, such as an avalanche, etc.) Tactile responses may be configured to occur upon either correct and/or incorrect user interaction during slide usage. Other responses may additionally or replaceably be used to notify a user of successful or unsuccessful interaction (visual, auditory, etc.)

Figure 19A:
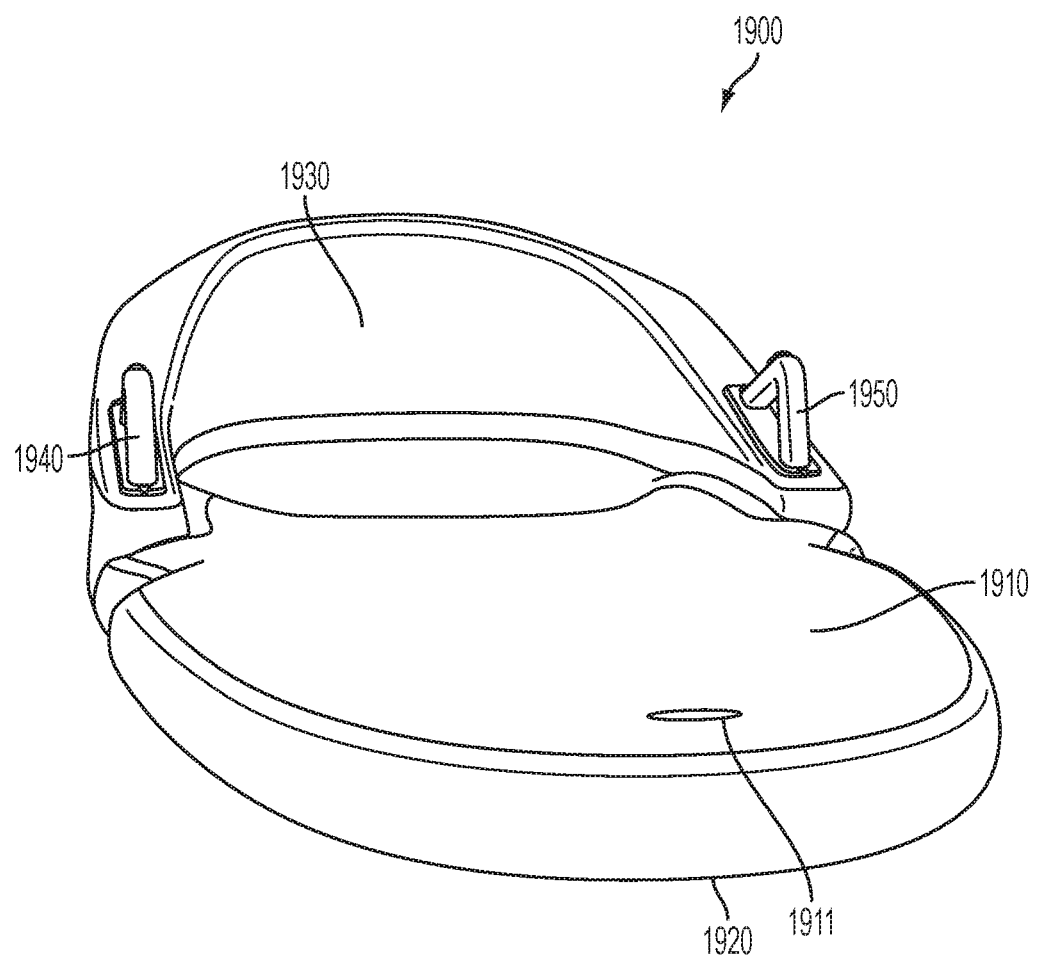
FIG. 19A illustrates a perspective view of a ride vehicle according to an embodiment of the present invention.
Figure 19B:
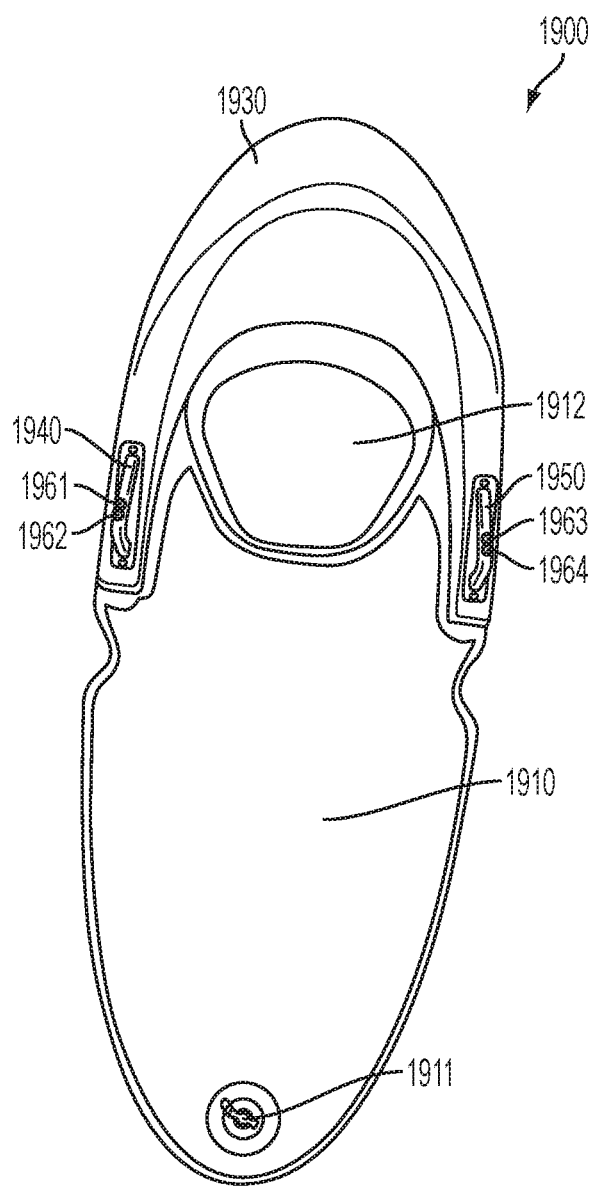
FIG. 19B illustrates a top view of the ride vehicle of FIG. 19A according to an embodiment of the present invention.
Figure 19C:
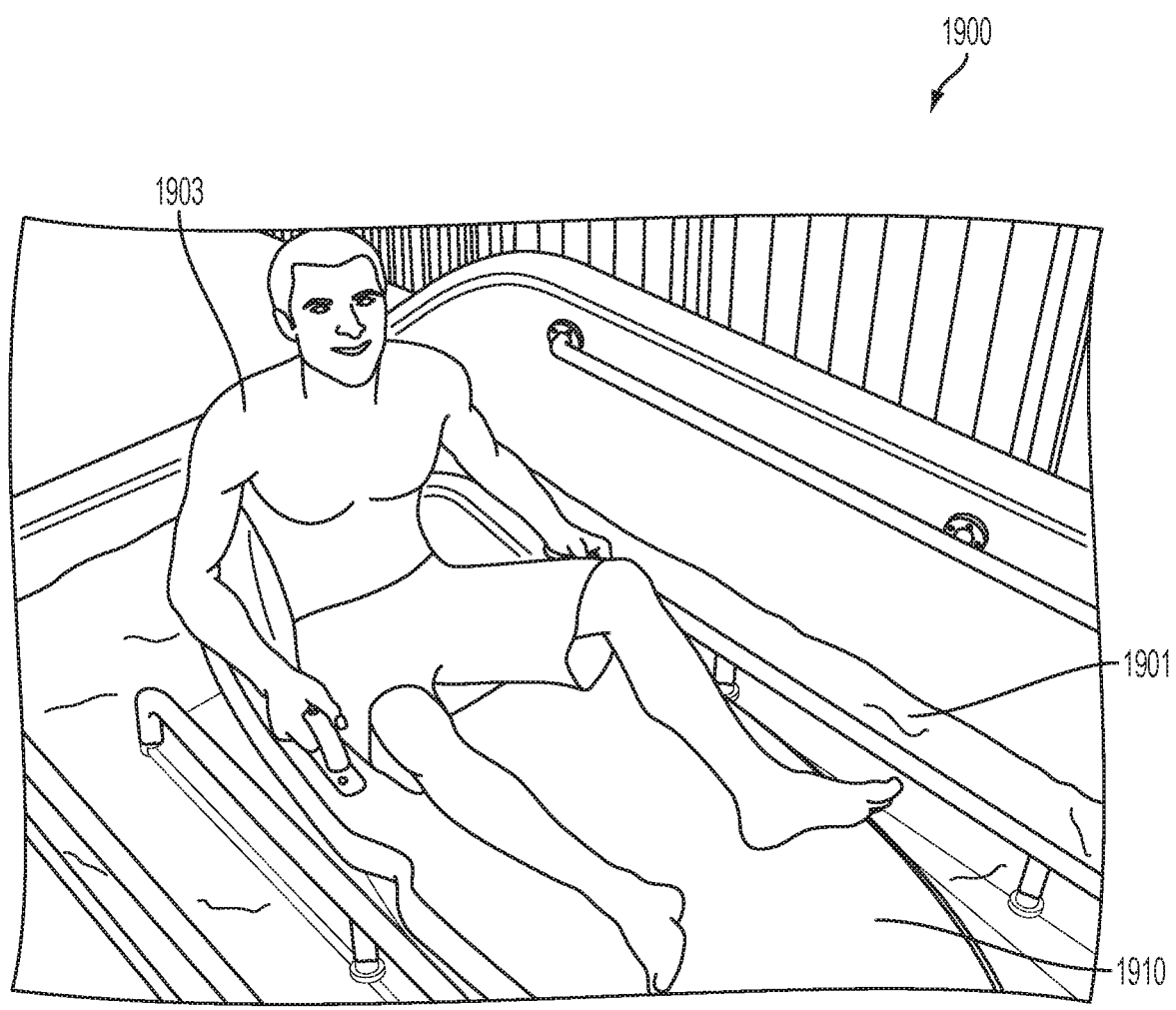
FIG. 19C illustrates a perspective view of the ride vehicle of FIG. 19A carrying a rider according to an embodiment of the present invention.
Figure 19D:
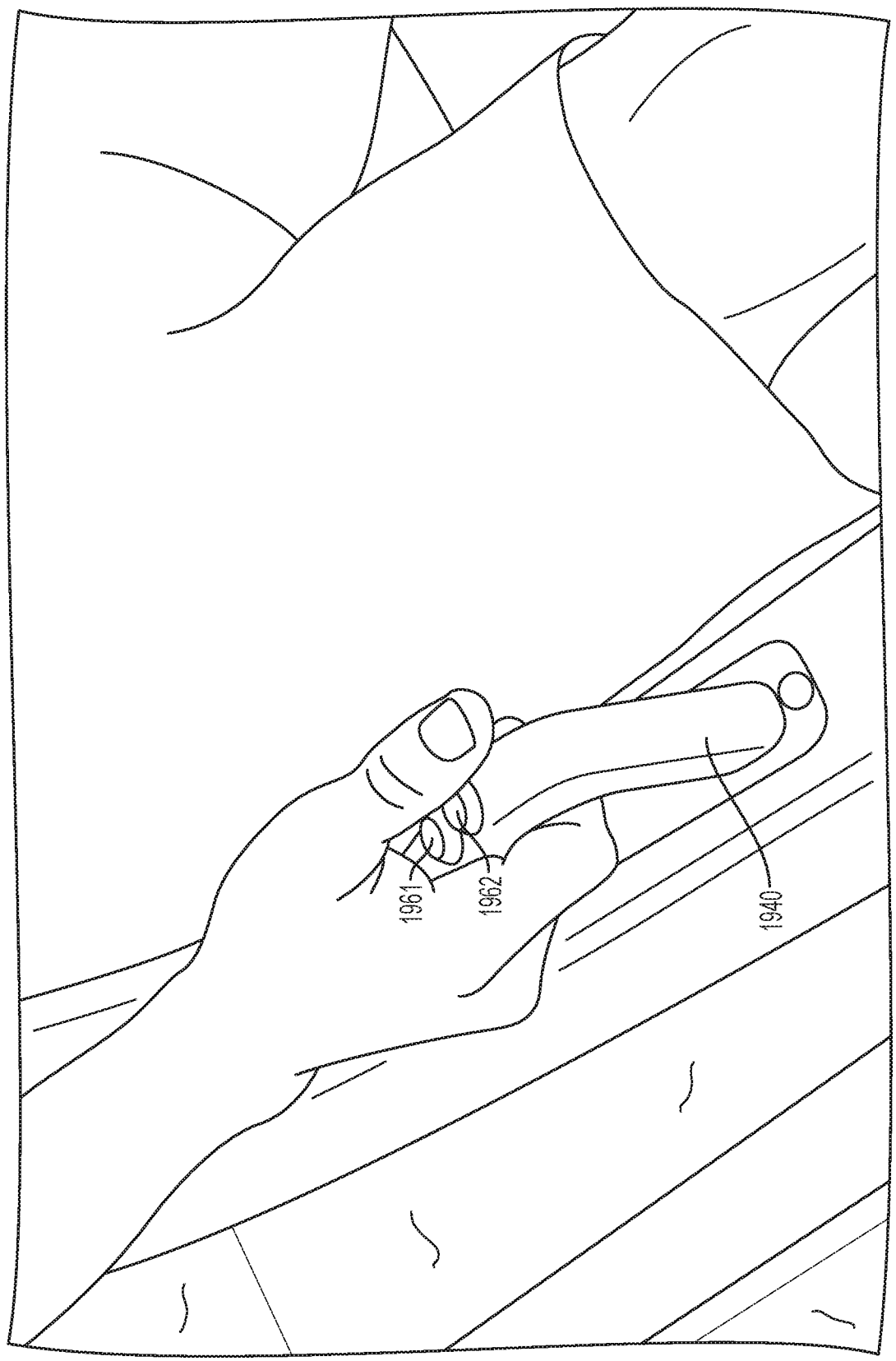
FIG. 19D illustrates a perspective view of a handle of the ride vehicle of FIG. 19A being held by a hand of a rider according to an embodiment of the present invention.

With specific attention on FIGS. 19B and 19C, the ride vehicle 1900 preferably includes a first button 1961 (e.g., blue in color), a second button 1962 (e.g., green in color), a third button 1963 (e.g., yellow in color), and a fourth button 1964 (e.g., red in color) on the handles (1940, 1950) coupled to the ride vehicle 1900, that are configured to interact with a component (e.g., the component and/or sensor 220 of FIG. 2A). The handles (1940, 1950) may function as controllers/gamepads, as discussed above. For example, as a user 1903 slides down a waterslide on the ride vehicle 1900, if a visual indication lights up a color corresponding to the first button 1961 (e.g., blue) when the user is within a vicinity of a component, sensor, and/or receiver capable to detecting such a button press, the user may timely press the corresponding first button 1961 that is coupled with the ride vehicle 1900 in order to activate certain sensory effects (e.g., color illumination), actions, or features of the waterslide (e.g., accumulation of points for the user, display of visual or audible activity, etc.).

In some further embodiments, other visual indication lights may be illuminated and the user can press a corresponding button (e.g., second, third, and/or fourth (1962, 1963, 1964)) that is coupled with the ride vehicle 1900. In some other embodiments, multiple visual indication lights may light up. In this instance, a rider can simultaneously and/or sequentially press multiple color buttons corresponding to the multiple visual indication lights. In some embodiments, multiple visual indication lights may light up in sequence, and a rider may press corresponding buttons in a sequential order corresponding to the sequential lighting order of the visual indication lights. In some embodiments, the visual indication lights and/or their lighting behavior may be different in different portions of the waterslide or may be based on a user's skill. For example, in some embodiments, the ease with which a rider may follow and act-upon the visual indication lighting may increase in difficulty based on their location in the slide or the rider's skill (based on the skill measured during the current ride, or progressively measured from an accumulated skill level developed over previous rides). Similar to the sensors and/or tags 210 described above for FIG. 2A, the water ride vehicle 1900 may include a location mechanism that provides locations of the ride vehicle 1900 as it navigates along the waterslide.

In addition to the color illumination change described above, in some embodiments, a ride vehicle 1900 may include a feedback mechanism that provides the rider with responses via tactile, audible, and/or visual feedback upon successfully or unsuccessfully interacting with the sensor. The feedback mechanism may be used in conjunction with gamepads or controllers (e.g., the handles (1940, 1950) with a plurality of buttons (1961, 1962, 1963, 1964) described above) in order to provide the user with an understanding of the user's performance. In some embodiments, the ride vehicle 1900 includes the feedback mechanism that collects data relating to feedbacks generated from the rider's successful and unsuccessful interactions with all sensors throughout the ride, and transfers the data, via wireless protocols (e.g., radio frequency protocols, mesh network, smart mesh, or Wi-Fi standards including 802.11), to a database system (e.g., a computer or computer network) that in turns displays the data for viewing. In some embodiments, the feedback mechanism transfers the collected data in real time.

Figure 14B:
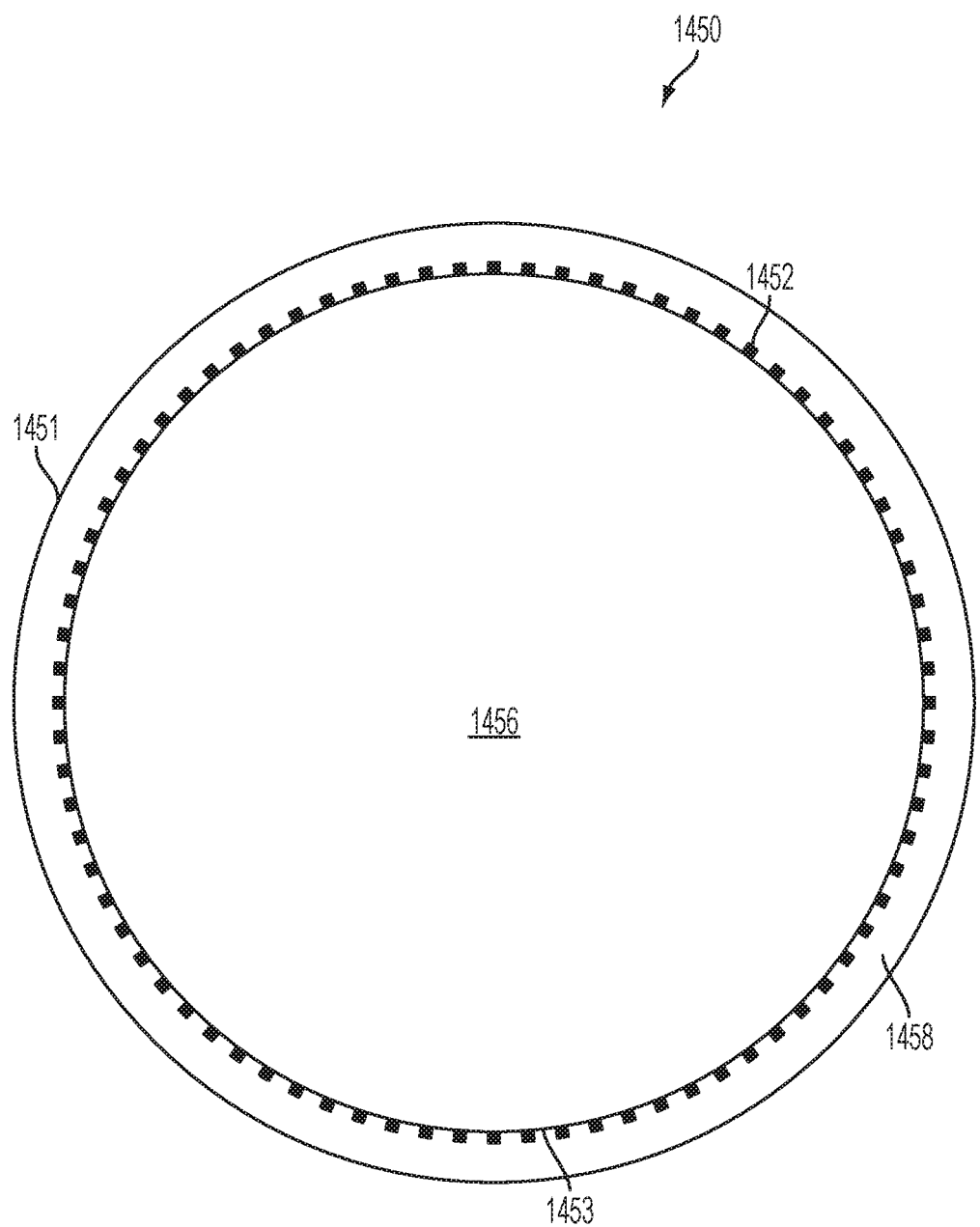
FIG. 14B illustrates a cross-sectional view of a waterslide tube with integrated light strips according to an embodiment of the present invention.

In some embodiments, the plurality of buttons (1961, 1962, 1963, 1964) are capable of being submerged under water. Such buttons may include, for example and without limitation, membrane switches, piezo switches, pressure switches, rotary switches, joysticks, and toggle switches. As discussed throughout, the plurality of buttons (1961, 1962, 1963, 1964) on the ride vehicle 1900 may be incorporated into any of a variety of types of waterslide or amusement ride attractions that include visual illumination capabilities. For example, some embodiments can include a waterslide or amusement ride that comprises a chute or tube that includes at least one visual indicator including one or more light emitting components. As discussed earlier, the waterslide can comprise a flume comprising a clam-shell as shown in FIGS. 12A and 12B that includes an inner member comprising an inner surface (i.e., a ride surface) that can be at least partially submerged in water, and an outer member that includes an outer surface and an inner surface. In some further embodiments, by coupling two clam-shells, a waterslide chute or tube can be constructed. In some other embodiments, the clam-shell halves can be used to fully enclose a waterslide. For example, in some embodiments, two substantially identical clam-shells (for example, those shown in FIGS. 12A and 12B) can be wrapped around a waterslide to form a substantially enclosed waterslide as depicted in FIGS. 14A and 14B, as discussed in greater detail above.

Figure 20:
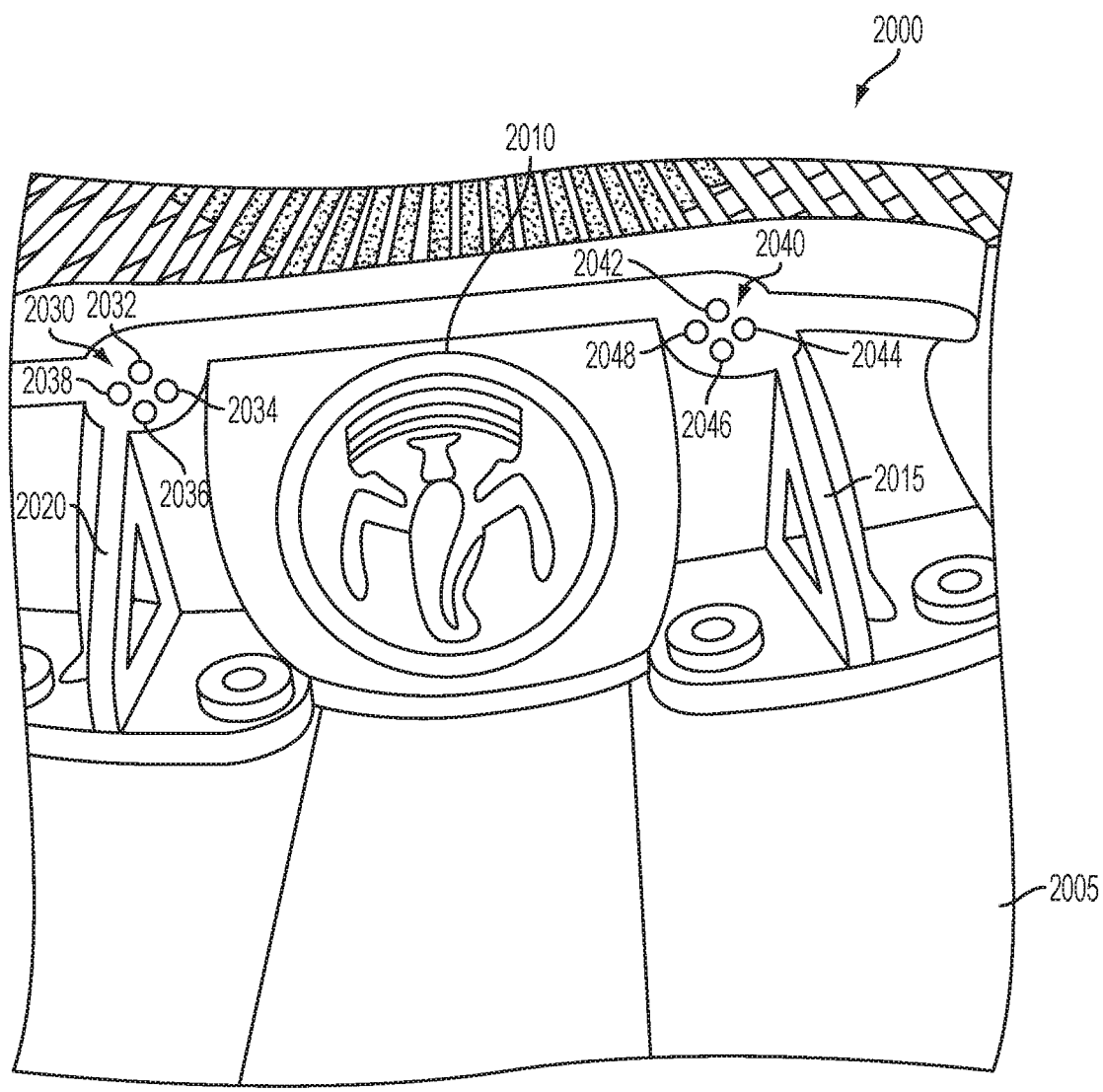
FIG. 20 shows a rider perspective view of a portion of a ride vehicle for riding on a waterslide capable of visual illumination according to an embodiment of the present invention.

FIG. 20 shows a rider perspective view of a portion of a ride vehicle or slideboard 2000 for riding on a waterslide capable of visual illumination. The waterslide and/or ride vehicle or slideboard 2000 may include features that are the same as or similar to those previously described. The ride vehicle or slideboard 2000 includes a supporting surface 2005 configured to support all or a portion of a rider's body (e.g., a rider's torso) and a first handlebar, member, or contact point 2015 and a second handlebar, member, or contact point 2020 that the rider may grip, hold onto, or otherwise put all or a portion of their hands or other body part therethrough while using the ride vehicle or slideboard 2000 to ride down the waterslide. Adjacent to the first handlebar, member, or contact point 2015 is a first grouping 2040 of interactive elements or mechanisms (e.g., illustrated as buttons). For example, as shown, four buttons may be used, each button corresponding to a different color. A first button 2042 (e.g., yellow), a second button 2044 (e.g., red), a third button 2046 (e.g., green), and a fourth button 2048 (e.g., blue) may be configured to be pressed by the rider (e.g., via the rider's thumb) using his/her hand that is also gripping the first handlebar, member, or contact point 2015. The first grouping of interactive elements 2040 is configured to interact with (e.g., via wireless communication) the controller controlling the visual illumination. In an alternative embodiment, the first grouping 2040 of interactive elements may interact with a local controller, processor, memory, or etc. that is not located remotely from the ride vehicle or slideboard 2000 rather than, or in addition to, communication with a remote controller or other electronic system or device of the waterslide. As discussed in greater detail below, pressing one or more of the buttons in the first grouping 440 of buttons may be in response to visual illumination of the waterslide and can cause a modification of the visual illumination or other characteristic of the waterslide.

Similarly, adjacent to the second handlebar, member, or contact point 2020 is a second grouping 2030 of interactive elements or mechanisms (e.g., illustrated as buttons). For example, as illustrated, four buttons may be used, each button corresponding to a different color. A first button 2032 (e.g., yellow), a second button 2034 (e.g., red), a third button 2036 (e.g., green), and a fourth button 2038 (e.g., blue) may be configured to be pressed by the rider (e.g., via the rider's thumb) using his/her hand that is also gripping the second handlebar, member, or contact point 2020. The second grouping of interactive elements 2030 is similarly configured to interact with (e.g., via wireless communication) the controller controlling the visual illumination. In an alternative embodiment, the second grouping 2030 of interactive elements may interact with a local controller, processor, memory, or etc. that is not located remotely from the ride vehicle or slideboard 2000 rather than, or in addition to, communication with a remote controller or other electronic system or device of the waterslide. As discussed in greater detail below, pressing one or more of the buttons in the second grouping 2030 of buttons may be in response to visual illumination of the waterslide and can cause a modification of the visual illumination or other characteristic of the waterslide and/or the ride vehicle or slideboard 2000 (e.g., the ride vehicle or slideboard 2000 may emit a sound and/or vibration that can be sensed by the rider).

The first grouping 2040 and the second grouping 2030 of buttons may be configured to operate in sync with one another. For example, if a visual illumination on the waterslide shows a moving yellow band of light towards the rider, the rider may press either the first button 2042 of the first grouping 2040 of buttons or the first button 2032 of the second grouping 2030 of buttons in order to adequately or accurately provide the desired user input to modify the visual illumination on the waterslide. In other embodiments, the first grouping 2040 and the second grouping 2030 of buttons may not be configured to operate in sync with one another. For example, a yellow band of light on the left-hand side of the waterslide may only be adequately or accurately responded to by the rider by pressing the first button 2032 of the second grouping 2030 of buttons while a yellow band of light on the right-hand side of the waterslide may only be adequately or accurately responded to by the rider by pressing the first button 2042 of the first grouping 2040 of buttons.

Any of a variety of numbers of buttons, sizes of buttons, button placement, numbers of groups, and/or corresponding visual distinguisher (e.g., colors, shapes, images, etc.) may be used for the buttons on a ride vehicle or slideboard in alternative embodiments. In one example, only one button may be used, such as in a center portion 2010 of the ride vehicle or slideboard 2000. The buttons may interact with any of a variety of components, such as a transmitter, that is built into the ride vehicle or slideboard 2000 (e.g., encased in the center portion 2010) in order to protect the components from contact with water that is on the waterslide. In one embodiment, the transmitter may interact (e.g., wirelessly communicate) with other electronic or computing components that cause modifications to the visual illuminations and/or other stimuli or statistics associated with the water slide or with the user. In an alternative embodiment, interactive components that may be manipulated by a rider may not transmit to remote devices or systems, but may instead store such manipulation information (e.g., timing of a button press, etc.) locally on equipment connected with the ride vehicle or slideboard 2000.

Figure 21A:
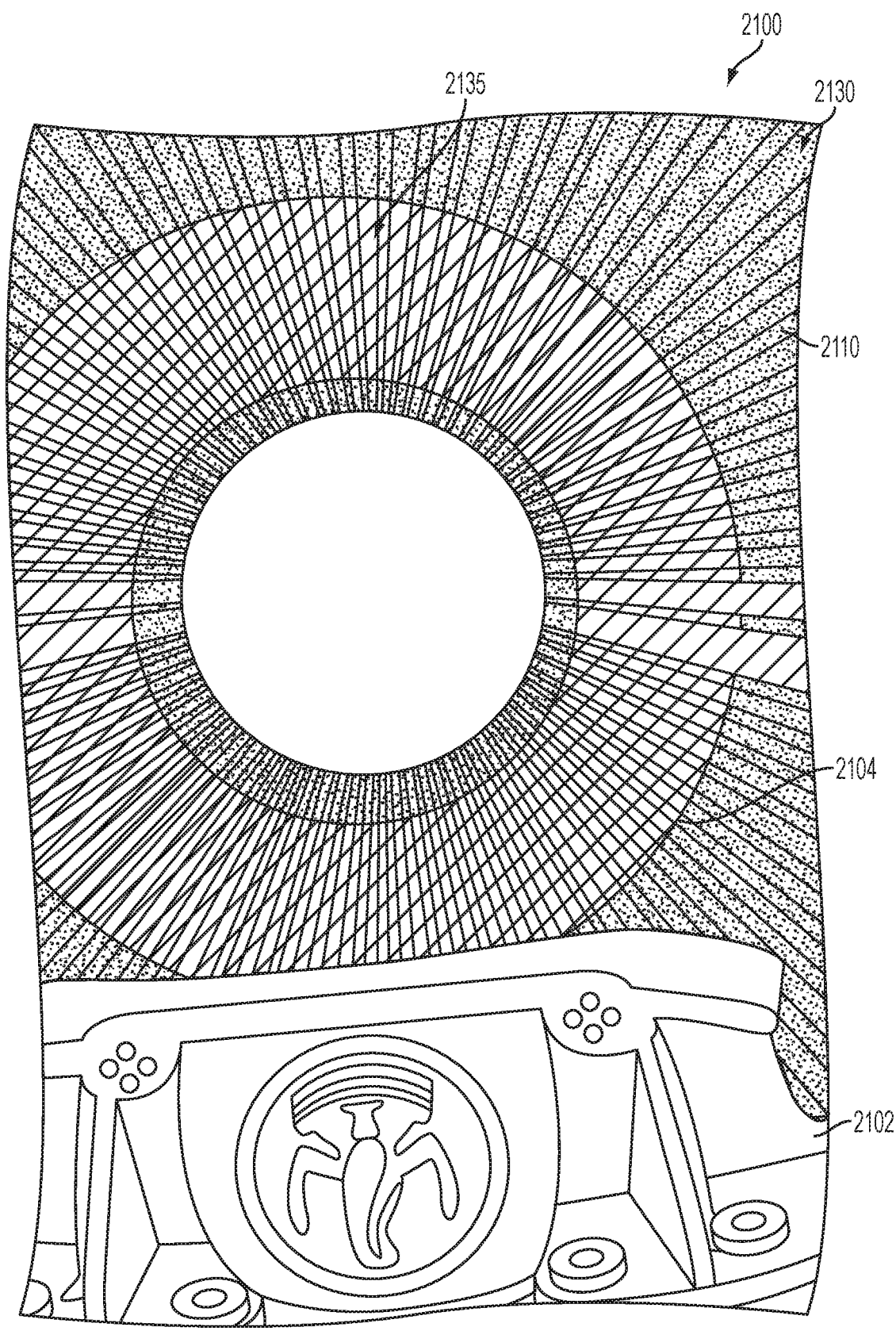
FIG. 21A shows a rider perspective view of a waterslide clam-shell capable of a first visual illumination according to an embodiment of the present invention.
Figure 21B:
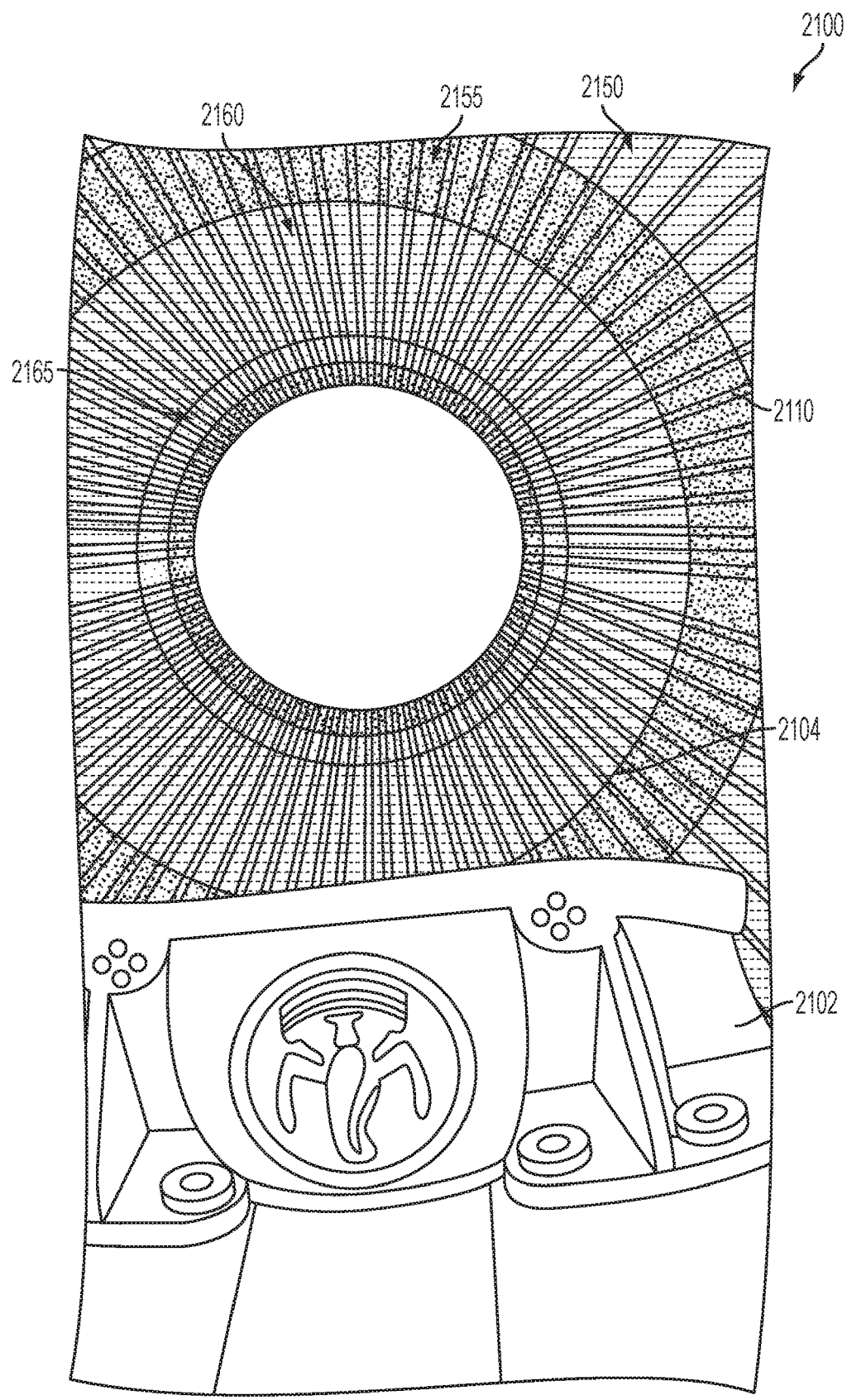
FIG. 21B shows a rider perspective view the waterslide clam-shell capable of a second visual illumination according to an embodiment of the present invention.

FIGS. 21A and 21B shows a rider perspective view of a waterslide 2100 capable of a first visual illumination and a second visual illumination for the purposes of providing a game or sense of rider skill as a rider travels on the waterslide 2100. The waterslide 2100 may include features that are the same as or similar to those previously described. As illustrated, a rider is configured to use a ride vehicle or slideboard 2102 or other ride vehicle to slide down a sliding surface 2104 of the waterslide 2100. The slideboard 2102 includes one or more interactive elements (e.g., buttons) that may be manipulated (e.g., pressed) and that correspond to a target that is shown to the rider via the visual illumination displayed by the waterslide 2100. The same as or similar to the previous discussions, the waterslide 2100 may incorporate a plurality of lights 2110 (e.g., LEDs) that are arranged in strips along the waterslide 2100 for creating such visual illuminations to the rider.

In one example, as shown, the plurality of lights 2110 can visually display to the rider a first presentation 2130 (e.g., blinking or flashing white lights that "sparkle" and appear to move and/or rotate around the waterslide 2100). The plurality of lights 2110 can also visually display to the rider a second presentation 2135 (e.g., a colored band of light that moves or shifts towards and/or away from the rider) as the rider slides down the waterslide 2100. FIG. 21B shows the waterslide 2100 using the plurality of lights 2110 to visually display to the rider a third presentation 2150, a fourth presentation 2155, a fifth presentation 2160, and a sixth presentation 2165. These presentations (2150, 2155, 2160, 2165) form a plurality of circles or bands of light that move or shift along the waterslide 2100 as the rider slides down the sliding surface 2104 of the waterslide 2100 on the ride vehicle or slideboard 2102.

Varying rates of speed may be used for the movement of such bands of light in order to provide a faster-feeling or slower-feeling ride experience. For example, although the rider may only be physically traveling at 5 mph down a water slide, the bands of light may be configured to move or shift towards the rider at 15 mph, causing a sensation of speed at 20 mph for the rider. Similarly, although the rider may be physically traveling at 10 mph down a water slide, the bands of light may be configured to move or shift away from the rider at 5 mph, causing a sensation of speed at 5 mph for the rider. Dizzying effects may be created by strobing, flashing, rotating, or otherwise presenting images, colors, shapes, or patterns to the rider with disorientating characteristics.

Figure 23:
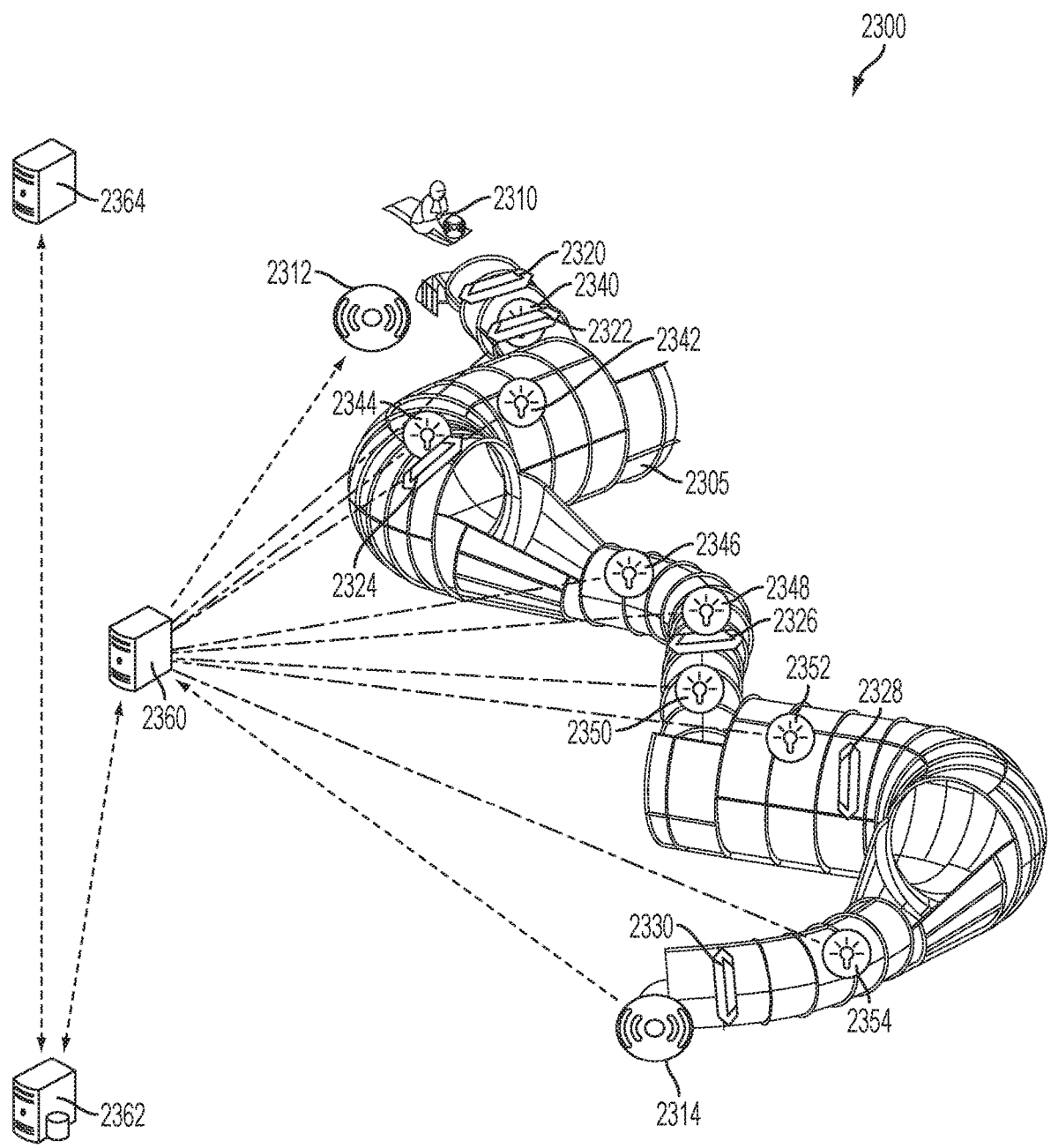
FIG. 23 shows a perspective view of an amusement attraction for determining a position of a rider according to an embodiment of the present invention.

The same as or similar to discussions throughout, a rider's interactions, skill, or reflexes may be tested on the waterslide 2100 by asking the rider to appropriately provide user input via interactive elements (e.g., buttons) on the ride vehicle or slideboard 2102 in response to visual illuminations of the waterslide 2100 displayed via LED strips. In one embodiment, one or more bands of colors may be configured to shift towards a rider at a predetermined speed or rate and the rider is configured to respond by manipulating one or more interactive elements when the one or more bands of colors is within a predetermined distance from the rider. For example, the rider may press a red button when a red band of color is within a predetermined distance from the rider and a blue button when a blue band of color is within a predetermined distance from the rider. This distance from the rider may be any of a variety of desired distances, for example, based upon the speed and location of the rider and/or ride vehicle along the waterslide. Thus, the rider location may be tracked along the waterslide in order to determine this predetermined distance for interactive element manipulation (e.g., FIG. 23 shows one possible way of tracking a user to determine such predetermined distances from the rider). In another embodiment, a target (e.g., a light or group of lights) may illuminate (e.g., after previously not being illuminated) so that the user may press a corresponding button when within a predetermined distance to the target.

In another embodiment, different colors, shapes and/or patterns may be configured to be displayed and the rider is configured to press a corresponding button when the different color, shape, and/or pattern is seen. The further away that a color, shape and/or pattern is located from the rider on the waterslide 2100 may result in different rewards (e.g., higher points). In another embodiment, different colors, shapes, and/or patterns may be configured to move towards or away from the rider at different speeds to simulate a sense of speed for the rider, either in response to previous rider input or automatically. For example, if the rider adequately responds by pressing a button to a previously displayed target, various colors, shapes, and/or patterns may be caused to rush towards the rider to simulate a "speed boost" and provide the rider with a thrilling reward experience in response to the user input.

Likewise, if the rider does not adequately respond by pressing a button to a previously displayed target, various colors, shapes, and/or patterns may be caused to rush away from the rider to simulate a "speed reduction" and not reward the rider with the simulated rush of speed. Similarly, bursts or "explosions" of illuminated colors, shapes, and/or patterns may be displayed in response to user input that do not appear to animate towards or away from the rider in response to rider input in order to give feedback to the rider as to whether the rider correctly manipulated one of the interactive elements. Other elements, in addition to or in replacement of, may provide feedback to the riders, such as sound, vibration, etc.

In yet another embodiment, bands of light or other colors, shapes, and/or patterns may be "chased" by the rider as the rider travels down the waterslide 2100. For example, various speed boosts or speed reductions, the same or similar to those described above, may give the sensation to the rider of chasing after a particular object as the rider travels on the waterslide 2100 and responds to targets with rider input. Adequate rider input responses (e.g., correct button presses) may bring the rider closer to the band of light or other color, shape, and/or pattern that is being chased while inadequate rider input responses (e.g., failing to correctly or timely press a button) may result in the rider getting further away from the band of light or other color, shape, and/or pattern that is being chased.

Any of a variety of visual illuminations may be displayed and/or moved and/or changed along the waterslide 2100 as a rider travels down the waterslide 2100. Themes may be setup (e.g., under the ocean, raging rivers, etc.) wherein not only may objects that correspond to such themes (sea mammals, fish, etc.) get displayed for the rider, but the sense of speed may be altered depending upon the sensation desired for the rider at a particular portion of the waterslide 2100. For example, if a raging river theme is chosen, objects may be configured to rapidly move towards the rider in order to provide an increased sense of speed for the rider. Such a sense of speed for a rider may be continually modified based upon the rider input, the experience getting increasingly faster as the rider sequentially inputs adequate rider input responses and/or slowing down as the rider begins missing adequate rider input responses.

Any of a variety of audible or other sensory or general characteristics or features may be enabled in addition to, or in place of, visual illuminations (e.g., entering a "cave-themed" portion of the waterslide 2100 may result in the LEDs being turned off, but sound effects of wind or cave creatures may be played with vibration of the slide and/or ride vehicle to simulate rapids, scented air sprayed in the vicinity of the rider, water jets or geysers sprayed onto the rider or onto the waterslide 2100, and/or any of a variety of other such features. Other examples of characteristics or features may include modifying temperature, moisture content, opacity or transparency of one or more portions of the waterslide, physical actuation of slide portions or components (e.g., ramps, dips, branching slide paths that open or close, etc.)

In alternative embodiments, wraps, coatings, printed plastics or other materials may be used in addition to, or in replacement of, illuminated components of a waterslide in order to provide visually stimulating or themed attractions. For example, a printed wrap showing outer space may be augmented with illuminating lights to show twinkling of stars and/or movement. Any of a variety of possible scenes or themes may be created using illuminated components, non-illuminated components, or both. For example, a waterslide flume may be 54 inches diameter and a coating or wrap may be disposed along an interior surface of the flume. The coating and/or wrap may provide an additional means to lower friction during use and/or may provide visual stimuli to the rider (e.g., via painted, printed, etc. theming upon the coating and/or wrap and/or for providing a means of applying lights such as LEDs to an interior of the flume). Additional structure, such as risers may be used and connected with the flume for application of theming, lighting, audio, etc. to an amusement attraction. In such a fashion, existing amusement attractions that do not have such lighting, targeting, sound, and/or other concepts as discussed throughout may be retrofitted onto these existing amusement attractions to provide these attractions with new functionality and/or features.

Figure 22:
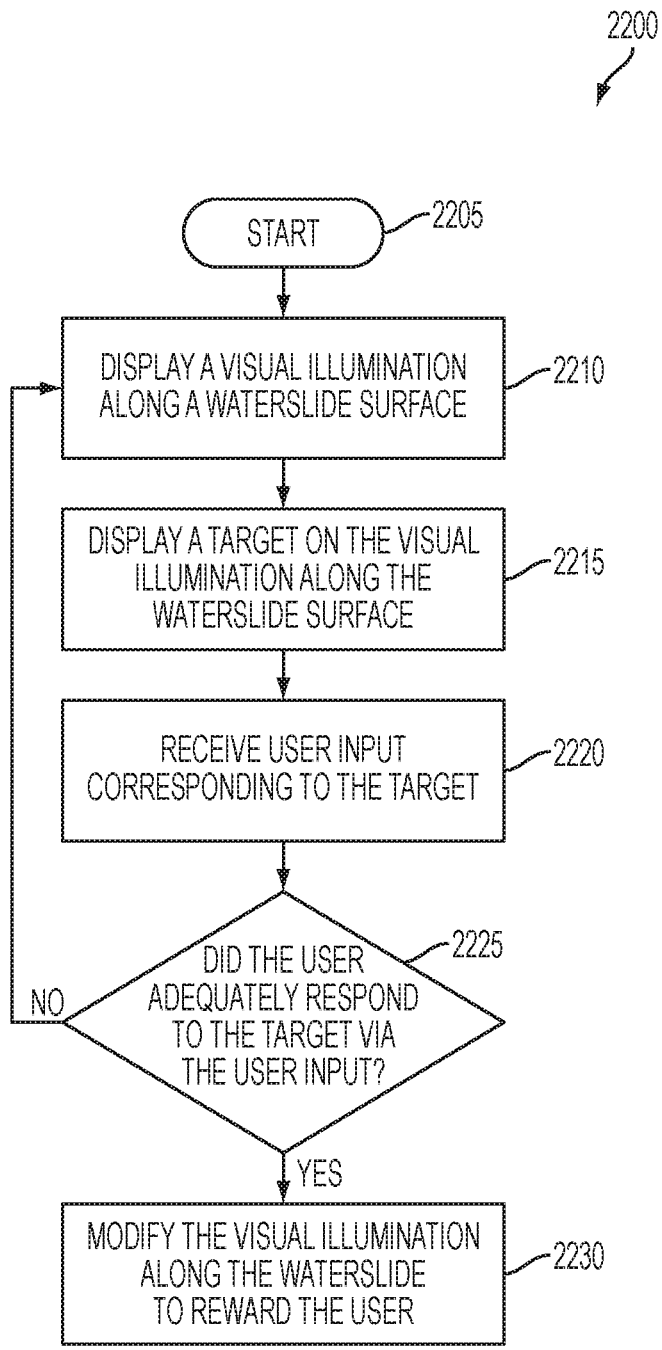
FIG. 22 shows a flowchart of a method for modifying a visual illumination of a waterslide in response to user input according to an embodiment of the present invention.

FIG. 22 shows a flowchart 2200 of a method or process for modifying a visual illumination of a waterslide in response to user input. The waterslide may include features that are the same as or similar to those previously discussed. At step 2205, the process begins, for example, upon initiation of a run down the waterslide by a user. This initiation may begin automatically upon sensing that a rider has begun decent down the waterslide or is located at a particular location along the waterslide (e.g., using lasers, weight sensors, or other sensors to determine a position and/or speed of a rider. In an alternative embodiment, the initiation may occur in response to an operator of the ride indicating that a rider is beginning the descent down the waterslide (e.g., by pressing a start button).

At step 2210, a visual illumination is displayed along a surface of the waterslide for viewing by the rider. As previously discussed, such illuminations may be any of a variety of colors, shapes, patterns, themes etc. At step 2215, a target is displayed on or via the visual illumination along the waterslide surface. As previously discussed, the target may be any of a variety of colors (e.g., a color band), shapes, patterns, objects, etc. and can be static or animating or moving towards or away from the rider.

At step 2220, user input is received from the rider in response to the target displayed at step 2215. For example, if the target is a band or illumination of a particular color, the rider may correspondingly press a button having the same color when the band of the particular color is within a predetermined distance from the rider. The user input may be obtained in a variety of alternative manners in alternative embodiments, for example, by positioning a tag (e.g., an RFID tag) within a predetermined distance from a sensor, sensing contact by the rider or ride vehicle with a particular portion or area of the waterslide, etc. In another example, user input may be obtained via any interactive element that can be moved and/or otherwise manipulated by a rider. In embodiments where the waterslide is configured to allow sliding motion of the rider thereon without any additional ride vehicle, the interactive element may be worn, held, or otherwise manipulated by the rider. Alternative embodiments may couple the interactive element with a ride vehicle (e.g., mounted or connected to the ride vehicle, embedded within the ride vehicle, etc.), held by the rider, worn by the rider, or any other manner that allows the rider to manipulate (either by physically pressing, switching, sliding, etc. a component or by moving a tag within a particular distance of a sensor).

At step 2225, it is determined whether the rider of the waterslide adequately responded to the target displayed in step 2215, via the user input received in step 2220. For example, if the target was a band or illumination of a particular color, an adequate response may have been by pressing the button having the same color when the band of the particular color was within a predetermined distance from the rider. If the rider did not adequately respond per the programming of the waterslide system, operation continues back to step 610 where the displaying of visual illuminations and/or targets is repeated until the rider has finished traveling down the waterslide or otherwise is no longer within the portion of the waterslide capable or presenting visual illuminations. However, if the rider did adequately respond per the programming of the waterslide system, operating continues to step 2230.

At step 2230, the visual illumination along the waterslide is modified to reward the user for adequately responding to the previous target displayed at step 2215. In one example, this may involve displaying one or more colors, shapes, and or patterns to the user, indicating successful user input. In another example, this may involve increasing the rate of speed that the visual illuminations and/or targets are moved towards the rider, providing a thrilling sense of increased speed and/or difficulty to the rider. Any of a variety of rewards may be provided in an alternative embodiment, either via visual illuminations or otherwise. For example, if a user has associated a "score" or accumulation of points based upon successful user input in response to targets, adequate response may result in accumulation of additional points in place of, or in addition to, modification of the visual illumination.

Still other embodiments of rewards for successful user input may include, physically manipulating portions of the waterside slide path (e.g., raising or lowering portions of the sliding surface, turning on or off jets or flows of water, opening or closing branching pathways on the waterslide for sending a rider down different waterslide paths depending upon the user input, etc.) Any combination of visual stimulus, audible stimulus, or other features, such as vibration of the slideboard or other ride vehicle portion, may be used for providing responses to the user input received at step 2220. Optionally, if the user fails to adequately respond to the target displayed at step 615, the programming of the waterslide system may loop back to step 2210 and test the rider's response again.

As discussed throughout, a distance to a rider or rider position in general along a waterslide or other amusement attraction may be desirably determined. FIG. 23 illustrates one embodiment for determining a location of a rider 2310 as the rider traverses an amusement attraction 2300. The amusement attraction 2300 may be made up of a plurality of segments 2305 (e.g., flume segments) that connect with one another (e.g., via flanges) to form a slide path for the rider 2310 to traverse, either on a ride vehicle or without.

A first communication point 2312 that is linked (e.g., wirelessly or wired) or otherwise capable of communication with a game system 2360 (e.g., a computer or other electronic system or device) is located near or adjacent to an entrance point of the amusement attraction 2300 may communicate with the rider 2310 and/or ride vehicle to establish an initial data point establishing a start time for the user to begin descent down the amusement attraction 700. Other data may additional or replaceably be transferred via the communication point 2312 (e.g., user profile information, user statistics, etc.). A plurality of synchronization points (2320, 2322, 2324, 2326, 2328) are disposed along the slide path of the amusement attraction 2300 and provide additional data for tracking the location of the rider 2310 along the amusement attraction 2300.

For example, the synchronization points (2320, 2322, 2324, 2326, 2328) may be magnetic in nature such that when a user passes within a predetermined distance of a particular synchronization point (2320, 2322, 2324, 2326, 2328), data indicating that the rider is in such vicinity is triggered and/or relayed to the game system 2360. This data alone, or in conjunction with other information (e.g., an elapsed time determined from a previous synchronization point (2320, 2322, 2324, 2326, 2328) and/or communication point 2312 may be used to determine certain characteristics, such as velocity, of the rider. In this fashion, the rider 2310 may be tracked and/or estimates as to where the rider 2310 will be located along the amusement attraction 2300 at a known time in the future may be determined. Using these determinations, various gaming possibilities (e.g., asking a user to manipulate an interactive element when within a predetermined distance of a target (2340, 2342, 2344, 2346, 2348, 2350, 2352, 2354)) may be incorporated into the amusement attraction, for example, as previously discussed. A final communication point 2314 that is linked (e.g., wirelessly or wired) or otherwise capable of communication with the game system 2360 (e.g., a computer or other electronic system or device) is located near or adjacent to an exit point of the amusement attraction 2300 may communicate with the rider 2310 and/or ride vehicle to determine and/or relay information to the game system 2360 for final display or calculation of rider statistics (e.g., upon a scoreboard).

The game system 2360 may interact with memory (e.g., a database 2362) that stores user data in order to operate the amusement attraction 2300 according to one or more characteristics of a particular rider 2310 (e.g., making successful user interactions in response to the targets (2340, 2342, 2344, 2346, 2348, 2350, 2352, 2354) easier or harder based upon age of the rider, number of times the rider has ridden the amusement attraction 2300, a selected skill level chosen by the rider 710, etc.) A registration station or system 2364 may be provided for users to input such characteristics and/or any other information that may be stored in the database 2362.

As discussed above for FIG. 23 and elsewhere, in certain embodiments, a rider (e.g., using a ride vehicle, such as those having one or more features discussed throughout) may travel upon an amusement attraction (e.g., a waterslide) configured to track and/or allow interaction with the rider. A communication point may be located at an entrance and an exit of the attraction. The attraction may include includes one or more targets and/or magnetic sync points along a travel path of the rider. A ride vehicle is configured to allow interaction with the targets and/or sync points. In certain embodiments, target size and/or power requirements may vary at different locations along a travel path of the rider (e.g., targets at an entrance to an attraction may be larger and/or require additional power or brightness to account for ambient sunlight at such location that may not be present in the middle of a darker flume or portion of the travel path. One or more targets may be waterproof and/or water resistant in certain embodiments. In other embodiments, one or more targets may be embedded in or at least partially surrounded by a waterproof or water resistant material (e.g., urethane).

In one embodiment, operation of a ride may proceed as follows. The rider may first register at a syncing and/or registration kiosk or station. User information may be stored in a database. Riders who have registered are able to sync themselves to the ride vehicles so that various data and/or indications generated via interaction between the attraction's tracking system and the ride vehicle can be credited to the respective rider. Registered users' data, including information such as past performance, may also be stored in the Database. Once the rider is at the attraction entrance, the ride vehicle sends the rider's information via the communication point 2312 (for example, by way of IR (infrared) or RF (radio frequency) signal) to the Game System. 2360.

Using IR Communication, the ride vehicle may receive unique identifiers from each target on its way down the flume. The ride vehicle may be outfitted with both an emitter and/or a receiver. At the entrance to the attraction, the ride vehicle sends its' synced information (e.g., ride vehicle number and rider number) to the game system 2360 via IR. A dedicated IR receiver built into the attraction may be used to receive this information. The game system 2360 pulls that rider's information from the database and assigns a game level. This information is then sent back via IR to the ride vehicle. As the ride vehicle encounters each target in the flume, it receives that target's unique number and waits for the expected user action (e.g., button press). No velocity calculations may be needed for such operation and the ride vehicle may simply move from one target to the next and wait for an expected user action. At the bottom of the flume, the ride vehicle sends the total score via IR to the game system 2360 for final calculation of statistics and/or for display upon a leaderboard. In an alternative embodiment, 2-way IR communications may be used such that the ride vehicle is configured to talk with the slide game system 2360 throughout traversal and not just at the bottom after the attraction traversal.

The game system 2360 then pulls the records of the user from the database to determine the user's current level within the game. The game system 2360 then sends the data regarding the user's current level to the ride vehicle, and simultaneously sends configuration data corresponding to the user's current level to the Targets so that the Targets would function in a manner that demands a corresponding level of skill from the user (such as shorter response time or complicated response maneuver) in order to be successful (e.g., score points). In some embodiments, the targets may include a variety of visual indication lights. In order to successfully pass a target, the user may be required to press a corresponding button coupled with the ride vehicle within a response time (which is determined by the game system 2360 based on the user's current level). In some other embodiments, multiple visual indication lights may light up. In this instance, the rider may be required to simultaneously and/or sequentially press multiple corresponding buttons within the response time in order to successfully pass a target. In some embodiments, the visual indication lights may include different colors and/or visual graphics.

When the rider enters the attraction, the ride vehicle uses an array of sensors that tracks its location as it moves over the magnetic sync points. The ride vehicle, which includes a microprocessor and memory, calculates its current location based on a velocity profile built when the ride vehicle passes over the first two magnetic sync points, and the ride vehicle continues to calculate and analyze its location as it passes over the remaining magnetic sync points. For example, an array of Reed Switches (discussed in greater detail herein) may be connected with the ride vehicle and as they pass over a magnetic sync point, a processor of the game system 2360 makes a note and calculates the time it took to get from the previous magnetic sync point to the current magnetic sync point in order to calculate the current velocity. This velocity determination provides an accurate approximation of the location of the ride vehicle based on the known slide path. This determined location can then be used by the game system 2360 to control a variety of other aspects of the waterslide (e.g., activation of targets, activation of lights, activation of sounds, etc.) The ride vehicle location may be sent to the game system 2360 in real time for display. In alternative embodiments, other means of determining location of the ride vehicle may be used (e.g., use of ultra-sonic range fingers that incorporate bursts of ultrasound and listen for an echo, use of a beam of light that becomes broken by the rider and/or ride vehicle to indicate the current location, use of RFID to sense location of the rider and/or ride vehicle, use of a Wi-Fi enabled microprocessor such that two-way communication permits determination of location, etc.

Throughout the attraction, the ride vehicle records the data relating to the user's responses (i.e., pressing buttons) and their timing, and analyze those presses against the manner and timing that is expected from the user based on the user's level. In addition, the ride vehicle may also records data relating other aspects of the user's performance such as play level, number of attempt, calories burned, score points, etc. At the end of the game, the ride vehicle sends the data or score to the game system 2360 and the database via the communication point 2314 at the exit. Alternatively, the ride vehicle may transfer said data wirelessly in real time to the game system 2360 and/or the database.

The game system 2360 comprises a computer or the equivalent that runs the tracking system and/or gameplay of the attraction and/or may also communicate with other components, including the targets, communication Points, magnetic sync points, the database, and the syncing and/or registration kiosk. The game system 2360 may also be configured to communicate with other external devices such as other computers or mobile devices. In this manner, users may access and view their data and/or modify their information via, for example, internet websites or mobile applications (i.e., applications installed on mobile devices).

Targets used in the waterslide may indicate a color or a shape to a user that is then expected to be pressed (e.g., via a button) by the user on the ride vehicle. The targets may be made of groups of LEDs. The targets may be manufactured with waterproof enclosures (e.g., flexible housings such as silicone, urethane, etc.) to help ensure reliability in wet environments. In some embodiments, targets may be placed outside of the interior volume of the flume to keep them away from water. A processor or computer system may control one or more of the targets of the waterslide, such that varying difficulty levels may be employed (e.g., based upon a user registering and/or syncing with the slide). For example, if a user has a low difficulty characteristic associated with his or her registration information, the processor or computer system may control the targets to illuminate to the user such that more simplistic responses are required in order to register with the system as a successful interaction (e.g., only 2 different colors and/or shapes are used for targets for low difficulty while additional colors and/or shapes are utilized for more advanced difficulties, the time permitted for a button press to be considered successful extended for lower difficulties when compared to more advanced difficulties, etc. In this fashion, the ride may be customized for a particular user's characteristics.

Operation for an interactive experience on an amusement attraction may be the same or similar to the above description in alternative embodiments and/or may utilize all or only some of the above-described components. Alternative components for effecting the same or similar operation may also be used in alternative embodiments.

For example, one general overview for operation (e.g., the same or similar as that described above) of a particular attraction may utilize a game system or computer that, upon communication with a ride vehicle at initiation of the attraction, sends signals to all targets along the attraction to be illuminated and/or of a certain color or other visualization (e.g., animation). Similarly, a game map is sent to the ride vehicle that correspondingly matches to the targets and/or target lights that have been illuminated. In one embodiment, this signaling of targets and/or download of game map to the ride vehicle may occur in a time period after an operator for the attraction (or automatically upon sensing a rider is ready) starts a countdown for the rider to begin their descent. The illumination of targets and/or the game map may be different for different riders and/or for a same rider (e.g., via a rider choosing a particular difficulty setting). In certain embodiments, harder difficulty settings may be "locked" and unselectable by a rider until easier difficulty settings have been beaten according to predefined characteristics.

As the ride vehicle travels along the attraction, the game system detects when the ride vehicle is at a particular position along the attraction (e.g., using magnetic sync points or switches). A target located at the position of a given magnetic sync point informs a rider on the ride vehicle to interact with a manipulatable element of the ride vehicle (e.g., a button that matches the color or other characteristic of the target). The game system or ride vehicle processor may then detect a button press at each magnetic sync point or switch and determine whether it appropriately matched the game map (e.g., did the rider press the appropriate button within an appropriate amount of time in reference to the ride vehicle encountering the magnetic sync point or switch). In one embodiment, to prevent "cheating," the game system or ride vehicle processor may determine the velocity of the ride vehicle using methods the same or similar to previous discussions and automatically lower the user's score or provide other disincentive if the velocity is below a particular threshold, in order to prevent riders from slowing their descent along the slide in order to make successful button presses at each target easier. In one embodiment, a delay may be introduced or accommodated in order to provide for rider expectation (e.g., a sensor on the ride vehicle may be positioned at a location along the bottom of the ride vehicle not at the front of the ride vehicle or not immediately beneath where a rider sits) thus potentially impacting a rider's expectation for when a button must be pressed. At the end of the attraction, the ride vehicle is deactivated and the targets potentially changed for the next rider (and the new game map downloaded to the new rider's ride vehicle) so that the process described above may begin anew.

Alternative embodiments may use any of a variety of tracking systems that differ from the explicit operation previously described and/or shown. For example, rather than magnetic sensing of a ride vehicle, alternative technologies may be used, such as RFID, NFC, GPS, Bluetooth, 3d cameras, triangulation, IR sensing, photo sensing, laser or beam breakage, wireless communication (e.g., wireless signals communicated and where determined to be strongest would indicate the current position of the ride vehicle, barcode, cell phone or tablet data connection such as via a wearable cell phone or device, proximity detectors, etc.) Tracking of the ride vehicle position can be used can modify operation of any of a number of features beyond target interaction (e.g., audible feedback to a rider from speakers along the attraction and/or on the ride vehicle, visual feedback to a rider from displays mounted along the attraction and/or on the ride vehicle, tactile feedback, such as vibration, to a rider, enabling of amusement ride features, such as water jets, explosions, etc.)

Figure 24A:
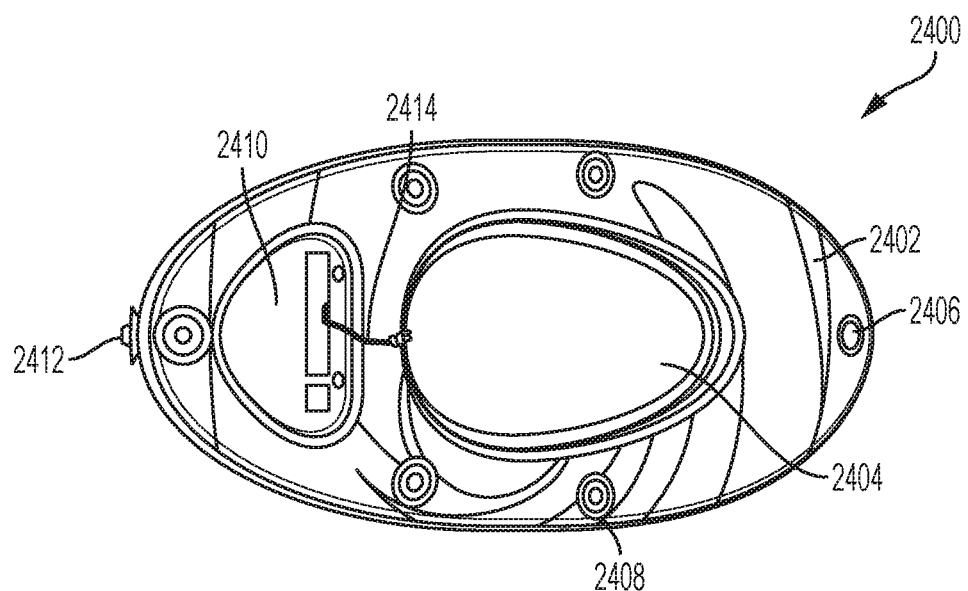
FIG. 24A shows a top view of a ride vehicle under partial construction according to an embodiment of the present invention.

FIG. 24A shows a top view of a partially assembled ride vehicle 2400 that may be used on an amusement attraction (e.g., a waterslide attraction). The ride vehicle 2400 and/or the amusement attraction may include features that are the same as or similar to those discussed throughout. The ride vehicle 2400 may have a body portion 2402 (e.g., inflatable or non-inflatable), a portion of which may be adapted to slide upon and/or travel along a ride surface of the amusement attraction. In one embodiment, all or a part of the body portion 2402 may be made of a dropstitch material. The dropstitch material may be inflatable or partially inflatable. The use of dropstitch material may aid in stability of the ride vehicle 2400 and/or aid in durability of the ride vehicle 2400. For example, if the body portion 2402 has a substantially flat bottom portion (e.g., inflates flat due to drop stitch material), the ride vehicle 2400 may be less prone to banking and/or flipping over when traveling along the amusement attraction. In addition, a flat body portion 2402 may allow for easier entrance and/or exit by a rider to the ride vehicle 2400. In embodiments where all or a portion of the body portion 2402 is inflatable, a fill hole 2406 may be provided in the body portion 2402 for inputting air or other fluid therein. A coating may be applied to or integrated with the manufacture of all or some of the bottom of the body portion 2402 (e.g., to provide increased durability, to provide a lower coefficient of friction, etc.) or other portions of the body portion 2402. In one embodiment, this coating may have a thickness of 1 mil. In one embodiment, the bottom surface of the body portion 2402 may be substantially smooth The ride vehicle 2400 includes a seating area 2404 for allowing a rider to sit therein. In one embodiment, the seating area 2404 may be a cutout of the material used to form the body portion 2404. The size of the seating area 2404 may vary as desired (e.g., a greater sized seating area 2404 may provide additional weight savings whereas a smaller sized seating area 2404 may provide greater stability for the ride vehicle 2400). The seating area 2404 and/or other components of the ride vehicle 2400 as discussed herein may tend to position a rider into a defined ride position. The seating area 2404 may have a layer of material configured to be disposed between the rider and the waterslide attraction (e.g., flush with a bottom surface of the body portion 2402). Thus, in such embodiments, the rider's body or clothing does not directly touch the amusement attraction and/or any water flowing thereon. This may allow for a more comfortable and/or enjoyable rider experience. Although one seating area 2404 is shown in FIG. 24A, alternative embodiments may include ride vehicles having the same or similar features, but capable of greater riders (e.g., two-seater configurations, 4-seater configurations, 5-seater configurations, 6-seater configurations, etc.). Likewise, although the body portion 2402 of FIG. 24A illustrates a specific shape (e.g., an oval), in an alternative embodiment any desired shape may be used (e.g., circular, cylindrical, resembling a car, resembling a snowmobile, etc.).

Adjacent to the seating area 2404 is an electronics area 2410 for housing one or more electrical components of the ride vehicle 2400. For example, as discussed in greater detail for FIG. 24C, a container (e.g., waterproof or water-resistant) for housing electronic components may be coupled with a backrest that is configured to connect with the body portion 2402 such that all or a portion of the container may fit within the electronics area 2410. Similar to the seating area 2404, the electronics area 2410 may be a cutout of the material used to form the body portion 2404. An electrical connector 2414 (e.g., wire, connector, and/or other components) may be provided for connecting one or more of the electrical components housed within the electronics area 2410 to other ride vehicle 2400 area (e.g., buttons as discussed further herein). A charge port or connection 2412 is provided adjacent to the electronics area 2404 in the body portion 2402 for allowing electrical connection to one or more electrical components housed within the electronics area 2410 (e.g., for charging a battery, troubleshooting, etc.)

In one embodiment, the electronics area 2410 may be configured to house a plurality of components in order to allow participation by a rider in a tracked and/or interactive amusement attraction (e.g., previously discussed, such as for FIG. 23). In such an embodiment, the ride vehicle 2400 may include a processor (e.g., a microprocessor such as an Arduino Pro Mini 328) that may be powered off of a rechargeable 5-volt battery with a USB port. Custom PCBs may be utilized that house the processor, as well as any other pin-ins or pin-outs, such as IR emitter, IR receivers, vibration motors in handles, buttons, reed switch arrays, etc. Bluetooth functionality may be enabled in certain embodiments for communication with a game system computer, for example, as previously discussed. Local data (such as location data, whether magnetic sync points or IR, and button presses) may be logged into a data logger that is stored on a microSD card. Electronics of the ride vehicle 2400 may be encased in a waterproof case to help ensure reliable operation in wet scenarios, such as on water slides, as discussed in greater detail below.

Figure 24B:
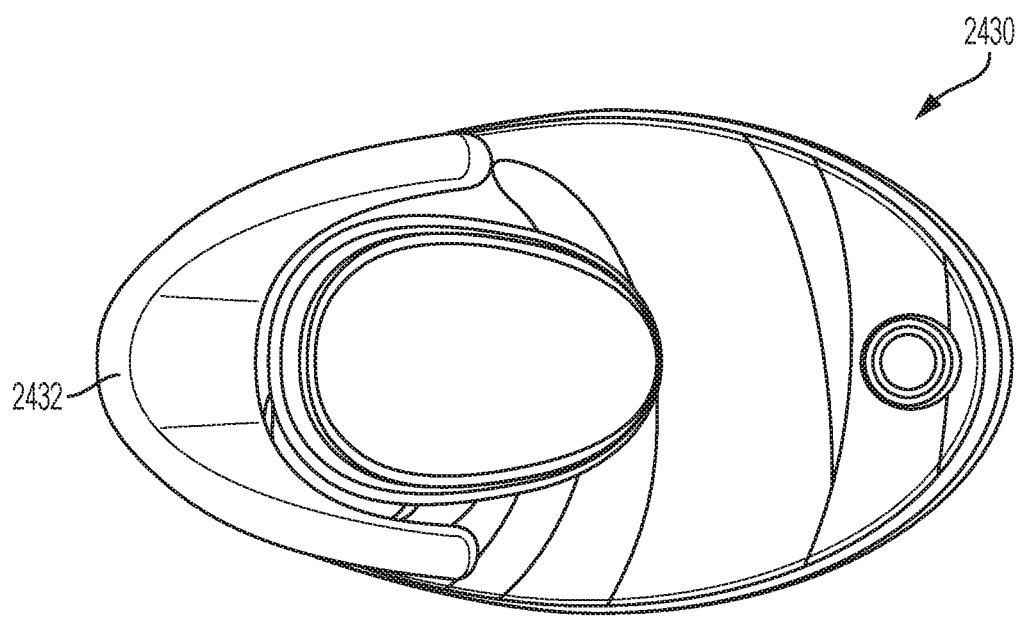
FIG. 24B shows a top view of the ride vehicle of FIG. 24A with additional components according to an embodiment of the present invention.

FIG. 24B shows a top view of a further assembled ride vehicle 2430 when compared to the partially assembled ride vehicle 2400 of FIG. 24A. With reference to FIG. 24A, a backrest component 2432 is coupled with the body portion 2402 via one or more connections 2408 that are integrated with or coupled to the body portion 2402. The backrest component 2432 may be made of a molded material (e.g., foam) in one embodiment and formed so as to provide a surface upon which a rider can lean back against for comfort and/or stability while sitting in the seating area 2404. In an alternative embodiment, the backrest component 2432 may be made of a plastic or other material. In still another embodiment, the backrest component 2432 may be made of an inflatable material.

In certain embodiments, the backrest component 2432 may be removable from the base. An interactive element or segment (e.g., including buttons and associated wiring and/or switches) may also connect with the base section and/or back rest. The interactive element or segment may include handles with such buttons or other manipulatable elements within convenient reach of the hands to accommodate user interaction, as discussed in greater detail below.

In certain embodiments, sensors or other tags may be embedded, included, or otherwise connected with the body portion 2402 and/or the backrest component 2432 and, for example, configured to be sensed during traversal of the amusement attraction in order to determine a particular position (and/or estimate where the ride vehicle or slideboard will be located at a future time) of the ride vehicle 2400 during traversal of the amusement attraction. These sensors or other tags may be included within a molding of the body portion 2402. A rigid or semi-rigid plate may be included in or connected with the body portion 2402 in order to support a rider above the riding surface of the amusement attraction. For example, in this fashion, a rider seated on the ride vehicle 2402 in the seating area 2404 may not directly encounter the flow and/or feel the force of water on their buttocks when seated or groin area when traversing the amusement attraction, but instead be positioned upon a plate (or other material) separating them therefrom.

Figure 24C:
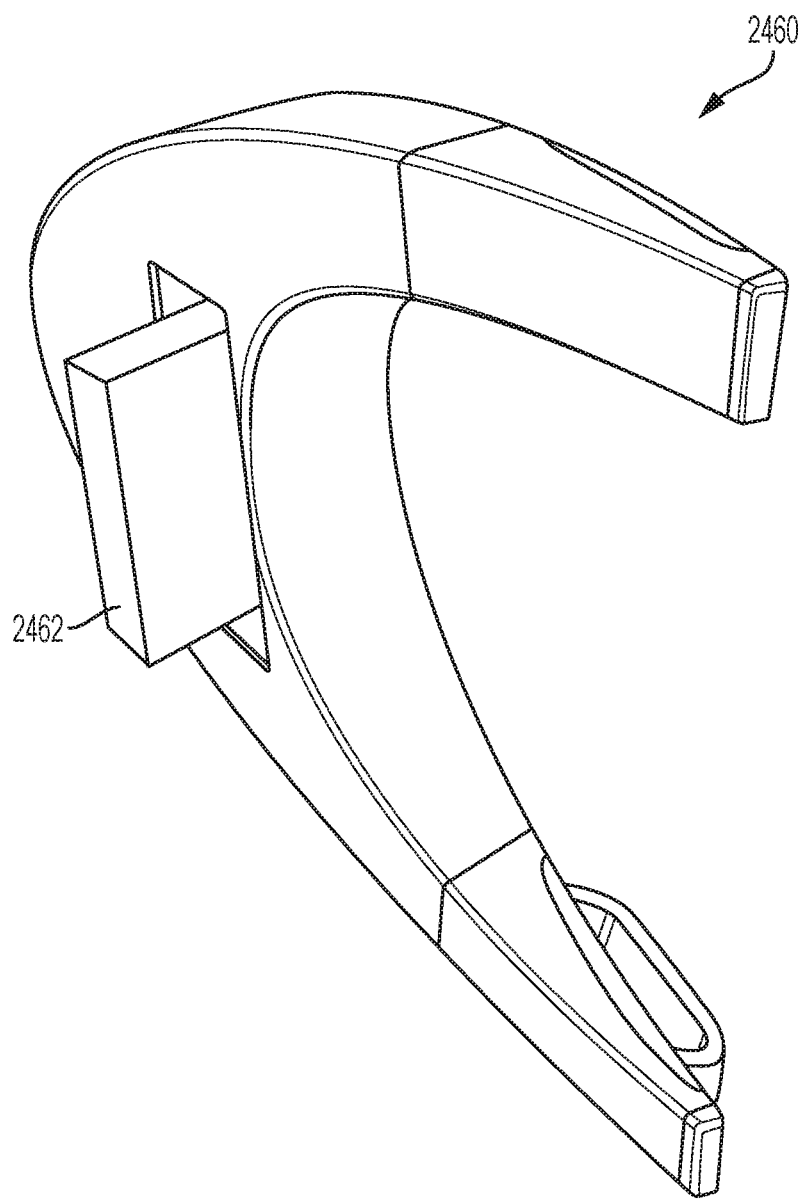
FIG. 24C shows a zoomed in perspective view of an underside of a backrest component for the ride vehicle of FIG. 24A according to an embodiment of the present invention.

The backrest component 2432 may include features that are the same or similar to those discussed further in FIG. 24C. FIG. 24C shows a bottom view of an exemplary backrest component 2460 with an attached electronics housing 2462, the same as or similar to previous discussions. In certain embodiments, the electronics housing 2462 may be part of the mold that makes up the backrest component 2460. In such an embodiment, a door or other opening may be provided such that electronics within the electronics housing 2462 may be accessed (e.g., for servicing or repair). The backrest component 2460 may include one or more hollow portions therein such that electronics or electrical wiring may be disposed therethrough (e.g., running from the electronics housing 2462 to other electrical components that are connected with the backrest component 2460 (e.g., buttons, speakers, microphones, etc.) As previously discussed, the electronics housing 2462 may be configured to fully or partially fit within an area of a body portion of an attached ride vehicle (e.g., electronics area 2410 of FIG. 24A).

Figure 24D:
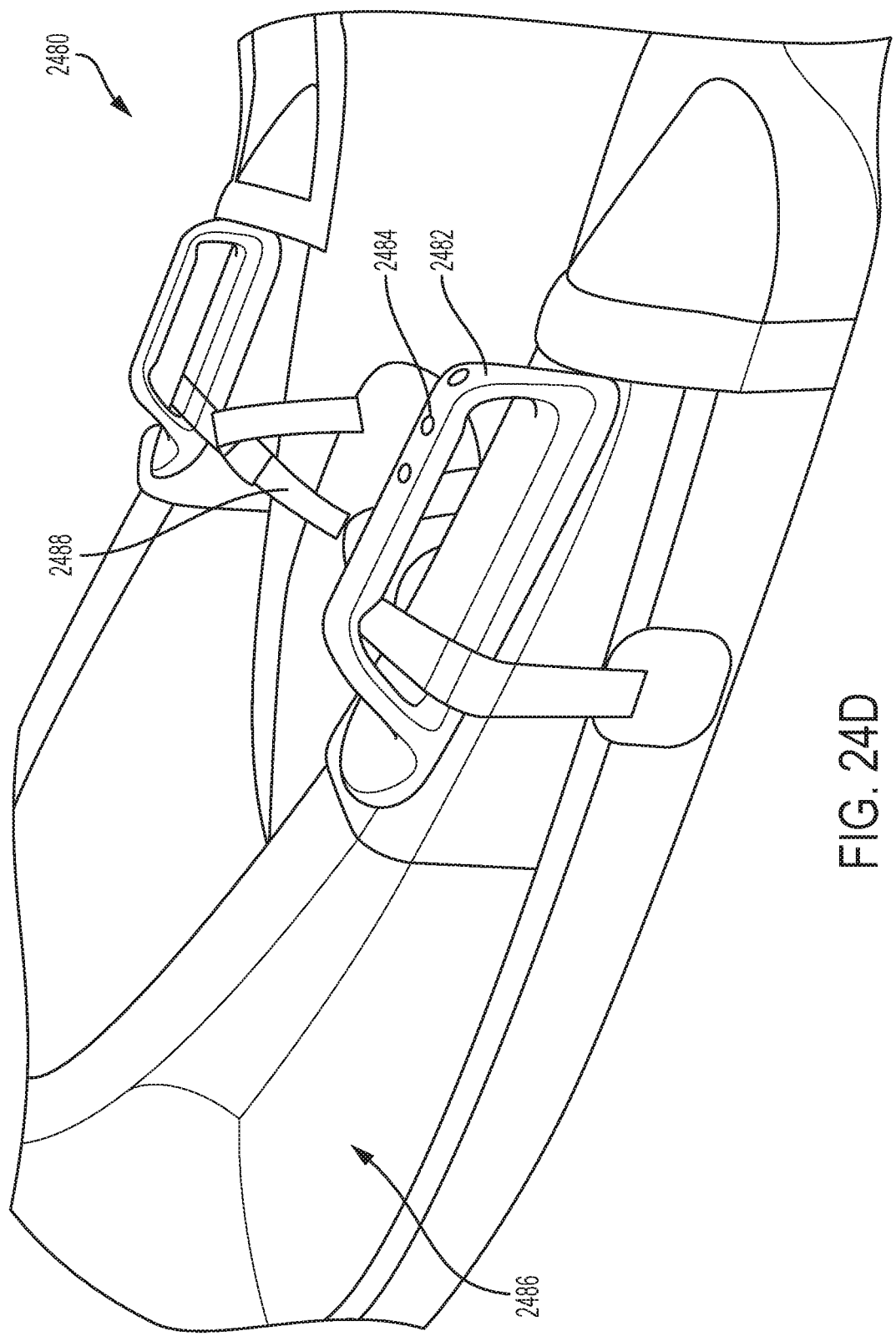
FIG. 24D shows a zoomed in perspective view of a topside of the backrest component of FIG. 24C for the ride vehicle of 24A according to an embodiment of the present invention.

FIG. 24D shows a perspective view of a backrest component 2480 (e.g., backrest component 2460 of FIG. 24C) and illustrates one or more handles 2482 connected thereto. The handles 2482 may aid a rider in directing an associated ride vehicle along a travel path of an amusement ride and/or aid in situating a rider in a desired position during travel and/or provide other game-related functionality. In one embodiment, one or more buttons 2484 or other user-interfaceable components may be connected with the handles 2482. The one or more buttons 2484 may be waterproof or water-resistant. Likewise, in certain embodiments, the entire or portions of the handles 2482 and/or the buttons 2484 may be sealed (e.g., covered, shrink wrapped, etc.) or provided with gaskets to aid in preventing water or other fluid present on the amusement attraction interrupt their proper operation. As previously discussed, electrical power and/or signal communication may be provided with power sources or other electronic components of a ride vehicle, such as via wiring in a hollow portion 2486 or to electrical components previously discussed for FIGS. 24A-24C.

Although buttons 2484 are illustrated in FIG. 24D, any of a variety of components in any of a variety of placements on handles or other areas of a ride vehicle may be used in an alternative embodiment. For example, user interfaceable elements may be voice-activated, may comprise joysticks, sliding switches, feet pedals, triggers, etc. that are disposed on handles or elsewhere. In one embodiment, one or more vibration components may be provided in or coupled with the handles 2482 to provide tactile feedback to a rider. Sound components may also be coupled with the backrest component 2480 or elsewhere on a ride vehicle to provide audible feedback to a rider. In alternative embodiments, sound components may be provided within or on an amusement attraction (e.g., a flume segment) in addition or alternatively to such provision upon a ride vehicle. Alternative embodiments may have handles and/or interfaceable elements such as buttons coupled with a ride vehicle for rider interaction, but not coupled directly to any backrest (e.g., may extend across a rider's lap).

Figure 25:
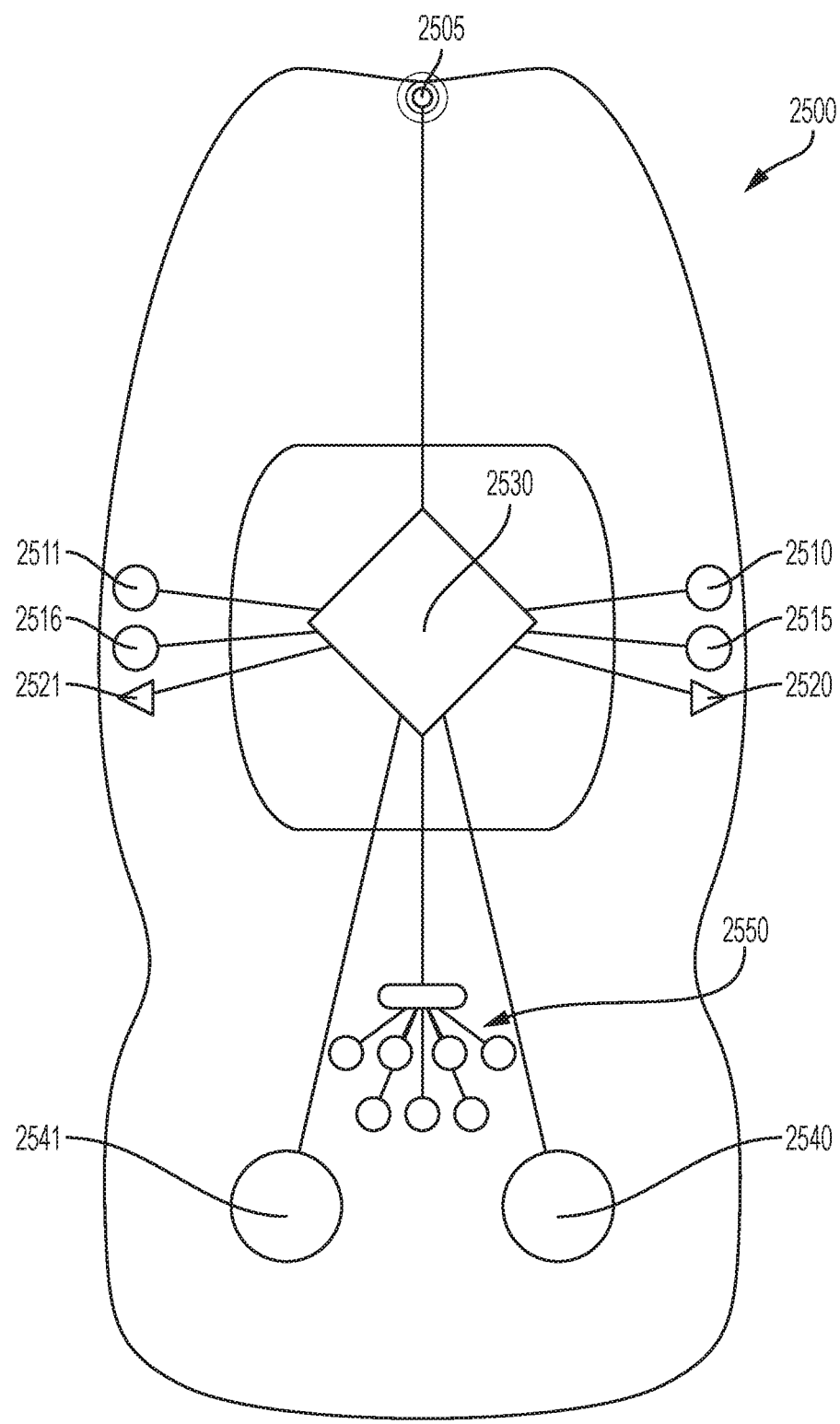
FIG. 25 shows an electrical diagram view of a ride vehicle having electronic capabilities according to an embodiment of the present invention.

FIG. 25 shows an electrical diagram view of a ride vehicle 2500 having electronic capabilities. The ride vehicle 2500 may include features that are the same as or similar to previous discussions and/or may be used or configured to operate on amusement attractions (e.g., using a flow of water or without a flow of water or other fluid) the same as or similar to previous discussions. According to one embodiment of the invention, the ride vehicle 2500 may include a variety of electronic equipment or components in order to facilitate one or more of the features described throughout. In one embodiment, one or more of the variety of electronic equipment or components may be waterproof and/or water resistant. In other embodiments, one or more of the variety of electronic equipment or components may be embedded in or at least partially surrounded by a waterproof or water resistant material (e.g., urethane).

A circuit board 2530 may include various of the electronic equipment or components thereon or be configured to interface therewith. In an alternative embodiment, no circuit board may be necessary and discrete electronic equipment or components may instead interact with one another via wiring or other conductive material. The circuit board 2530 may include a controller or other processor configured to receive input and/or generate output signals from other equipment coupled with the ride vehicle 2500, as discussed in greater detail herein. In certain embodiments, the circuit board 2530 may be housed within an enclosure, such as a tube covered at least partially in urethane (e.g., waterproof) within a molded portion of the ride vehicle 2500, the same or similar to previous discussions. Other materials different from urethane may be used for any waterproofing of components as discussed throughout the various embodiments described (e.g., rubber, silicone, plastic, fiberglass, etc.)

An IR sensor 2505 may be disposed at one end (e.g., a front end) of the ride vehicle 2500. The IR sensor 2505 is electrically connected with the circuit board 2530 and may be configured to communicate with a game system or other processor of an amusement attraction, for example, the same or similar to previous discussions (e.g., FIG. 23). Additional or different communication mechanisms or equipment (e.g., Bluetooth, Wi-Fi, other real-time or non-real time communication schemes, etc.) may be used in alternative embodiments. An interactive element 2550 (e.g., a reed switch sensor array and/or other sensor) is coupled to the ride vehicle 2500 and in communication with the circuit board 2530 (e.g., for interacting with magnetic sync points as previously discussed). In one embodiment, the interactive element 2550 may ideally be located closest to the bottom surface of the ride vehicle 2500. The interactive element 2550 together with the circuit board 2530 (e.g., via a microprocessor) may allow for the ride vehicle 2500 to calculate and analyze the ride vehicles 2500 velocity and/or location during use. As previously discussed, a magnetic sync point may be positioned along an amusement attraction (e.g., at every flange of a waterslide) to support such operation. Different velocity profiles may be stored based upon weight that is used after a rider has passed through a plurality of MSPs. Alternatively, said calculation and analysis may be performed by a game system of an amusement attraction by sending data generated by the interactive element 2550 (e.g., a reed switch sensor array) to the game system in real time.

The ride vehicle 2500 may further include one or more buttons (2510, 2511, 2515, 2516) (e.g., blue, yellow, green, and red buttons) or other user-manipulatable components that are in electrical communication with the circuit board 2530 for allowing user interaction with targets disposed along a length of an amusement attraction, the same or similar as previously discussed. For example, a rider may be required to timely press one or more buttons upon approaching a target, in accordance with the indication provided by the target, in order to score points. In response to the rider's game play (i.e., pressing the correct buttons (2510, 2511, 2515, 2516)), a rider's score, as calculated by the circuit board 2530 and/or other game system of the attraction may be incremented, decremented, or remaining constant, as previously discussed. One or more speakers (2540, 2541) may also be in electrical connection with the circuit board 2530. For example, the one or more speakers (2540, 2541) may provide auditory feedback to the rider, for example, in response to correctly and/or incorrectly manipulating the buttons (2510, 2511, 2515, 2516) during operation. The one or more speakers (2540, 2541) may be configured to play sounds based upon a user's position along the attraction (e.g., calculated via a rider's velocity and/or position as previously discussed), speed (e.g., calculated via the rider's velocity as previously discussed), or from any of a variety of other data as desired, whether due to rider interactivity or not.

Any of a variety of numbers of buttons, sizes of buttons, button placement, numbers of groups, and/or corresponding visual or graphic distinguisher (e.g., colors, shapes, images, etc.) may be used for the buttons on a ride vehicle in alternative embodiments. The buttons may interact with any of a variety of components, such as a transmitter, that is built into the ride vehicle in order to protect the components from contact with water that is on the waterslide. In one embodiment, the transmitter may interact wirelessly with other electronic or computing components that cause modifications to the visual illuminations and/or other stimuli or statistics associated with the waterslide or with the user. In certain embodiments, the buttons may be waterproof and/or may be encased within a waterproof sleeve or material to prevent water or other fluid from interfering with operation.

One or more vibration components (2520, 2521) (e.g., motors) may be electrically connected with the circuit board 2530 and configured to cause one or more elements of the ride vehicle 2500 to vibrate. In one embodiment, the one or more vibration components (2520, 2521) may be integrated within or otherwise coupled with handles of grips of the ride vehicle 2500 so that a rider would receive tactile feedback through their hands upon vibration of the vibration components (2520, 2521). The vibration components (2520, 2521) may initiate vibration due to any of a variety of conditions, the same or similar to those previously discussed (e.g., speed of the ride vehicle 2500, position of the ride vehicle 2500, in response to rider interaction with one or more of the buttons (2510, 2511, 2515, 2516).

Additional or alternative equipment may be used for a ride vehicle in alternative embodiments. For example, an alternative ride vehicle may incorporate a display configured to display information (e.g., an alias for the rider based upon the rider's stored profile information as previously discussed) to a rider during operation. In one example, the display may show a scoreboard or other compilation of the rider's (or other rider's) data. The rider may be permitted to interface with the display, such as by touching the display with touch controls, or via other user-manipulatable elements, such as the one or more buttons (2510, 2511, 2515, 2516). In another example, the display may be a system capable of three dimensional visuals (e.g., virtual reality or augmented reality capabilities).

Figure 26:
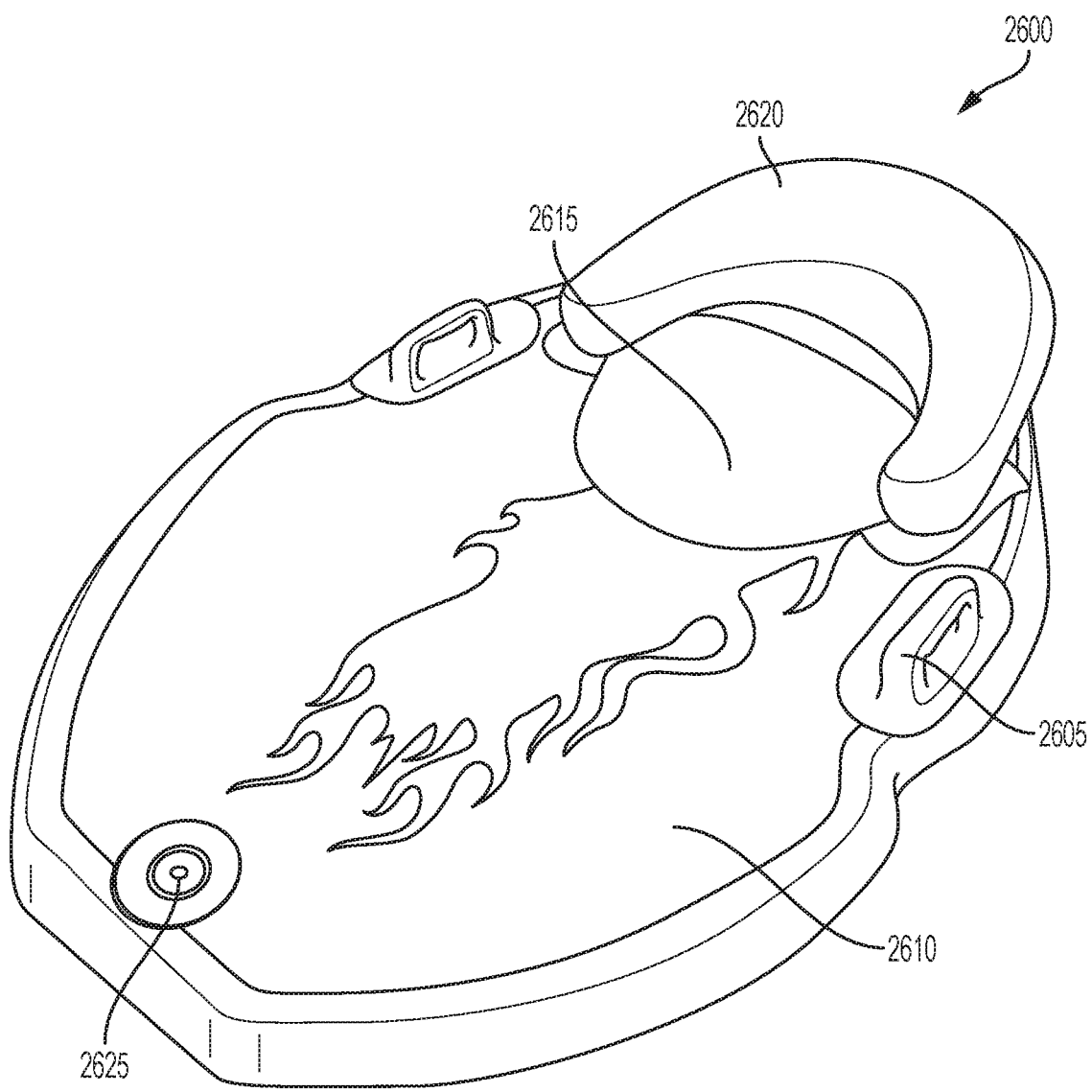
FIG. 26 shows a perspective view of a single-rider ride vehicle according to an embodiment of the present invention.

A variety of ride vehicles may be created that have certain features the same or similar to those previously discussed while omitting other features or adding additional features. FIG. 26 shows a ride vehicle 2600 configured to support one rider thereon. The ride vehicle 2600 may include certain features that are the same as or similar to those previously discussed. The ride vehicle 2600 includes a body portion 2610 that may be fully or partially inflatable (e.g., using a drop-stitch material configured to inflate substantially flat) with a filling port 2625 (e.g., to inflate the body portion 2610 with air). A seating area 2615 is provided with plate (e.g., rigid, semi-rigid, and/or flexible) disposed therein such that a rider seated in the seating area 2615 does not make direct contact with a surface beneath the ride vehicle 2600. Padding may be provided in the seating area 2615 for increased comfort.

An inflatable backrest 2620 is provided adjacent to the seating area 2615 and one or more handles 2605 are provided for a rider to grasp. Certain embodiments of the ride vehicle 2600 may not contain any additional electronic components (e.g., such as those components and/or operation previously discussed, such as for FIGS. 24A-24D and/or FIG. 25.) Thus, certain embodiments of the ride vehicle 2600 may be less expensive to manufacture and/or for use on water slides that do not require additional electronics for the purposes of providing interaction with a rider, tracking of a ride vehicle, etc. Differing areas of a ride vehicle in alternative embodiments may be configured to fully or partially inflate, for example, to vary rider comfort, sliding characteristics, stability, endurance, etc.

Figure 27:
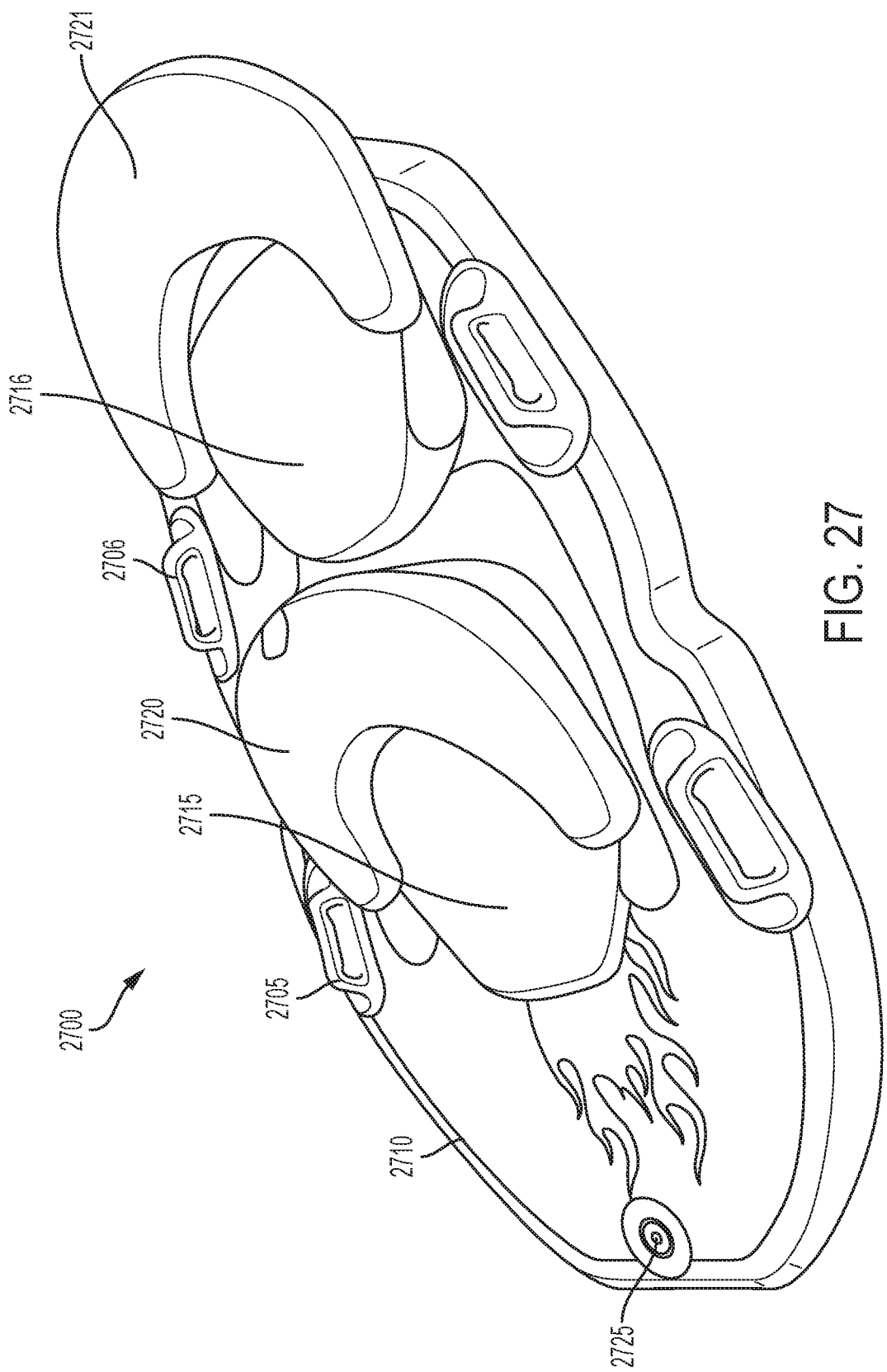
FIG. 27 shows a perspective view of a double-rider ride vehicle according to an embodiment of the present invention.

Similar to FIG. 26, FIG. 27 shows a ride vehicle 2700, but provides seating for two riders simultaneously. The ride vehicle 2700 may include certain features that are the same as or similar to those previously discussed. The ride vehicle 2700 includes a body portion 2710 that may be fully or partially inflatable (e.g., using a drop-stitch material configured to inflate substantially flat) with a filling port 2725 (e.g., to inflate the body portion 2710 with air). A first seating area 2715 is provided with a plate (e.g., rigid, semi-rigid, and/or flexible) or other material disposed therein such that a first rider seated in the first seating area 2715 does not make direct contact with a surface beneath the ride vehicle 2700. Likewise, a second seating area 2716 is provided with a plate (e.g., rigid, semi-rigid, and/or flexible) or other material disposed therein such that a second rider seated in the second seating area 2716 does not make direct contact with a surface beneath the ride vehicle 2700. Padding may be provided in the first seating area 2715 and/or second seating area 2716 for increased comfort.

A first inflatable backrest 2720 is provided adjacent to the first seating area 2715 and one or more handles 2705 are provided for the first rider to grasp. Likewise, a second inflatable backrest 2721 is provided adjacent to the second seating area 2716 and one or more handles 2706 are provided for the second rider to grasp. Certain embodiments of the ride vehicle 2700 may not contain any additional electronic components (e.g., such as those components and/or operation previously discussed, such as for FIGS. 24A-24D and/or FIG. 25.) Thus, certain embodiments of the ride vehicle 2700 may be less expensive to manufacture and/or for use on water slides that do not require additional electronics for the purposes of providing interaction with a rider, tracking of a ride vehicle, etc. Differing areas of a ride vehicle in alternative embodiments may be configured to fully or partially inflate, for example, to vary rider comfort, sliding characteristics, stability, endurance, etc.

Figure 28:
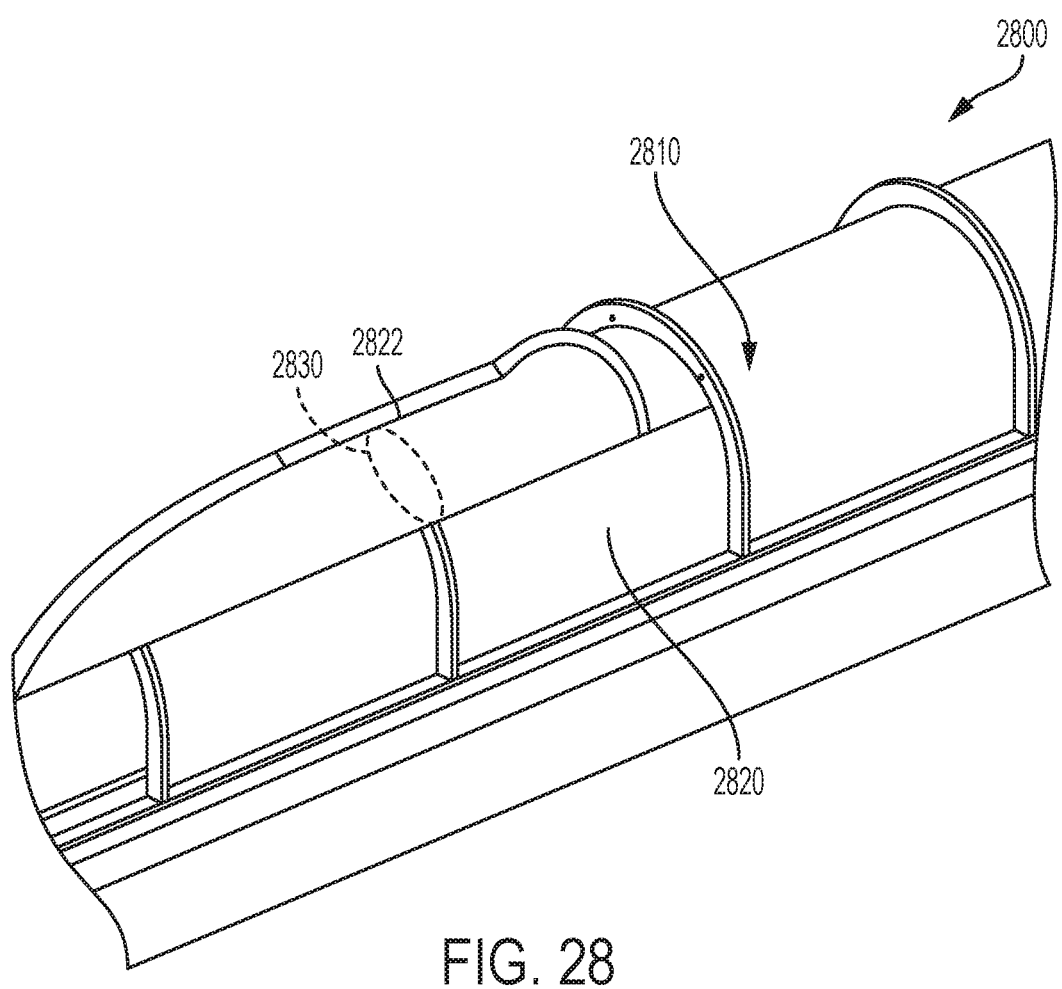
FIG. 28 shows a perspective view of a portion of an amusement attraction incorporating riser elements according to an embodiment of the present invention.

FIG. 28 shows a portion of an amusement attraction 2800 (e.g., a portion of a waterslide) that illustrates a flume segment 2810. As previously discussed, attractions having features or operation the same or similar as previously discussed (e.g., FIG. 23) may be provided on new amusement attractions and/or retrofitted onto existing or modified attractions. In one example as shown, one or more riser elements (2820, 2822) may be disposed on one or both sides of the flume segment 2810 and configured to incorporate or connect to targets, sensors, lights, and/or other equipment or components as previously discussed for providing interactive or entertaining features (e.g., magnetic sync points, targets, illumination elements, audible elements, etc.). In alternative embodiments, such targets, sensors, and/or other equipment may be fitted onto new rides or retrofitted on existing or modified rides via other parts (e.g., exterior to or interior within a flume) of the ride alternative to riser elements via any of a variety of methods (e.g., adhesives, bolts, screws, etc.). As previously discussed, such targets, sensors, and/or other equipment may alternatively or additionally be coupled with a ride vehicle and/or a rider or rider's clothing. Depending upon desired characteristics, one or more clearance envelopes or spaces 2830 surrounding the risers may be provided for various rider types (e.g., child, adult, etc.) to ensure that riders traveling on the attraction 2800 cannot make physical contact with the components incorporated or connected with the riders (2820, 2822).

Figure 29:
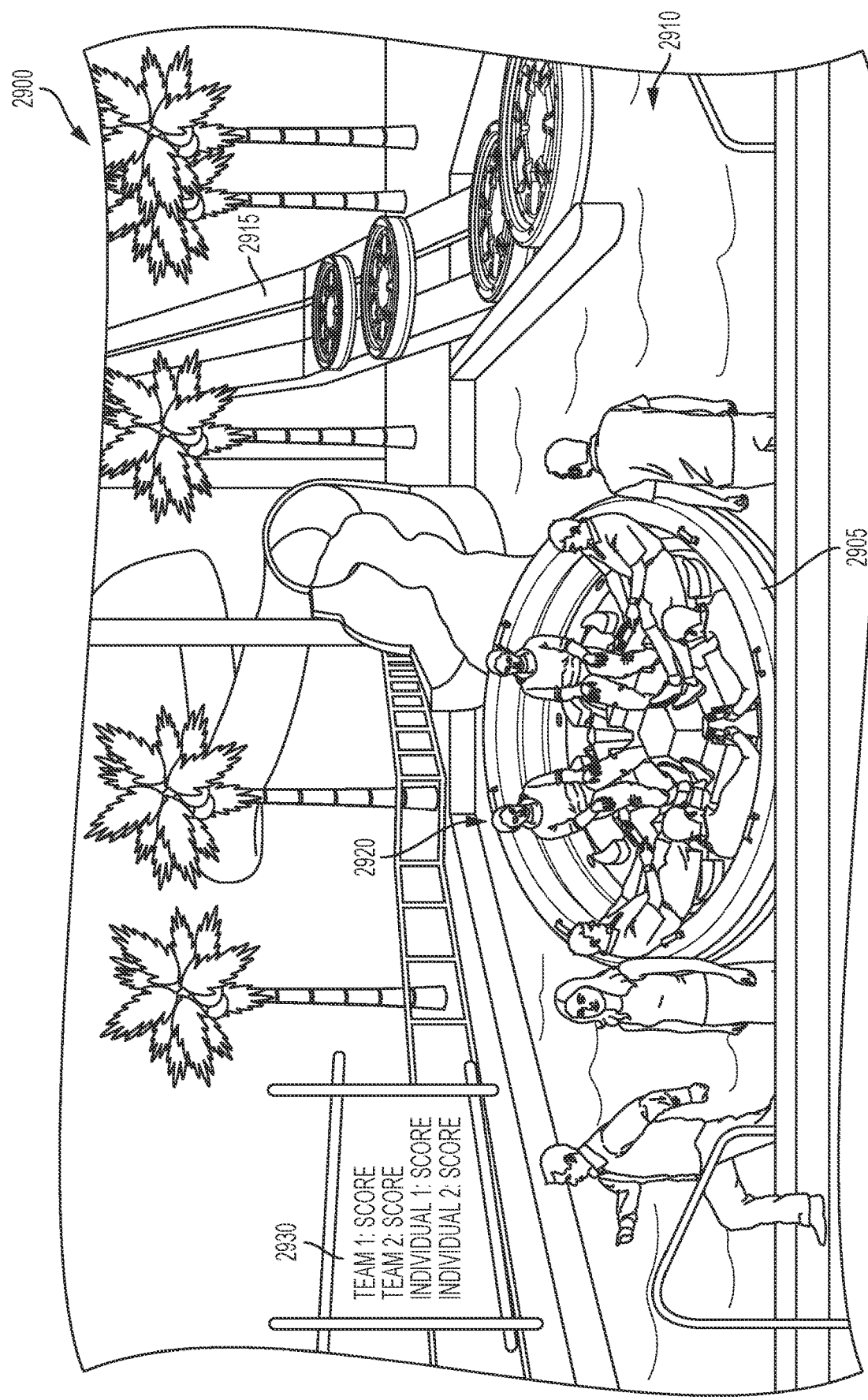
FIG. 29 shows a perspective view of an exit of a waterslide attraction using a multi-rider ride vehicle capable of incorporating skill or agility of a user riding thereon according to an embodiment of the present invention.

As previously discussed, ride vehicles for use on an amusement attraction that is capable of incorporating rider skill and/or agility may be configured to include any number of individuals. In one such embodiment, FIG. 29 shows a perspective view of an exit of a waterslide attraction 2900 using an exemplary multi-rider ride vehicle 2905. The attraction 2900 and/or the ride vehicle 2905 may include features that are the same as or similar to those previously discussed. The ride vehicle 2905 may be circular in shape (e.g., an inflatable or partially-inflatable doughnut-style ride vehicle), whereby riders sit within the ride vehicle 2905 in a circular configuration, in one embodiment. In another embodiment, the ride vehicle 2905 may be any of a variety of shapes and/or configurations or themes (e.g., cars, airplanes, hexagons, etc.). The ride vehicle 2905 may support six individual riders, in one embodiment. In another embodiment, any number of riders may be configured to ride therein and/or participate on the attraction 2900. For example, in another embodiment, a ride vehicle may be permitted to accommodate two, four, eight, ten, etc. riders. Odd numbers of riders (e.g., three, five, seven, etc.) may be configured for certain embodiments of a ride vehicle.

The same or similar to previous disclosures, one or more of the riders riding on the ride vehicle 2905 as it travels along the attraction 2900 may be able to interact with elements (e.g., targets such as lights or light-emitting diodes ("LEDs")) associated with the attraction 2900, for example, by way of interactive elements (e.g., buttons). A score or other data (e.g., statistics, numerical values, etc.) may be displayed for one or more of the riders on a scoreboard 2930, for example, positioned at or near the exit of the attraction 2900. As shown, the scoreboard 2930 may show individual scores or points and/or may show team scores or points, if multiple riders are cooperating or competing in groups to achieve numerical point values, as discussed in greater detail throughout. After traveling along the attraction 2900, the ride vehicle 2905 is exited by the riders and then travels along a recirculation path 2910 and a conveyor 2915, or other transport structure, may be used for providing the ride vehicle 2905 back to an entrance of the attraction 2900 for use by riders at the entrance of the attraction 2900.

Figure 30A:
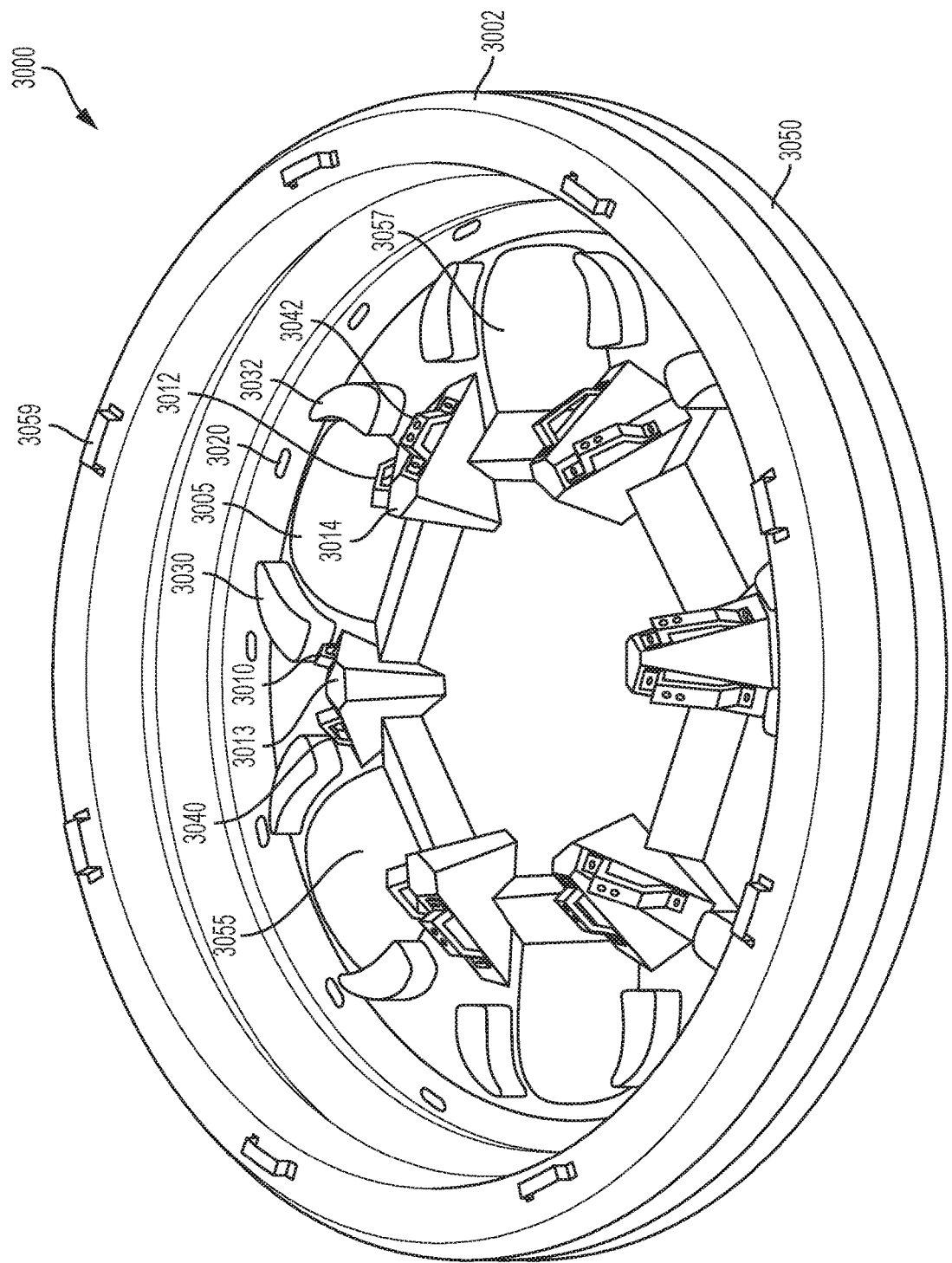
FIG. 30A shows a perspective view of a multi-rider ride vehicle capable of incorporating skill or agility of a user according to an embodiment of the present invention.

FIG. 30A illustrates a perspective view of a multi-rider ride vehicle 3000 capable of incorporating interactivity, skill, or agility of a user. The ride vehicle 3000 may include features that are the same as or similar to those previously discussed. For example, the ride vehicle 3000 may be configured to support multiple riders within a body portion 3002 thereof, such as via the inclusion of six seats or seating positions for riders, as exemplary shown in FIG. 30A. A first seat 3005 may include a material (e.g., cushioned, padded, waterproofed, and/or water resistant) configured to support a first rider thereon. Some or all of the first seat 3005 may be made of the same material or a different material from that used for other portions of the ride vehicle 3000. In an alternative embodiment, the first seat 3005 may merely be a position of the ride vehicle 3000 for a rider to sit without additional material to form or make up the first seat 3005.

Seatbelts and/or other safety restraint or stabilizing devices (e.g., straps, depressions, handholds, etc.) may be provided for engaging with or engagement by one or more riders as the riders use the ride vehicle 3000. Additional seats or seating positions (e.g., a second seat, third seat, fourth seat, fifth seat, sixth seat, etc.) may extend substantially around a perimeter of the ride vehicle 3000 with the same or similar characteristics to those described above, as exemplary shown by FIG. 30A for the six-rider ride vehicle 3000. Ride vehicles may include different number of seats or seating positions from the one exemplary shown in FIG. 30A. A bottom surface 3050 of the body portion 3002 of the ride vehicle 3000 may be configured so as to be more durable and/or configured to better move or slide upon an amusement attraction or waterslide. For example, in one embodiment, the bottom surface 3050 may be made of a different material than the body portion 3002. In another example, the bottom surface 3050 may be the same material as the body portion 3002, but may be provided with a coating or embedded with different material(s) and/or textures, such as a smoother texture than other portions of the body portion 3002 in order to better aid in reducing friction. In some embodiments, the bottom surface 3050 may be configured to be removable so that it can be removed and/or replaced with a new bottom surface once. In this manner, the entire ride vehicle 3000 or body portion 3002 may not need to be replaced if only the bottom surface 3050 needs replacing.

Adjacent to the first seat 3005 is a first handle or handlebar 3010 and a second handle or handlebar 3012 that correspond to the rider positioned in the first seat 3005. One or both of the first and second handlebars (3010, 3012) may include additional interactive elements thereon or in proximity thereto, as discussed in greater detail below, for the rider positioned in the first seat 3005 to interact therewith. The first handlebar 3010 may be coupled with a first case or structure 3013. The first case or structure 3013 may be manufactured of any of a variety of materials (e.g., plastic, carbon fiber, fiberglass, rubber, etc.). In certain embodiments, the first case or structure 3013 may be molded as part of the overall ride vehicle 3000 (e.g., may or may not be inflatable). In other embodiments, the first case or structure 3013 may be manufactured separately from the ride vehicle 3000 and fastened with the ride vehicle 3000, for example, via screws, bolts, adhesives, or any other of a variety of connectors. A third handlebar 3040 is also coupled with the first case or structure 3013. A rider positioned in the first seat 3005 could use his or her right hand to engage with the handlebar 3010 and/or any interactive elements thereon or in proximity thereto while a rider positioned in a second seat 3055 could use his or her left hand to engage with the third handlebar 3040 and/or any interactive elements thereon or in proximity thereto.

The second handlebar 3012 may be connected with a second case or structure 3014. The second case or structure 3014 may be manufactured of any of a variety of materials (e.g., plastic, carbon fiber, fiberglass, rubber, etc.). In certain embodiments, the second case or structure 3014 may be molded as part of the overall ride vehicle 3000 (e.g., may or may not be inflatable). In other embodiments, the second case or structure 3014 may be manufactured separately from the ride vehicle 3000 and fastened with the ride vehicle 3000, for example, via screws, bolts, adhesives, or any other of a variety of connectors. A fourth handlebar 3042 is also coupled with the second case or structure 3014. A rider positioned in the first seat 3005 could use his or her left hand to engage with the handlebar 3012 and/or any interactive elements thereon or in proximity thereto while a rider positioned in a third seat 3057 could use his or her right hand to engage with the handlebar 3042 and/or any interactive elements thereon or in proximity thereto. Similar structure is repeated around the ride vehicle 3000 as shown.

Either or both of the first and/or second case or structure (3013, 3014) may be configured to contain and/or support electronic components associated with the first, second, third, and fourth handlebars (3010, 3012, 3040, 3042), the interactive elements, and/or other hardware (electronic and/or otherwise) that are used to support rider use or interaction with the amusement attraction, as discussed throughout. For example, wiring, processors, storage devices, circuit boards, communication components, etc. may be contained within the first case or structure 3013. Thus, in one embodiment, wiring from interactive components (e.g., one or more buttons on the first handlebar 3010 or third handlebar 3040) may be run through the respective handlebars (3010, 3040) and into an interior cavity of the first case or structure 3013 where it is connected with other electronics, such as a processor. For example, a processor may be connected (e.g., hard-wired and/or wirelessly, such as via a communication network that includes all or some of the processor and the various interactive elements, sensors, etc.) As discussed throughout, the processor may be used for determining successful interaction by the various riders in the ride vehicle 3000 with their corresponding interactive elements. Such a configuration may help shield sensitive electronics from water or other fluids or particles that may otherwise splash or be deposited in or around the ride vehicle 3000 as it travels upon an amusement attraction. Similar configurations or functionality are used for the other cases or structures disposed around the ride vehicle 3000.

Adjacent to the first seat 3005 are a first raised portion 3030 and a second raised portion 3032. For example, the first and/or second raised portions (3030, 3032) may be positioned on either side of the first seat 3005 and may help to keep the rider within the confines of the first seat 3005 during travel on an attraction using the ride vehicle 3000. The first and/or second raised portions (3030, 3032) may be manufactured of any of a variety of materials (e.g., plastic, carbon fiber, fiberglass, rubber, etc.). In certain embodiments, first and/or second raised portions (3030, 3032) may be molded as part of the overall ride vehicle 3000 (e.g., may or may not be inflatable). In other embodiments, first and/or second raised portions (3030, 3032) may be manufactured separately from the ride vehicle 3000 and fastened with the ride vehicle 3000, for example, via screws, bolts, adhesives, or any other of a variety of connectors.

For example, in certain embodiments, the first and/or second raised portions (3030, 3032) may be configured to be at least partially inflatable. Similar to the above, the first and/or second raised portions (3030, 3032) may additionally or alternative include a cavity therein for storing components (e.g., electronic components), which can aid in keeping such components away from water or other undesirable fluid or particles during travel on an amusement attraction. For example, in one embodiment, the first and/or second raised portions (3030, 3032) may allow a rider to access its interior cavity for the placement of items (e.g., mobile phones, keys, etc.) that the rider wishes to store in the cavity during the duration of the ride. The same or similar accessibility may be present for the first and/or second case or structure (3013, 3014). One or more drains or openings 3020 may be disposed at locations around the ride vehicle 3000 (e.g., disposed around an outer perimeter) to aid in the removal of fluid from within the body portion of the ride vehicle 3000 so that fluid or other particular do not substantially accumulate and stay within the body portion of the ride vehicle 3000 as the ride vehicle 3000 travels along the amusement attraction or waterslide. One or more grips 3059 may be disposed along the body portion of the ride vehicle 3000 to aid in moving or maneuvering the ride vehicle 3000 into a desired position before or after travel along the amusement attraction.

Figure 30B:
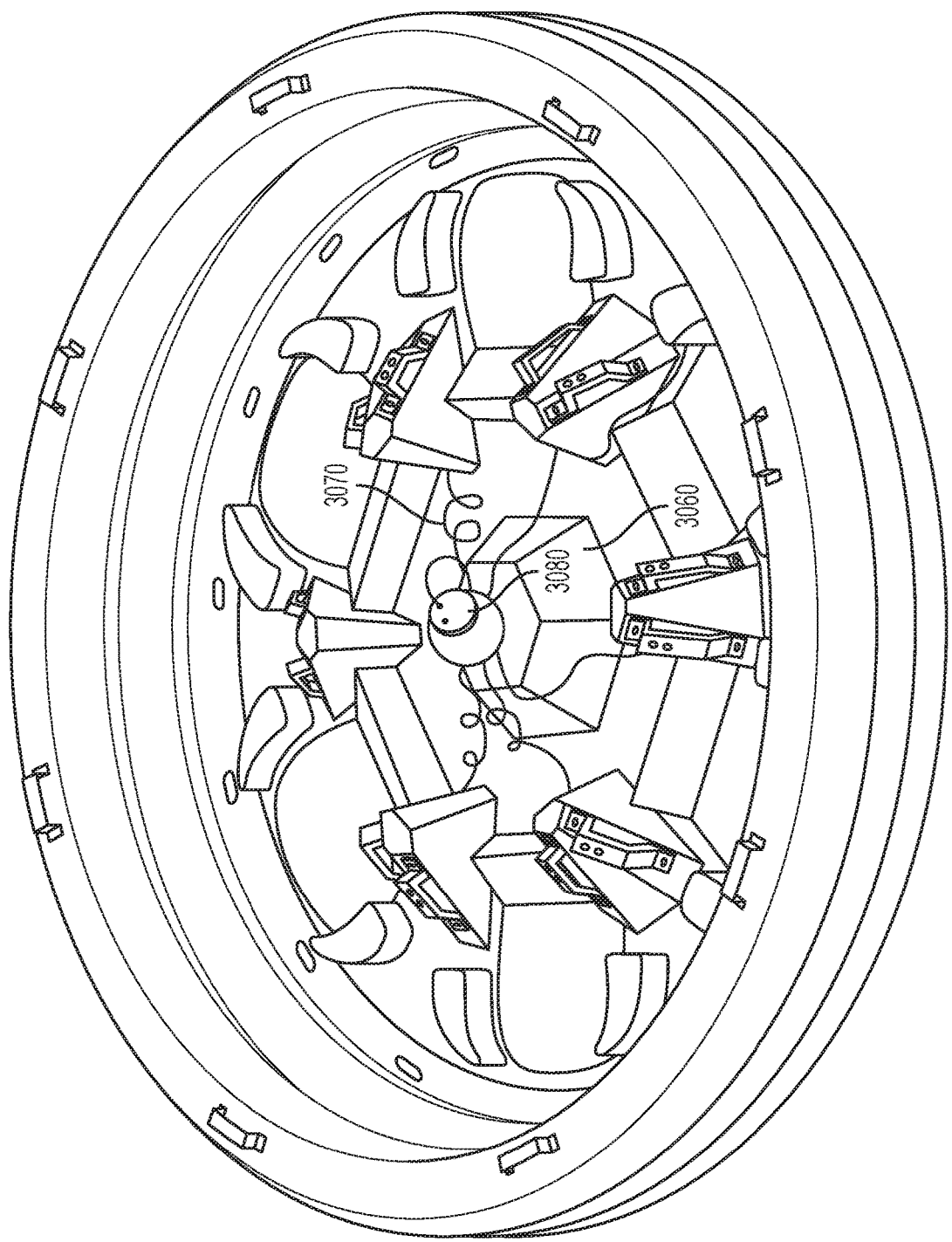
FIG. 30B shows a perspective view of the multi-rider ride vehicle capable of incorporating skill or agility of a user with a central housing for containing associated electronics according to an embodiment of the present invention.

FIG. 30B shows a perspective view of the multi-rider ride vehicle of FIG. 30A capable of incorporating skill or agility of a user, but also including a housing 3060, exemplary positioned at a center of the ride vehicle, for containing associated electronics. In an alternative embodiment, the housing 3060 may be positioned in an alternative location or not included at all, as shown by FIG. 30A. The housing 3060 may be manufactured of any of a variety of materials (e.g., plastic, carbon fiber, fiberglass, rubber, etc.). In certain embodiments, the housing 3060 may be molded as part of the overall ride vehicle. In other embodiments, the housing 3060 may be manufactured separately from the ride vehicle and fastened with the ride vehicle, for example, via screws, bolts, adhesives, or any other of a variety of connectors. The housing 3060 may be sturdy enough to support one or more riders to use the housing 3060 as a footrest. In one embodiment, the housing 3060 may allow a rider to access one or more interior cavities of the housing 3060 for the placement of items (e.g., mobile phones, keys, etc.) that the rider wishes to store in the cavity during the duration of the ride.

In certain embodiments, the housing may include visual elements thereon or manufactured therewith, for example, monitors or other display screens that are capable of displaying ride information (e.g., scores) for one or more of the riders and/or teams of riders in the ride vehicle. For example, such display screen(s) positioned on the housing 3060 (or elsewhere on the ride vehicle or worn by a rider) may be configured to update in real-time the particular rider's, or team's containing the rider, score or other ride information. In certain embodiments, displays (e.g., configured to showing ride information) may be positioned outside of the ride vehicle in the alternative or in addition. For example, a scoreboard, such as those discussed throughout, may be present at an exit to the attraction, an entrance to the attraction, along a queue line for the attraction and/or disposed along the attraction itself (e.g., within a flume or adjacent to a portion of the flume) such that riders traveling on the attraction can see their progress as they traverse the attraction. In still another embodiment, to the extent a harness, bracing or restraint system is used with a ride vehicle (e.g., one or more restraint bars that lock into place to help stabilize a rider within a given seating position), one or more displays may be coupled with such harness, bracing, or restraint system if desired in certain embodiments.

FIG. 30B shows, for illustrative purposes, wiring 3070 and a corresponding electronic component 3080 (e.g., a speaker) outside of the housing 3060, however, such electronic component 3080 and/or wiring 3070 could be disposed fully, or at least partially, within the housing 3060. Such placement may aid in keeping such components away from water or other undesirable fluid or particles during travel on an amusement attraction. Any of a variety of additional or alternative electrical components (e.g., circuit boards, processors, memory, etc.) may be contained within housing 3060. Thus, rider interactions, such as via interactive elements, may be electronically communicated to components within the housing 3060 via the wiring 3070. Accordingly, data storage and/or other visual (e.g., via lighting components), audible (e.g., via speaker components) or tactile (e.g., via vibration components) responses or feedback may be provided to the rider(s).

Figure 31:
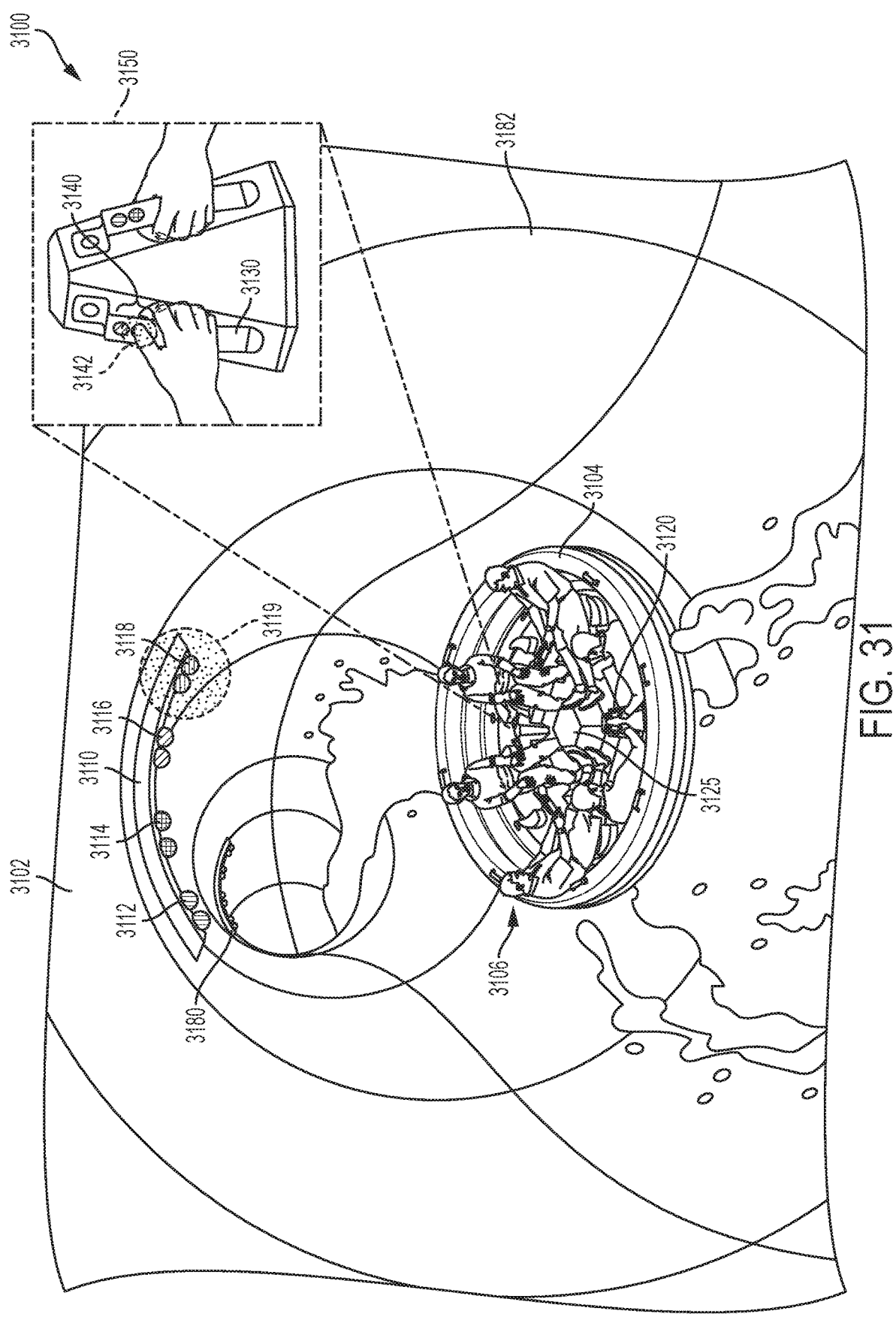
FIG. 31 shows a perspective view of section of an amusement attraction for use with a multi-rider ride vehicle capable of incorporating skill or agility of a user according to an embodiment of the present invention.

FIG. 31 shows a perspective view of section of an amusement attraction 3100 for use with a multi-rider ride vehicle 3104 capable of incorporating skill or agility of a rider. Certain features of the amusement attraction and/or the ride vehicle 3104 may be the same as or similar to those previously discussed. The ride vehicle 3104 is configured to support a plurality of riders 3106, one or more of the plurality of riders 3106 having access to at least one interactive element 3120 (e.g., buttons, switches, etc.) that may be manipulated as the plurality of riders 3106 travel along the amusement attraction 3100 within the ride vehicle 3104. As previously discussed, in certain embodiments a housing 3125 (e.g., positioned in a center portion of the ride vehicle 3014) may provide a footrest for the plurality of riders 3106 and/or contain associated electronics or components in support of the operation of the amusement attraction 3106 and rider interaction therewith. In certain embodiments, the housing 3125 may include displays thereon or therein configured to display ride information (e.g., individual or team scoring, information about the ride, such as a map or hints of upcoming targets, etc.). For example, a display facing a particular rider who successfully interacts with an interactive element may be configured to display ride information that is not displayed to other riders (e.g., riders who did not successfully interact with a recent interactive element), such as the location and/or color of an upcoming target). Any of a variety of common and/or specialized information may be displayed via such displays to one or more riders in the ride vehicle 3104.

The amusement attraction 3182 may be a waterslide that comprises a flume 3102 (e.g., a closed flume as illustrated and/or an open flume in an alternative embodiment) that supports a flow of water therealong to facilitate movement of the ride vehicle 3104. Disposed along the flume 3102 is a target 3110 that may include one or more illuminating elements (3112, 3114, 3116, 3118), such as lights or LEDs, for example of differing colors. For example, as shown in FIG. 31, illuminating elements 3118 are illustrated in their illuminated state 3119. The same or similar to previous discussions, as the ride vehicle 3104 and plurality of riders 3106 travel along the flume 3102, when within a predetermined or configured range, distance, or proximity of the target 3110, one or more of the plurality of riders 3106 may manipulate a corresponding one or more interactive elements 3140. As shown in the zoomed-in portion 3150 of FIG. 31, a rider is manipulating (e.g., pressing) 3142 one of the interactive elements 3142 (e.g., a button) that corresponds (e.g., has the same color) to the target 3110 which has such particular illuminating elements 3118 in the illuminated state 3119. Based upon the manipulation of the proper illuminating element and/or timing or distance to the target 3110 or other location along the attraction, the rider is accordingly rewarded (e.g., via accumulation of points), the same or similar to previous discussions. As the ride vehicle 3104 travels along the flume 3102, a subsequent target 3180 may be encountered for similar interaction. As such, riders or teams of riders may compete and/or cooperate to accumulate points via interactions as they travel along the amusement attraction 3100. In certain embodiments, rather than static elements or targets positioned along the attraction 3100, one or more riders may be wearing glasses or goggles (e.g., virtual reality goggles) that interface with the user's mobile device (e.g., cell phone) and/or a computing system of the attraction 3100 and/or ride vehicle 3104 that includes virtual targets requiring user interaction. Moreover, although certain interactive elements are specifically illustrated in FIG. 31 and elsewhere in the figures, any of a variety of possible interactive capabilities may be used in alternative embodiments (e.g., a wearable glove or other closing elements that responds to particular user movement and/or hand gestures, a vest or other wearable clothing that includes sensors for detecting movement, pedals for user manipulation using their feet, touch screen controls, etc.).

A variety of possible gaming opportunities may be configured for such interaction in the multi-rider ride vehicle 3104. In one embodiment, points for successful manipulations of interactive elements may be based upon teams of users. For example, a team may accumulate points based upon a ratio of success for each team member. Thus, for a team of three riders, if a first team member and a second team member successfully manipulate their interactive elements in response to a target, but a third team member does not, the team may be rewarded points based upon this ratio of a 2/3 success rate (e.g., the team is awarded 66 or 67 points instead of a full 100 points for the target). Similarly, for a team of two riders, if a first team member successfully manipulates their interactive elements in response to a target, but a second team member does not, the team may be rewarded points based upon this ratio of a 1/2 success rate (e.g., the team is awarded 50 points instead of a full 100 points for the target). This accumulation of points based upon total team success rate or ratio may be applied to any number of riders that are within a team.

In another example, a team may accumulate points purely through addition of individual scores for each team member. Thus, for a team of three riders, if a first team member and a second team member successfully manipulate their interactive elements in response to a target, but a third team member does not, the team is rewarded points by simple summation of each team members point accumulations (e.g., the first and second riders are awarded points, but the third team member was not awarded any points). This accumulation of points may be applied to any number of riders that are within a team.

In still another example, a team may accumulate points through addition of individual scores for successful team members and subtract points for unsuccessful team members. Thus, for a team of three riders, if a first team member and a second team member successfully manipulate their interactive elements in response to a target, but a third team member does not, the team may be rewarded points by adding successful player points together while subtracting an amount of "penalty" points for the unsuccessful team members (e.g., the team is awarded 100 points for the first team member, 100 points for the second team member, but then subtracted points (e.g., a full 100 points or another set of points, such as 50 points) for the third team member. This accumulation of points may be applied to any number of riders that are within a team. Any of a variety of possible point awards may be used in alternative embodiments in order to encourage competition and/or cooperation between the plurality of riders 3106.

There may be multiple teams setup within the ride vehicle 3104, there may be one team for the ride vehicle 3104, or there may be no teams setup for a ride vehicle 3104 (e.g., each rider is playing as an independent player). Teams may be of different numbers of players (e.g., for a six-rider ride vehicle, the ride vehicle may comprise a first team of three players, a second team of two players, and an individual player). In certain embodiments, different riders may have differing interactive elements (e.g., a first rider may have green and yellow buttons that they may manipulate while a second rider may have red and blue buttons that they manipulate). Accordingly, a particular target may be configured for manipulation by one a portion of the plurality of riders 3106 on the ride vehicle 3104 (e.g., if a target is illuminated with a blue light, only players having blue buttons may participate in an attempt to receive points for manipulating the button in response to the target). In other embodiments, every rider may have the same interactive elements (e.g., each rider has all four of a green, yellow, red, and blue button). In still another embodiment, interactive elements may be shared among riders (e.g., a button may be positioned between adjacent riders such that each of such riders may attempt to manipulate the same button in response to a target). Such interactive elements may be larger in size in certain embodiments, to help accommodate rider sharing of the same physical interactive element.

Accordingly, any of a variety of cooperative and/or competitive games may be configured. For example, if a plurality of teams or at least one team and at least one individual are playing a competitive game, points may only be award to the team or individual that successfully manipulates an interactive element in closest proximity to the target and/or within the quickest amount of time. For example, in a ride vehicle with two teams, points may be awarded only to the team that successfully manipulates the proper interactive element in the quickest amount of time from illumination of a target. Such determination may be based on individual performance (e.g., the individual team member who presses the correct button first will be responsible for the award of points to his or her associated team), average performance (e.g., the times of each team member is averaged to obtain an average team time that gets compared to the average team time of the other team), success ratio (e.g., if all three team members of the first team successfully manipulate the proper interactive element, but only two team members of the second team successfully manipulate the proper interactive element, the first team receives the points), or any of a variety of other possibilities.

Similar determinations may be made for proximity-based point awarding. For example, the same or similar to discussions throughout, the ride vehicle 3000 may be traveling along an amusement attraction or waterslide and various targets (e.g., lights or other indicia) may be disposed at locations along the amusement attraction or waterslide. As the ride vehicle 3000 gets within a predetermined or calculated range or distance of a particular target, or other location along the attraction, one or more of the riders may interface or manipulate one or more of their corresponding interactive elements, such as buttons. The closer a rider interfaces or manipulates the corresponding interactive element to the particular location, the greater the reward (e.g., score) determined for that rider or team of riders.

The previous description of the disclosed examples is provided to enable any person of ordinary skill in the art to make or use the disclosed methods and apparatus. Various modifications to these examples will be readily apparent to those skilled in the art, and the principles defined herein may be applied to other examples without departing from the spirit or scope of the disclosed method and apparatus. The described embodiments are to be considered in all respects only as illustrative and not restrictive and the scope of the invention is, therefore, indicated by the appended claims rather than by the foregoing description. All changes which come within the meaning and range of equivalency of the claims are to be embraced within their scope. Skilled artisans may implement the described functionality in varying ways for each particular application, but such implementation decisions should not be interpreted as causing a departure from the scope of the disclosed apparatus and methods. The steps of the method or algorithm may also be performed in an alternate order from those provided in the examples.

Various modifications or alterations may be made to the waterslide attractions discussed above. For example, a particular slide apparatus may utilize any of a number of bumps, jumps, turns, twists, flips, curves, angles, hills, valleys, etc. in order to create an exciting ride path for users. In some embodiments, the waterslide may comprise segments that are substantially straight. In other embodiments, the waterslide may comprise a segment or plurality of segments that form at least a portion of the waterslide that is at least partially angled, curved, bent, twisted, or a combination thereof. In some other embodiments, at least a portion of the waterslide can be deformable or moveable. An amusement attraction may be personalized for a rider based upon the attractions determination of which rider is set to traverse the attraction (e.g., via registration and/or syncing as previously discussed). Such personalizations may include music, sound, etc. based upon user data and/or preferences. In one example, if a rider has an "epilepsy" flag as part of their user profile, an amusement attraction may limit the amount of flashing lights during that user's use.

For example, in some embodiments, at least a portion of the waterslide can be moved or deformed relative to another portion of the waterslide while the waterslide contains a rider, in which at least one of the portions includes at least one visual indication that moves with the waterslide segment. Some embodiments include at least a portion of the waterslide that can be moved or deformed relative to another portion of the waterslide while either one or both portions comprises a least one visual indication. Such movements and other effects may be controlled, for example, by a software program executed by the ride control system as part of an interactive ride experience that changes based on rider performance, experience or skill level.

Various lighting, sound effects, vibration effects, or other features or thematic experiences may be included in a particular slide apparatus to garner user attention or excitement. Sensors disposed along the slide apparatus may be used to recognize when a user is approaching for cueing the user, tracking the exactness of the user's ability to hit an upcoming sensor, credit or detract score points for hitting or missing the upcoming sensor, and/or assigning a score, reward and/or time to the user.

A particular slide apparatus may be configured using the same or similar features described above for single riders, double riders, or family riders. For example, in certain embodiments, different game plays may be designed for multi-rider ride vehicles that may either separately track each rider's performance (e.g., competitive gaming) or requiring collaboration of two or more riders in order to achieve certain set goals (e.g., cooperative gaming). In certain embodiments, two players on a same ride vehicle or slideboard may be in competition with one another to successfully respond to the targets as they traverse the waterslide (e.g., first user to hit the target gets the point or by comparing the total accumulation of points for each user to determine a winner for a particular slide run). Team play and/or tournament play (e.g., round-robin) may be accommodated via the game system.

Sensors may be included within a ride vehicle instead of along the slide path. Moreover, tags or other devices may be included at any of a variety of locations on the ride vehicles (e.g., along the bottom, on the sides, etc.). Other technologies than those explicitly described above may be used for boosting or slowing in speed a rider or a ride vehicle. Moreover, other technologies than those explicitly listed could be used as triggers as a vehicle or a rider passes thereby (e.g., magnets within the vehicle or worn by the rider may trip magnetic switches, infrared light beams positioned at locations on the slide path may be tripped by the vehicle or the rider interrupting the light path, etc.).

The difficulty of a given ride utilizing competitive elements as discussed (e.g., score-generated targets) may have an automatically adapting difficulty level based upon user history or attributes. For example, if a user has ridden on a particular waterslide beyond a certain number of times, is above a certain age, has achieved a predetermined performance threshold on previous attempts, and/or any of a variety of other user data, the waterslide may automatically or dynamically adjust the difficulty level by adding targets for the user to hit, enabling more difficult to hit targets or configurations, or by manipulating the water flow or one or more jets of water utilized in the ride. Moreover, the difficulty level of a particular waterslide may automatically adapt in the middle of a user's run. For example, if the user is poorly performing at a given difficulty during the initial portion of the waterslide, the difficulty may be eased for later portions of the waterslide, for example by reducing the number of targets to hit or manipulating the water flow or one or more jets of water utilized in the ride. In this manner, the fun factor may be maintained at a high level and the chance of harsh difficulty spikes a user may otherwise encounter is reduced.

Utilization of sensed tags and/or social media interaction by a waterpark or amusement park may allow for increased population within the park outside of typically popular timeframes. In one example, a waterpark may be busiest during the hottest hours of the day and commonly close during evening or nighttime hours when younger children that typically populate the park have left for bed. At this time, a second phase for the park may be initiated for teenagers or older children that incorporates readers (e.g., RFID sensors), targets, or other interactive elements disposed around the park and designed to interface with park visitors. Scavenger hunts, races, or any of a variety of other competitive features or interactive games may be developed and used to maintain park attendance even during the normally closed or less populated timeframes. Scoreboards may be placed throughout the park and/or social media accounts may be associated with park visitors to further facilitate competitive participation among the park visitors.

In one example, various park-wide features may be enabled via use of ride vehicles and/or riders that are capable of being tracked, for example, using systems the same as or similar to those previously described. In one embodiment, this system may utilize a central database that is configured to be linked and/or receive information from various rides and/or activities dispersed throughout the amusement park. For example, a park-wide system may determine where ride vehicles and/or riders are syncing and/or located in order to aid in crowd control or population control. In certain embodiments, this system may use tracked user data for statistical analysis in determining which sections of the park receive the most traffic, which rides are the most popular and at which times of day, which riders (e.g., age, gender, zip code, etc.) visit the park and/or participate in which activities, etc. This information can be used merely for project staffing and/or planning purposes, advertising purposes, promotion purposes, or may be used to actively induce behavior within the park (e.g., send notifications to riders that encourage participation upon certain rides or certain activities, offer discounts or coupons, etc.).

Park visits may be personalized for riders via tracking of ride vehicles and/or the riders (e.g., greeting a rider by name when they are within proximity of a certain area). Entertainment activities can further utilize such tracking in alternative embodiments (e.g., a park-wide "story" may be setup that users can participate in by traveling to particular areas or engaging is particular activities). In other embodiments, a ride vehicle or rider that is capable of being uniquely tracked and/or identified may be able to use such identification for various authorization purposes (e.g., as a key card or room key, to make payments tied to a payment method, as a fast-pass card, etc.). Moreover, a park-wide system may be configured to send notifications to riders based upon their proximity to other riders (e.g., riders that are stored as part of a rider's user profile as "friends" and/or "family" members may be identified as being nearby).

In still other embodiments, a database or system may be setup that centralizes information regarding all users that wish to engage in such interactive amusement attractions (e.g., may be the database or system responsible for storage of user profiles that are registered and/or synced before traversal down an amusement attraction, as previously discussed). In certain embodiments, this may be a Regional (e.g., National) system and/or a worldwide system. Additional features may be provided in such a system, such as allowing users to be included as one of a plurality of "factions" or "teams." Various competitive and/or cooperative elements may be based around competition between such factions or teams (e.g., highest score overall, highest score on a given day, highest score for a particular amusement park, etc.) Each individual that is associated with one of these factions or teams may add to the overall faction or team score or ranking.

As previously discussed, a mobile or other software application that is configured to have a "virtual simulation" of an interactive amusement attraction may award "app points" for a user if that user uses the software application while awarding "real points" for the user if that user participates in real-life activities at amusement parks. In such an embodiment, a user may need to utilize both forms of "points" in order to get the highest possible score.

Any of the above features discussed may be utilized or incorporated or combined with or into other waterpark or amusement park attractions discussed or retrofitted onto existing waterpark or amusement park ride designs.

The previous description of the disclosed examples is provided to enable any person of ordinary skill in the art to make or use the disclosed methods and apparatus. Accordingly, the terminology employed throughout should be read in a non-limiting manner. Various modifications to these examples will be readily apparent to those skilled in the art, and the principles defined herein may be applied to other examples without departing from the spirit or scope of the disclosed method and apparatus. The described embodiments are to be considered in all respects only as illustrative and not restrictive and the scope of the invention is, therefore, indicated by the appended claims rather than by the foregoing description. All changes which come within the meaning and range of equivalency of the claims are to be embraced within their scope. Skilled artisans may implement the described functionality in varying ways for each particular application, but such implementation decisions should not be interpreted as causing a departure from the scope of the disclosed apparatus and/or methods.

What is claimed is:

1. A ride vehicle comprising:
a body portion for a first rider and a second rider to travel thereon;
a first case configured to contain at least one electronic component therein, the first case being removably fastened with the body portion;
a first handle coupled with the first case and including a first interactive element configured to be interacted with by the first rider;
a second case configured to contain at least one electronic component therein, the second case being removably fastened with the body portion;
a second handle coupled with the second case and including a second interactive element configured to be interacted with by the second rider;
a sensor configured to interact with a sensing element; and
a processor electrically connected with the first interactive element, the second interactive element, and the sensor, the processor configured to determine if the first rider interacts with the first interactive element when the sensor is in a range of the sensing element and configured to determine if the second rider interacts with the second interactive element when the sensor is in the range of the sensing element.

2. The ride vehicle of claim 1 wherein the processor is configured to establish a reward corresponding to the first rider if the first rider interacts with the first interactive element when the sensor is in the range of the sensing element and if the second rider does not interact with the second interactive element when the sensor is in the range of the sensing element.

3. The ride vehicle of claim 1 wherein the processor is configured to establish a reward corresponding to the first rider if both the first rider interacts with the first interactive element when the sensor is in the range of the sensing element and the second rider interacts with the second interactive element when the sensor is in the range of the sensing element.

4. The ride vehicle of claim 1 wherein the first interactive element or the second interactive element is a button.

5. The ride vehicle of claim 1 wherein the sensing element is coupled with a flume, the flume configured to allow the body portion to slide therealong.

6. The ride vehicle of claim 1 wherein the sensing element is integrally manufactured with a flume, the flume configured to allow the body portion to slide therealong.

7. The ride vehicle of claim 1 wherein the sensing element is positioned adjacent to, but not coupled with, a flume, the flume configured to allow the body portion to slide therealong.

8. A ride vehicle for an amusement attraction comprising:
a body portion having a first seating position for a first rider along an outside perimeter of the body portion and a second seating position for a second rider at a position along the outside perimeter of the body portion;
a first handle positioned adjacent to the first seating position;
a first interactive element connected with the first handle, the first interactive element configured to be interacted with by the first rider;
a second handle positioned adjacent to the second seating position
a second interactive element connected with the second handle, the second interactive element configured to be interacted with by the second rider;
a processor in communication with the first interactive element and the second interactive element;
a housing configured to contain the processor therein, the housing connected with and extending upwardly at a center of the body portion; and
a sensor configured to interact with a sensing element of the amusement attraction,
wherein the processor is configured to determine if the first rider interacts with the first interactive element when the sensor is in a range of the sensing element and is configured to determine if the second rider interacts with the second interactive element when the sensor is in the range of the sensing element.

9. The ride vehicle of claim 8 wherein the first interactive element or the second interactive element is a button.

10. The ride vehicle of claim 8 wherein the body portion is substantially in the shape of a circle.

11. The ride vehicle of claim 10 wherein the body portion is at least partially inflatable.

12. The ride vehicle of claim 8 further comprising a first restraint for securing the first rider in the first seating position.

13. The ride vehicle of claim 8 wherein the processor is in wireless communication with the first interactive element and the second interactive element.

14. The ride vehicle of claim 8 wherein the processor is in wired communication with the first interactive element and the second interactive element.

15. The ride vehicle of claim 8 further comprising a display fastened with the housing, the display configured to indicate if the processor determines that the first rider interacts with the first interactive element when the sensor is in a range of the sensing element.

16. The ride vehicle of claim 15 wherein the display is configured to display a score associated with the first rider.

17. The ride vehicle of claim 8 wherein the housing is configured to open to allow the first rider to store an item within a portion of the housing.

18. A ride vehicle for an attraction comprising:
a body portion for a first rider and a second rider to travel thereon;
a bottom surface that is removably connected with the body portion;
a first case that connected with the body portion;

a first handle connected with the first case and including a first interactive element configured to be interacted with by the first rider;

a second case that is connected with the body portion;

a second handle connected with the second case and including a second interactive element configured to be interacted with by the second rider;

a sensor configured to interact with a sensing element of the attraction; and a processor electrically connected with the first interactive element, the second interactive element, and the sensor, the processor configured to determine if the first rider interacts with the first interactive element when the sensor is in a range of the sensing element and configured to determine if the second rider interacts with the second interactive element when the sensor is in the range of the sensing element.

19. The ride vehicle of claim 18 further comprising a coating on at least a portion of the bottom surface for increasing the durability of the bottom surface to frictional forces.

20. The ride vehicle of claim 18 wherein the bottom surface is made of a different material than the body portion.

* * * * *